(12) United States Patent
Moro et al.

(10) Patent No.: US 7,268,897 B1
(45) Date of Patent: Sep. 11, 2007

(54) PRINT CONTROL APPARATUS AND METHOD

(75) Inventors: Takahiro Moro, Wako (JP); Masahiro Nagatani, Yokohama (JP); Kazuyoshi Sumiuchi, Kawasaki (JP); Takeshi Matsushita, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 783 days.

(21) Appl. No.: 09/597,403

(22) Filed: Jun. 21, 2000

(30) Foreign Application Priority Data

| Jun. 28, 1999 | (JP) | ................................. 11-182417 |
| Jun. 28, 1999 | (JP) | ................................. 11-182418 |
| Jun. 28, 1999 | (JP) | ................................. 11-182419 |
| Jun. 28, 1999 | (JP) | ................................. 11-182420 |
| Dec. 27, 1999 | (JP) | ................................. 11-371532 |
| Jun. 16, 2000 | (JP) | ............................. 2000-182079 |

(51) Int. Cl.
*H04N 1/40* (2006.01)

(52) U.S. Cl. ..................... 358/1.13; 358/1.16; 358/406; 358/504

(58) Field of Classification Search ...... 358/1.13–1.16, 358/1.9, 2.1, 406, 504
See application file for complete search history.

(56) References Cited

U.S. PATENT DOCUMENTS

| 4,943,936 | A | 7/1990 | Hirai et al. ................... 364/519 |
| 5,499,359 | A | 3/1996 | Vijaykumar ................ 395/600 |
| 5,613,017 | A | 3/1997 | Rao et al. .................... 382/174 |
| 5,625,466 | A | 4/1997 | Nakajima .................... 358/449 |
| 5,684,930 | A | 11/1997 | Mochizuki .................. 395/106 |
| 5,687,301 | A | 11/1997 | Stokes et al. ................. 395/112 |
| 5,718,520 | A | 2/1998 | MacKay ....................... 400/61 |
| 5,739,841 | A | 4/1998 | Ng et al. ..................... 347/237 |
| 5,745,218 | A | 4/1998 | Sugahara et al. ............. 355/40 |
| 5,805,899 | A | 9/1998 | Evans et al. ................. 395/712 |
| 5,916,308 | A | 6/1999 | Duncan et al. ............. 709/305 |
| 6,025,929 | A | 2/2000 | Nakajima et al. ............ 358/1.9 |
| 6,145,950 | A * | 11/2000 | Ohtsuka et al. ................ 347/15 |
| 6,215,561 | B1 | 4/2001 | Kakutani ..................... 358/1.9 |
| 6,351,320 | B1 * | 2/2002 | Shin ........................... 358/1.9 |

FOREIGN PATENT DOCUMENTS

| EP | 0 741 488 | 11/1996 |
| EP | 0780787 A2 | 6/1997 |
| EP | 0 820 188 | 1/1998 |
| EP | 0 868 067 | 9/1998 |
| EP | 0 881 826 | 12/1998 |
| EP | 0 892 327 A1 | 1/1999 |
| JP | 01-204745 | 8/1989 |
| JP | 02-258272 | 10/1990 |

(Continued)

*Primary Examiner*—Thomas D. Lee
*Assistant Examiner*—Stephen Brinich
(74) *Attorney, Agent, or Firm*—Fitzpatrick, Cella, Harper & Scinto

(57) ABSTRACT

In this invention, when a printer driver uses data obtained by referring to a table, the printer driver searches a first table of two, first and second tables to obtain a search condition of the second table. The printer driver searches the second table using the obtained search condition to obtain required data. When another search condition is added, the search condition is added to the first able, and data corresponding to the added search condition is added to the second table.

24 Claims, 52 Drawing Sheets

FOREIGN PATENT DOCUMENTS

| | | |
|---|---|---|
| JP | 08-154175 | 6/1996 |
| JP | 08-242384 | 9/1996 |
| JP | 8-339296 | 12/1996 |
| JP | 9-152961 | 6/1997 |
| JP | 9-179697 | 7/1997 |
| JP | 9-179698 | 7/1997 |
| JP | 09-272222 | 10/1997 |
| JP | 9-272222 | 10/1997 |
| JP | 9-294212 | 11/1997 |
| JP | 10-013674 | 1/1998 |
| JP | 10-49318 | 2/1998 |
| JP | 10-84555 | 3/1998 |
| JP | 10-200776 | 7/1998 |
| JP | 11-017967 | 1/1999 |
| JP | 11-017971 | 1/1999 |
| JP | 11-134085 | 5/1999 |

* cited by examiner

FIG. 4

| | |
|---|---|
| NORMAL PAPER / ERROR DIFFUSION / BEST QUALITY | COLOR CORRECTION TABLE 01. COLOR CONVERSION TABLE 01. GRAYSCALE CORRECTION TABLE 01...... |
| NORMAL PAPER / ERROR DIFFUSION / MIDDLE QUALITY | COLOR CORRECTION TABLE 01. COLOR CONVERSION TABLE 02. GRAYSCALE CORRECTION TABLE 02...... |
| NORMAL PAPER / DITHERING / BEST QUALITY | COLOR CORRECTION TABLE 02. COLOR CONVERSION TABLE 03. GRAYSCALE CORRECTION TABLE 03...... |
| NORMAL PAPER / DITHERING / MIDDLE QUALITY | COLOR CORRECTION TABLE 02. COLOR CONVERSION TABLE 04. GRAYSCALE CORRECTION TABLE 04...... |
| OHP PAPER / ERROR DIFFUSION / BEST QUALITY | COLOR CORRECTION TABLE 03. COLOR CONVERSION TABLE 05. GRAYSCALE CORRECTION TABLE 05...... |
| OHP PAPER / DITHERING / BEST QUALITY | COLOR CORRECTION TABLE 03. COLOR CONVERSION TABLE 06. GRAYSCALE CORRECTION TABLE 06...... |

215a · 215 · 215b

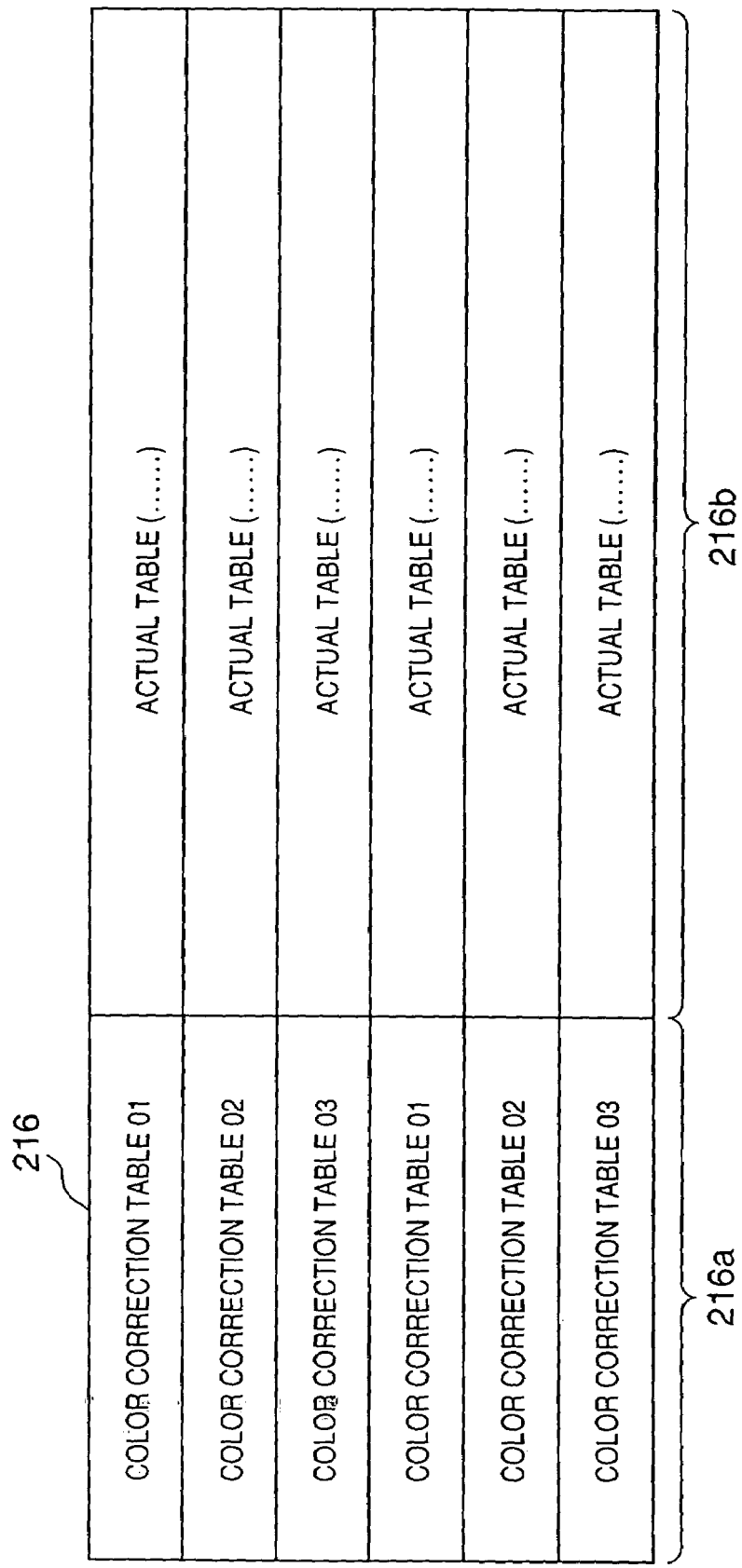

FIG. 6

| 217 | |
|---|---|
| GRAYSCALE CORRECTION TABLE 01 | ACTUAL TABLE (……) |
| GRAYSCALE CORRECTION TABLE 02 | ACTUAL TABLE (……) |
| GRAYSCALE CORRECTION TABLE 03 | ACTUAL TABLE (……) |
| DITHER MATRIX TABLE 01 | ACTUAL TABLE (……) |
| DITHER MATRIX TABLE 02 | ACTUAL TABLE (……) |
| DITHER MATRIX TABLE 03 | ACTUAL TABLE (……) |

217a (left column), 217b (right column)

FIG. 11

| 218 | 2181 |
|---|---|
| COLOR CORRECTION TABLE 01 | NEW ACTUAL TABLE (.......) |
| COLOR CORRECTION TABLE 02 | ACTUAL TABLE (.......) |
| COLOR CORRECTION TABLE 03 | ACTUAL TABLE (.......) |
| COLOR CONVERSION TABLE 01 | ACTUAL TABLE (.......) |
| COLOR CONVERSION TABLE 02 | ACTUAL TABLE (.......) |
| COLOR CONVERSION TABLE 03 | |

FIG. 24

2021 HEAD ID     2022 DATABASE NAME CORRESPONDING TO HEAD ID

0xFEDCBA987654, BJDB0681.tbl
0xFEDCBA987653, BJDB0682.tbl
0xFEDCBA987652, BJDB0683.tbl
0xFEDCBA987651, BJDB0684.tbl
0xFEDCBA987654, BJDB0685.tbl

FIG. 33

| CHANGED ITEM | SETUP VALUE AFTER CHANGE |
|---|---|
| INK CARTRIDGE | BLACK / PHOTO |

FIG. 34

| SETUP ITEM | SETUP VALUE |
|---|---|
| PAPER TYPE | NORMAL PAPER |
| PAPER SOURCE | AUTO SHEET FEEDER |
| GRAYSCALE PRINT | OFF |
| PRINT QUALITY | SECOND |
| DITHERING | PATTERN (HIGH SPEED) |
| IMAGE DATA CORRECTION | OFF |
| PHOTO DATA CORRECTION | OFF |

FIG. 35

| ID | CONTENTS |
|---|---|
| LINK INFORMATION STORAGE SECTION-1 | REFERENCE MEDIUM CORRECTION TABLE |
| LINK INFORMATION STORAGE SECTION-2 | MEDIUM CORRESPONDENCE TABLE |
| LINK INFORMATION STORAGE SECTION-3 | GRAYSCALE CORRESPONDENCE TABLE |
| LINK INFORMATION STORAGE SECTION-4 | QUALITY-LEVEL CORRESPONDENCE TABLE |
| LINK INFORMATION STORAGE SECTION-5 | QUALITY MESSAGE-BINARIZATION METHOD CORRESPONDENCE TABLE |
| LINK INFORMATION STORAGE SECTION-6 | RESOLUTION CORRESPONDENCE TABLE |

FIG. 36

| ID | EXTRACTION CONDITION |
|---|---|
| LINK INFORMATION STORAGE SECTION-1 (REFERENCE MEDIUM CORRECTION TABLE) | INK CARTRIDGE, PAPER TYPE |
| LINK INFORMATION STORAGE SECTION-2 (MEDIUM CORRESPONDENCE TABLE) | INK CARTRIDGE, PAPER TYPE |
| LINK INFORMATION STORAGE SECTION-3 (GRAYSCALE CORRESPONDENCE TABLE) | INK CARTRIDGE |
| LINK INFORMATION STORAGE SECTION-4 (QUALITY-LEVEL CORRESPONDENCE TABLE) | INK CARTRIDGE, PAPER TYPE |
| LINK INFORMATION STORAGE SECTION-5 (QUALITY MESSAGE-BINARIZATION CORRESPONDENCE TABLE) | INK CARTRIDGE, PAPER TYPE, PRINT QUALITY |
| LINK INFORMATION STORAGE SECTION-6 (RESOLUTION CORRESPONDENCE TABLE) | INK CARTRIDGE, PAPER TYPE, PRINT QUALITY, DITHERING, GRAYSCALE PRINT |

F I G. 37

| CHANGED ITEM | ID OF INK INFORMATION STORAGE SECTION TO BE REFERRED TO |
|---|---|
| CARTRIDGE | 1, 2, 3, 4, 5, 6 |
| PAPER TYPE | 1, 2, 4, 5, 6 |
| PRINT QUALITY | 5, 6 |
| DITHERING | 6 |
| GRAYSCALE | 6 |
| PAPER SOURCE | |
| IMAGE DATA CORRECTION | |
| PHOTO DATA CORRECTION | |

FIG. 40

| INK CARTRIDGE | CURRENT PAPER TYPE | PAPER TYPE AFTER LINK |
|---|---|---|
| BLACK / COLOR | NORMAL PAPER | NORMAL PAPER |
| BLACK / COLOR | OHP PAPER | OHP PAPER |
| BLACK / COLOR | COATED PAPER | COATED PAPER |
| BLACK / COLOR | GLOSS PAPER | GLOSS PAPER |
| BLACK / PHOTO | NORMAL PAPER | COATED PAPER |
| BLACK / PHOTO | OHP PAPER | COATED PAPER |
| BLACK / PHOTO | COATED PAPER | COATED PAPER |
| BLACK / PHOTO | GLOSS PAPER | GLOSS PAPER |

FIG. 41

| INK CARTRIDGE | PAPER TYPE | SETUP ITEM | SETUP VALUE | STATE OF SETUP VALUE |
|---|---|---|---|---|
| BLACK / COLOR | NORMAL PAPER | PAPER TYPE | NORMAL PAPER | SELECT |
| BLACK / COLOR | NORMAL PAPER | PAPER TYPE | OHP PAPER | SELECTABLE |
| BLACK / COLOR | NORMAL PAPER | PAPER TYPE | COATED PAPER | SELECTABLE |
| BLACK / COLOR | NORMAL PAPER | PAPER TYPE | GLOSS PAPER | SELECTABLE |
| BLACK / COLOR | OHP PAPER | PAPER TYPE | NORMAL PAPER | SELECTABLE |
| BLACK / COLOR | OHP PAPER | PAPER TYPE | OHP PAPER | SELECT |
| BLACK / COLOR | OHP PAPER | PAPER TYPE | COATED PAPER | SELECTABLE |
| BLACK / COLOR | OHP PAPER | PAPER TYPE | GLOSS PAPER | SELECTABLE |
| BLACK / COLOR | COATED PAPER | PAPER TYPE | NORMAL PAPER | SELECTABLE |
| BLACK / COLOR | COATED PAPER | PAPER TYPE | OHP PAPER | SELECTABLE |
| BLACK / COLOR | COATED PAPER | PAPER TYPE | COATED PAPER | SELECT |
| BLACK / COLOR | COATEDPAPER | PAPER TYPE | GLOSS PAPER | SELECTABLE |
| BLACK / COLOR | GLOSS PAPER | PAPER TYPE | NORMAL PAPER | SELECTABLE |
| BLACK / COLOR | GLOSS PAPER | PAPER TYPE | OHP PAPER | SELECTABLE |
| BLACK / COLOR | GLOSS PAPER | PAPER TYPE | COATED PAPER | SELECTABLE |
| BLACK / COLOR | GLOSS PAPER | PAPER TYPE | GLOSS PAPER | SELECT |
| BLACK / PHOTO | COATED PAPER | PAPER TYPE | NORMAL PAPER | DELETE |
| BLACK / PHOTO | COATED PAPER | PAPER TYPE | OHP PAPER | DELETE |
| BLACK / PHOTO | COATED PAPER | PAPER TYPE | COATED PAPER | SELECT |
| BLACK / PHOTO | COATED PAPER | PAPER TYPE | GLOSS PAPER | SELECTABLE |
| BLACK / PHOTO | GLOSS PAPER | PAPER TYPE | NORMAL PAPER | DELETE |
| BLACK / PHOTO | GLOSS PAPER | PAPER TYPE | OHP PAPER | DELETE |
| BLACK / PHOTO | GLOSS PAPER | PAPER TYPE | COATED PAPER | SELECTABLE |
| BLACK / PHOTO | GLOSS PAPER | PAPER TYPE | GLOSS PAPER | SELECT |

FIG. 42

| INK CARTRIDGE | SETUP ITEM | SETUP VALUE | STATE OF SETUP VALUE |
|---|---|---|---|
| BLACK / COLOR | GRAYSCALE | ON | SELECTABLE |
| BLACK / COLOR | GRAYSCALE | OFF | SELECT |
| BLACK / PHOTO | GRAYSCALE | ON | SELECTABLE |
| BLACK / PHOTO | GRAYSCALE | OFF | SELECT |

FIG. 43

| INK CARTRIDGE | PAPER TYPE | SETUP ITEM TO BE CHANGED | SETUP VALUE TO BE CHANGED | STATE OF SETUP VALUE |
|---|---|---|---|---|
| BLACK / COLOR | NORMAL PAPER | PRINT QUALITY | FIFTH LEVEL | SELECTABLE |
| BLACK / COLOR | NORMAL PAPER | PRINT QUALITY | FOURTH LEVEL | SELECTABLE |
| BLACK / COLOR | NORMAL PAPER | PRINT QUALITY | THIRD LEVEL | SELECTABLE |
| BLACK / COLOR | NORMAL PAPER | PRINT QUALITY | SECOND LEVEL | SELECT |
| BLACK / COLOR | NORMAL PAPER | PRINT QUALITY | FIRST LEVEL | SELECTABLE |
| BLACK / COLOR | OHP PAPER | PRINT QUALITY | FIFTH LEVEL | SELECTABLE |
| BLACK / COLOR | OHP PAPER | PRINT QUALITY | FOURTH LEVEL | SELECT |
| BLACK / COLOR | OHP PAPER | PRINT QUALITY | THIRD LEVEL | SELECTABLE |
| BLACK / COLOR | OHP PAPER | PRINT QUALITY | SECOND LEVEL | SELECTABLE |
| BLACK / COLOR | OHP PAPER | PRINT QUALITY | FIRST LEVEL | DELETE |
| BLACK / COLOR | COATED PAPER | PRINT QUALITY | FIFTH LEVEL | SELECTABLE |
| BLACK / COLOR | COATED PAPER | PRINT QUALITY | FOURTH LEVEL | SELECT |
| BLACK / COLOR | COATED PAPER | PRINT QUALITY | THIRD LEVEL | SELECTABLE |
| BLACK / COLOR | COATED PAPER | PRINT QUALITY | SECOND LEVEL | SELECTABLE |
| BLACK / COLOR | COATED PAPER | PRINT QUALITY | FIRST LEVEL | DELETE |
| BLACK / COLOR | GLOSS PAPER | PRINT QUALITY | FIFTH LEVEL | SELECTABLE |
| BLACK / COLOR | GLOSS PAPER | PRINT QUALITY | FOURTH LEVEL | SELECT |
| BLACK / COLOR | GLOSS PAPER | PRINT QUALITY | THIRD LEVEL | SELECTABLE |
| BLACK / COLOR | GLOSS PAPER | PRINT QUALITY | SECOND LEVEL | SELECTABLE |
| BLACK / COLOR | GLOSS PAPER | PRINT QUALITY | FIRST LEVEL | DELETE |
| BLACK / PHOTO | COATED PAPER | PRINT QUALITY | FIFTH LEVEL | SELECTABLE |
| BLACK / PHOTO | COATED PAPER | PRINT QUALITY | FOURTH LEVEL | SELECT |
| BLACK / PHOTO | COATED PAPER | PRINT QUALITY | THIRD LEVEL | DELETE |
| BLACK / PHOTO | COATED PAPER | PRINT QUALITY | SECOND LEVEL | DELETE |
| BLACK / PHOTO | COATED PAPER | PRINT QUALITY | FIRST LEVEL | DELETE |
| BLACK / PHOTO | GLOSS PAPER | PRINT QUALITY | FIFTH LEVEL | SELECTABLE |
| BLACK / PHOTO | GLOSS PAPER | PRINT QUALITY | FOURTH LEVEL | SELECT |
| BLACK / PHOTO | GLOSS PAPER | PRINT QUALITY | THIRD LEVEL | DELETE |
| BLACK / PHOTO | GLOSS PAPER | PRINT QUALITY | SECOND LEVEL | DELETE |
| BLACK / PHOTO | GLOSS PAPER | PRINT QUALITY | FIRST LEVEL | DELETE |

FIG. 44

| INK CARTRIDGE | PAPER TYPE | PRINT QUALITY | SETUP ITEM | SETUP VALUE | STATE OF SETUP VALUE |
|---|---|---|---|---|---|
| BLACK / PHOTO | COATED PAPER | FIFTH LEVEL | QUALITY MESSAGE | PHOTO | SELECT |
| BLACK / PHOTO | COATED PAPER | FIFTH LEVEL | DITHERING | PATTERN (HIGH SPEED) | DELETE |
| BLACK / PHOTO | COATED PAPER | FIFTH LEVEL | DITHERING | PATTERN | DELETE |
| BLACK / PHOTO | COATED PAPER | FIFTH LEVEL | DITHERING | ERROR DIFFUSION | SELECT |
| BLACK / PHOTO | COATED PAPER | FOURTH LEVEL | QUALITY MESSAGE | PHOTO | SELECT |
| BLACK / PHOTO | COATED PAPER | FOURTH LEVEL | DITHERING | PATTERN (HIGH SPEED) | DELETE |
| BLACK / PHOTO | COATED PAPER | FOURTH LEVEL | DITHERING | PATTERN | DELETE |
| BLACK / PHOTO | COATED PAPER | FOURTH LEVEL | DITHERING | ERROR DIFFUSION | SELECT |
| BLACK / PHOTO | GLOSS PAPER | FIFTH LEVEL | QUALITY MESSAGE | PHOTO | SELECT |
| BLACK / PHOTO | GLOSS PAPER | FIFTH LEVEL | DITHERING | PATTERN (HIGH SPEED) | DELETE |
| BLACK / PHOTO | GLOSS PAPER | FIFTH LEVEL | DITHERING | PATTERN | DELETE |
| BLACK / PHOTO | GLOSS PAPER | FIFTH LEVEL | DITHERING | ERROR DIFFUSION | SELECT |
| BLACK / PHOTO | GLOSS PAPER | FOURTH LEVEL | QUALITY MESSAGE | PHOTO | SELECT |
| BLACK / PHOTO | GLOSS PAPER | FOURTH LEVEL | DITHERING | PATTERN (HIGH SPEED) | DELETE |
| BLACK / PHOTO | GLOSS PAPER | FOURTH LEVEL | DITHERING | PATTERN | DELETE |
| BLACK / PHOTO | GLOSS PAPER | FOURTH LEVEL | DITHERING | ERROR DIFFUSION | SELECT |
| BLACK / COLOR | NORMAL PAPER | FIFTH LEVEL | QUALITY MESSAGE | PHOTO | SELECT |
| BLACK / COLOR | NORMAL PAPER | FIFTH LEVEL | DITHERING | PATTERN (HIGH SPEED) | SELECTABLE |
| BLACK / COLOR | NORMAL PAPER | FIFTH LEVEL | DITHERING | PATTERN | SELECTABLE |
| BLACK / COLOR | NORMAL PAPER | FIFTH LEVEL | DITHERING | ERROR DIFFUSION | SELECT |
| BLACK / COLOR | NORMAL PAPER | FOURTH LEVEL | QUALITY MESSAGE | PHOTO | SELECT |
| BLACK / COLOR | NORMAL PAPER | FOURTH LEVEL | DITHERING | PATTERN (HIGH SPEED) | SELECTABLE |
| BLACK / COLOR | NORMAL PAPER | FOURTH LEVEL | DITHERING | PATTERN | SELECTABLE |
| BLACK / COLOR | NORMAL PAPER | FOURTH LEVEL | DITHERING | ERROR DIFFUSION | SELECT |

FIG. 45

| INK CARTRIDGE | PAPER TYPE | QUALITY PRINT | DITHERING | GRAYSCALE | SETUP ITEM | SETUP VALUE | STATE OF SETUP VALUE |
|---|---|---|---|---|---|---|---|
| BLACK/PHOTO | COATED PAPER | FIFTH LEVEL | ERROR DIFFUSION | ON | VERTICAL RESOLUTION | 720 | SELECT |
| BLACK/PHOTO | COATED PAPER | FIFTH LEVEL | ERROR DIFFUSION | ON | VERTICAL RESOLUTION | 720 | SELECT |
| BLACK/PHOTO | COATED PAPER | FIFTH LEVEL | ERROR DIFFUSION | ON | SMOOTHING INFORMATION | SMOOTHING | SELECT |
| BLACK/PHOTO | COATED PAPER | FIFTH LEVEL | ERROR DIFFUSION | OFF | VERTICAL RESOLUTION | 720 | SELECT |
| BLACK/PHOTO | COATED PAPER | FIFTH LEVEL | ERROR DIFFUSION | OFF | VERTICAL RESOLUTION | 720 | SELECT |
| BLACK/PHOTO | COATED PAPER | FIFTH LEVEL | ERROR DIFFUSION | OFF | SMOOTHING INFORMATION | SMOOTHING | SELECT |
| BLACK/PHOTO | COATED PAPER | FOURTH LEVEL | ERROR DIFFUSION | ON | VERTICAL RESOLUTION | 720 | SELECT |
| BLACK/PHOTO | COATED PAPER | FOURTH LEVEL | ERROR DIFFUSION | ON | VERTICAL RESOLUTION | 720 | SELECT |
| BLACK/PHOTO | COATED PAPER | FOURTH LEVEL | ERROR DIFFUSION | ON | SMOOTHING INFORMATION | SMOOTHING | SELECT |
| BLACK/PHOTO | COATED PAPER | FOURTH LEVEL | ERROR DIFFUSION | OFF | VERTICAL RESOLUTION | 720 | SELECT |
| BLACK/PHOTO | COATED PAPER | FOURTH LEVEL | ERROR DIFFUSION | OFF | VERTICAL RESOLUTION | 720 | SELECT |
| BLACK/PHOTO | COATED PAPER | FOURTH LEVEL | ERROR DIFFUSION | OFF | SMOOTHING INFORMATION | SMOOTHING | SELECT |
| BLACK/PHOTO | GLOSS PAPER | FIFTH LEVEL | ERROR DIFFUSION | ON | VERTICAL RESOLUTION | 720 | SELECT |
| BLACK/PHOTO | GLOSS PAPER | FIFTH LEVEL | ERROR DIFFUSION | ON | VERTICAL RESOLUTION | 720 | SELECT |
| BLACK/PHOTO | GLOSS PAPER | FIFTH LEVEL | ERROR DIFFUSION | ON | SMOOTHING INFORMATION | SMOOTHING | SELECT |
| BLACK/PHOTO | GLOSS PAPER | FIFTH LEVEL | ERROR DIFFUSION | OFF | VERTICAL RESOLUTION | 720 | SELECT |
| BLACK/PHOTO | GLOSS PAPER | FIFTH LEVEL | ERROR DIFFUSION | OFF | VERTICAL RESOLUTION | 720 | SELECT |
| BLACK/PHOTO | GLOSS PAPER | FIFTH LEVEL | ERROR DIFFUSION | OFF | SMOOTHING INFORMATION | SMOOTHING | SELECT |
| BLACK/PHOTO | GLOSS PAPER | FOURTH LEVEL | ERROR DIFFUSION | ON | VERTICAL RESOLUTION | 720 | SELECT |
| BLACK/PHOTO | GLOSS PAPER | FOURTH LEVEL | ERROR DIFFUSION | ON | VERTICAL RESOLUTION | 720 | SELECT |
| BLACK/PHOTO | GLOSS PAPER | FOURTH LEVEL | ERROR DIFFUSION | ON | SMOOTHING INFORMATION | SMOOTHING | SELECT |
| BLACK/PHOTO | GLOSS PAPER | FOURTH LEVEL | ERROR DIFFUSION | OFF | VERTICAL RESOLUTION | 720 | SELECT |
| BLACK/PHOTO | GLOSS PAPER | FOURTH LEVEL | ERROR DIFFUSION | OFF | VERTICAL RESOLUTION | 720 | SELECT |
| BLACK/PHOTO | GLOSS PAPER | FOURTH LEVEL | ERROR DIFFUSION | OFF | SMOOTHING INFORMATION | SMOOTHING | SELECT |

FIG. 46

| SETUP ITEM | SETUP VALUE | STATE OF SETUP VALUE |
|---|---|---|
| PAPER TYPE | NORMAL PAPER | DELETE |
| PAPER TYPE | OHP PAPER | DELETE |
| PAPER TYPE | COATED PAPER | SELECT |
| PAPER TYPE | GLOSS PAPER | SELECTABLE |
| GRAYSCALE | ON | SELECTABLE |
| GRAYSCALE | OFF | SELECT |
| PRINT QUALITY | FIFTH LEVEL | SELECTABLE |
| PRINT QUALITY | FOURTH LEVEL | SELECT |
| PRINT QUALITY | THIRD LEVEL | DELETE |
| PRINT QUALITY | SECOND LEVEL | DELETE |
| PRINT QUALITY | FIRST LEVEL | DELETE |
| QUALITY MESSAGE | PHOTO | SELECT |
| DITHERING | ERROR DIFFUSION | SELECT |
| DITHERING | PATTERN (HIGH SPEED) | DELETE |
| DITHERING | PATTERN | DELETE |
| VERTICAL RESOLUTION | 720 | SELECT |
| HORIZONTAL RESOLUTION | 720 | SELECT |
| SMOOTHING INFORMATION | SMOOTHING | SELECT |

FIG. 50

INDEX TABLE

5001

| CONTINUOUS PAPER | PERFORATED PAPER | TABLE ID |
|---|---|---|
| ON | ALL | 100 |
| OFF | ON | 110 |
| ON | OFF | 120 |

| PAPER CODE | LEFT MARGIN | TOP MARGIN | HORIZONTAL_PRINTABLE AREA | VERTICAL_PRINTABLE AREA |
|---|---|---|---|---|
| A4 | 340 | 0 | 20320 | 29700 |
| A5 | 340 | 0 | 14120 | 21000 |
| B5 | 340 | 0 | 17520 | 25700 |
| ENVELOPE | 640 | 0 | 20320 | 10477 |
| POSTCARD | 340 | 0 | 9320 | 14800 |
| USER DEFINED | 340 | 0 | 20320 | 0 |

| PAPER CODE | LEFT MARGIN | TOP MARGIN | HORIZONTAL PRINTABLE AREA | VERTICAL PRINTABLE AREA |
|---|---|---|---|---|
| A4 | 600 | 600 | 19800 | 28500 |
| A5 | 600 | 600 | 13600 | 19800 |
| B5 | 600 | 600 | 17000 | 24500 |
| ENVELOPE | 340 | 300 | 20320 | 9677 |
| POSTCARD | 640 | 300 | 9320 | 14000 |
| USER DEFINED | 600 | 600 | 20320 | 600 |

| PAPER CODE | LEFT MARGIN | TOP MARGIN | HORIZONTAL PRINTABLE AREA | VERTICAL PRINTABLE AREA |
|---|---|---|---|---|
| A4 | 340 | 300 | 20320 | 28900 |
| A5 | 340 | 300 | 14120 | 20200 |
| B5 | 340 | 300 | 17520 | 24900 |
| ENVELOPE | 640 | 300 | 20320 | 9677 |
| POSTCARD | 340 | 300 | 9320 | 14000 |
| USER DEFINED | 340 | 300 | 20320 | 500 |

5103

PRINT CONTROL APPARATUS AND METHOD

FIELD OF THE INVENTION

The present invention relates to a print control apparatus such as a host computer or the like connected to a printer, which performs setups of parameters that control a printer, maintenance of tables which are used to correct and convert an image output form the printer, and the like, and a print control method.

BACKGROUND OF THE INVENTION

When an image composited by a personal computer or the like is output by a printer, a print control apparatus implemented by a personal computer must color-convert image data expressed by luminance signals R (red), G (green), and B (blue) into color signals Y (yellow), M (magenta), C (cyan), and K (black) (or Y, M, C) used in the printer. In this conversion, color correction of RGB data (from 8-bit RGB data into 8-bit RGB data), color conversion (from 8-bit RGB data into 8-bit CMYK data), grayscale correction (from 8-bit CMYK data to 8-bit CMYK data), and quantization (from 8-bit CMYK data into 1-bit CMYK data) are executed in turn.

Such conversion or correction uses look-up tables prepared in advance. Each processing module that implements conversion or correction holds its look-up tables, and retrieves and loads a look-up table according to a print mode designated by print quality, a quantization method, and the like in its own search sequence to execute relevant processes.

That is, it is a common practice to access a conventional look-up table inside a library module as a part of the library module that attains correction or conversion for image processes. Also, a table search method is often unique to the library module.

The look-up tables prepared in advance differ only in units of print modes. If a given print mode is selected, identical printer models use an identical look-up table regardless of their various head or printer conditions.

However, since each module holds its own look-up tables, when a print mode is added, deleted, or modified, all modules must undergo addition, deletion, and modification of look-up tables in correspondence with the changed print mode to maintain consistency. If one of these modules suffers errors, a normal print process is often disturbed.

That is, in the conventional architecture in which each library module accesses its own look-up tables, even when only a look-up table has been changed, the library module must be re-compiled every time the look-up table is changed, resulting in, e.g., low debugging efficiency in the development process. Also, in a printer driver composed of a plurality of library modules which are created in units of functions, a change in look-up table often influences a plurality of library modules, resulting in not only low efficiency but also low quality of the printer driver (first problem).

In the above method, look-up tables are prepared in advance, and identical printer models use an identical look-up table (LUT) independently of their head conditions and the like. Also, different LUTs are prepared only in units of print modes.

However, a single look-up table prepared in advance cannot always provide the best print results due to individual differences, aging, and the like of printer main bodies, ink heads, and the like. For example, when a magenta-rich head is used, the image is entirely tinged with red, or gray balance cannot be held (second problem). In order to solve this problem, the look-up table must be updated, but updating of the look-up table poses the first problem.

When a print process is done using a print apparatus which can select a plurality of types of print paper, various print methods, and the like, the user selects or inputs various kinds of information required for an intended print process.

In this case, a print control apparatus displays setup values of print information required for the print process, e.g., setup items "ink cartridge", "paper type", "paper source", "grayscale print", "print quality", "dithering", "image data correction", "photo data correction", and the like, as shown in FIG. 32. The user selects or inputs setup values from the displayed items.

After setup values are input, the print control apparatus combines the selected or input information to obtain information required for the print process.

However, with this method, since the user must select or input various kinds of information required for the print process, the load on the user is heavy. Also, when the user inputs or selects wrong information, an optimal print process may be disturbed.

For example, when the user selects "OHP paper" as a setup value of setup item "paper type" but selects "auto sheet feeder" as a setup value of setup item "paper source" upon printing on paper for which "manual feed" must be selected as "paper source", a print error such as paper jam or the like is highly likely to occur since manual feed is not done. When the contents and the number of items of input information have been changed, or when the contents and the number of items of information to be provided to the print apparatus have been changed, it is difficult for the user to cope with such changes.

In order to solve these problems, Japanese Patent Laid-Open Nos. 09-179698, 10-049318, and the like have been proposed. In these proposals, when a given setup item is set at a certain value, items the select ranges of values of which can be determined accordingly, and the value ranges are held as link information. When a given print setup value has been changed, the print control apparatus acquires the changed item and link information corresponding to that value. The print control apparatus controls a user interface to limit items and values that can be changed on the basis of the acquired link information.

However, with this method, when the value of a given item has been changed, since link information that matches a condition such as the changed value or the like is searched, a data table for storing link information must have a huge size as the number of conditions increases. In order to compensate for such shortcoming, in another method, a plurality of conditions required for searching link information are combined to define a new condition, and the link information is searched using the new condition.

However, with this method, when an original condition or link information has been changed, combinations of search conditions must be re-defined. Since the combinations of conditions are statically defined by a mechanism for searching link information, the mechanism for searching link information, e.g., a program executed by a computer to search link information, must be changed upon re-defining conditions (third problem).

The conventional print control apparatus offers print margin information to an application program. Print margins offered by the print control apparatus are information required for reliably forming an image on a designated paper sheet, and differ depending on paper sizes, unlike margins set by an application or the like. The print control apparatus computes the left margin, top margin, and vertical and horizontal printable area values on the basis of the vertical and horizontal sizes of a paper sheet, paper size name, or the like as an input, and offers them to the application. For example, when the paper sheet has an A4 size, the left margin is 3.4 mm; when the paper sheet has an envelope size, it is 6.4 mm. When the paper sheet has a user-defined size, the print control apparatus computes margins using a predetermined formula on the basis of the defined paper size.

With such conventional method, since the margin information computation processing sequence is coded as a program, when the number of types of paper sizes increases, the program must be updated in correspondence with the sizes.

Furthermore, since printable paper sizes vary depending on printer models, the margin computation program must be developed in units of printer models. Moreover, the margin computation method changes not only by paper sizes but also under complicated conditions to cope with continuous paper without top and bottom margins, perforated paper, and the like. As a result, a margin computation program including complicated condition checking steps must be developed in correspondence with printer models.

In this manner, a development efficiency drop of a margin information offering system, and quality drop due to a complicated program readily occur (fourth problem).

As described in the first to fourth problems, when the print control apparatus acquires data by searching a table, and executes predetermined operation on the basis of the acquired data, if the number of items of the table is changed, not only the table must be updated, but also a module (e.g., a program) that looks up the table must be renewed.

SUMMARY OF THE INVENTION

The present invention has been made in consideration of the aforementioned prior art, and has as its first object to provide a print control apparatus and method which use data acquired by searching a table, wherein even when the number of items of a table has been changed, the table alone need only be changed, but modules that look up the table need not be changed.

It is another object of the present invention to solve the first problem. That is, it is the second object of the present invention to provide a print control apparatus and method which allow easy maintenance of a look-up table independently of processes using the table, and can prevent consistency among modules that use the look-up table from impairing.

It is still another object of the present invention to solve the second problem. That is, it is the third object of the present invention to provide a print control apparatus and method which can always obtain satisfactory print results by generating a database including a look-up table in accordance with individual differences or aging of the characteristics of an output apparatus.

It is still another object of the present invention to solve the third problem. That is, it is the fourth object of the present invention to provide a print control apparatus and method which can form a high-quality image by generating and managing a look-up table itself in accordance with individual differences or aging of the characteristics of a print apparatus.

It is still another object of the present invention to solve the fourth problem. That is, it is the fifth object of the present invention to provide a print control apparatus and method which can link various functions of a print apparatus, can provide an optimal combination of functions, and can obviate the need for changing a search module even a search condition for the combined information has been changed.

In order to achieve the above objects, the present invention comprises the following arrangement. That is, a print control apparatus comprises:

a first table for storing search conditions;

a second table for storing data of values corresponding to the search conditions;

search means for searching the first table for the search condition on the basis of a given condition, and searching the second table for data of a value corresponding to the acquired search condition; and table maintenance means for, when a given search condition has been changed, changing the search conditions stored in the first table, and changing a value which is stored in the second table and corresponds to the changed search condition.

The print control apparatus preferably further comprises correction means for correcting an image, the search means searches the first and second tables for a look-up table for image correction, and the correction means corrects the image with reference to the look-up table.

The print control apparatus preferably further comprises setting means for setting print setup values, the search means searches the first and second tables for an appropriate combination of the print setup values, and the setting means prompts the user to input setup values with reference to the appropriate combination.

The print control apparatus preferably further comprises margin setting means for setting a print margin, the search means searches the first and second tables for an appropriate print margin, and the margin setting means offers the appropriate print margin to the user.

Alternatively, there is provided a database comprising:

a first table for storing keys and look-up table identifiers in correspondence with each other; and a second table for storing the look-up table identifiers and look-up tables in correspondence with each other, wherein the look-up table can be searched via the look-up table identifier corresponding to the designated key.

Alternatively, there is provided a print control apparatus comprising:

a first table for storing look-up table identifiers used in image data conversion in correspondence with keys that use print modes;

a second table for storing look-up tables corresponding to the look-up table identifiers stored in the first table;

search means for searching the first table for a look-up table identifier corresponding to a designated print mode;

table acquisition means for acquiring a look-up table corresponding to the look-up table identifier acquired by the search means from the second table; and image processing means for processing image data using the acquired look-up table.

Alternatively, there is provided a print control method using a first table for storing look-up table identifiers used in image data conversion in correspondence with keys that use print modes, and a second table for storing look-up tables corresponding to the look-up table identifiers stored in the first table, comprising:

the search step of searching the first table for a look-up table identifier corresponding to a designated print mode;

the table acquisition step of acquiring a look-up table corresponding to the look-up table identifier acquired in the search step from the second table; and the image processing step of processing image data using the acquired look-up table.

Alternatively, there is provided a computer readable storage medium storing a computer program which makes a computer implement:

search means for searching a first table for storing look-up table identifiers used in image data conversion in correspondence with keys that use print modes for a look-up table identifier corresponding to a designated print mode;

table acquisition means for acquiring a look-up table corresponding to the look-up table identifier acquired by the search means from a second table for storing look-up tables corresponding to the look-up table identifiers stored in the first table; and image processing means for processing image data using the acquired look-up table.

Alternatively, there is provided an information processing apparatus comprising:

a processing module; and a database corresponding to a given apparatus, wherein the processing module has a search unit in which information used to access the database corresponding to the selected apparatus is set.

Alternatively, there is provided a printer driver comprising:

a processing module; and a database corresponding to a printer, wherein the processing module has a search unit in which information used to access the database corresponding to the selected printer is set.

Alternatively, there is provided a print control apparatus for executing an image process in accordance with an output apparatus, comprising:

generation means for generating a look-up table according to characteristic information of the output apparatus;

storage means for storing the generated look-up table in correspondence with an identifier of the output apparatus; and image processing means for executing a process such as correction, conversion, or the like for image data using the look-up table corresponding to the identifier.

Alternatively, there is provided a print control method for executing an image process in accordance with an output apparatus, comprising:

the generation step of generating a look-up table according to characteristic information of the output apparatus;

the storage step of storing the generated look-up table in correspondence with an identifier of the output apparatus; and the image processing step of executing a process such as correction, conversion, or the like for image data using the look-up table corresponding to the identifier.

Alternatively, there is provided a link information search apparatus comprising:

changed value storage means for storing changed information;

current value storage means for storing unchanged information;

link information storage means for storing link information required for optimizing the unchanged information upon the change;

reference information determination means for determining link information to be referred to for the optimization;

extraction condition setting means for setting a condition required for extracting link information from the link information storage means; and setup value information replace means for updating information stored in the current value storage means on the basis of the extracted link information.

Alternatively, there is provided a link information search method comprising:

the changed value storage step of storing changed information in a first memory;

the current value storage step of storing unchanged information in a second memory;

the link information storage step of storing in a third memory link information required for optimizing the unchanged information upon the change;

the reference information determination step of determining link information to be referred to for the optimization;

the extraction condition setting step of setting a condition required for extracting link information stored in the third memory; and the setup value information replace step of updating information stored in the second memory on the basis of the extracted link information.

Alternatively, there is provided a computer readable storage medium storing a program for searching for and updating link information to optimize unchanged information upon changing information, the program comprising:

a code of the changed value storage step of storing changed information in a first memory;

a code of the current value storage step of storing unchanged information in a second memory;

a code of the link information storage step of storing in a third memory link information required for optimizing the unchanged information upon the change;

a code of the reference information determination step of determining link information to be referred to for the optimization;

a code of the extraction condition setting step of setting a condition required for extracting link information stored in the third memory; and a code of the setup value information replace step of updating information stored in the second memory on the basis of the extracted link information.

Alternatively, there is provided a link information setting apparatus comprising:

acquisition means for acquiring an ID of a link information storage section corresponding to a changed item;

setting means for setting an extraction condition of the link information storage section having the acquired ID;

extraction means for extracting link information from the link information storage section having the acquired ID in accordance with the set extraction condition; and change means for changing a setup value when the setup value is different from the extracted link information.

Alternatively, there is provided a link information setting method comprising:

the acquisition step of acquiring an ID of a link information storage section corresponding to a changed item;

the setting step of setting an extraction condition of the link information storage section having the acquired ID;

the extraction step of extracting link information from the link information storage section having the acquired ID in accordance with the set extraction condition; and the change step of changing a setup value when the setup value is different from the extracted link information.

Alternatively, there is provided a storage medium storing a program code for making computer execute a link information setting method, the program code comprising:

a code of the acquisition step of acquiring an ID of a link information storage section corresponding to a changed item;

a code of the setting step of setting an extraction condition of the link information storage section having the acquired ID;

a code of the extraction step of extracting link information from the link information storage section having the acquired ID in accordance with the set extraction condition; and a code of the change step of changing a setup value when the setup value is different from the extracted link information.

Alternatively, there is provided a print control apparatus comprising:

storage means for storing identification information for identifying print conditions, and paper size-dependent parameters based on the identification information; and margin information generation means for searching for the stored identification information and parameters in accordance with print information, and generating corresponding margin information.

Alternatively, there is provided a print control method comprising:

the storage step of storing in a memory identification information for identifying print conditions, and paper size-dependent parameters based on the identification information; and the margin information generation step of searching for the stored identification information and parameters stored in the memory in accordance with print information, and generating corresponding margin information.

Alternatively, there is provided a storage medium storing a program for offering margin information for print control, the program comprising:

a code of the storage step of storing in a memory identification information for identifying print conditions, and paper size-dependent parameters based on the identification information; and a code of the margin information generation step of searching for the stored identification information and parameters stored in the memory in accordance with print information, and generating corresponding margin information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing the concept of a plurality of tables LUT1;

FIG. 5 is a view showing actual color correction/color conversion tables of a plurality of tables LUT2;

FIG. 6 is a view showing actual grayscale correction/dither matrix tables of the plurality of tables LUT2;

FIG. 11 is a view showing actual color correction/color conversion tables of the plurality of tables LUT2, the contents of which have changed;

FIG. 24 is a view showing the database file names corresponding to head IDs;

FIG. 33 shows an example of changed item and setup value information;

FIG. 34 shows an example of data stored in a current value storage unit;

FIG. 35 shows the IDs and their contents in a link information storage unit;

FIG. 36 shows an example of extraction conditions set in units of IDs;

FIG. 37 shows an example of list data of IDs of the link information storage unit, which must be referred to;

FIG. 40 shows an example of the contents of link information storage section 1 (reference media correction table);

FIG. 41 shows an example of the contents of link information storage section 2 (medium correspondence table);

FIG. 42 shows an example of the contents of link information storage section 3 (grayscale correspondence table);

FIG. 43 shows an example of the contents of link information storage section 4 (quality-level correspondence table);

FIG. 44 shows an example of the contents of link information storage section 5 (quality message-binarization method correspondence table);

FIG. 45 shows an example of the contents of link information storage section 6 (resolution correspondence table);

FIG. 46 shows an example of link information stored in an extracted information storage unit;

FIG. 50 shows the structure of an index table;

FIGS. 51A to 51C show an example of the structures of data tables of respective table IDs.

DETAILED DESCRIPTION OF THE PREFERRED EMBODIMENTS

Prior to a detailed description of the embodiments, an outline of each embodiment will be explained first.

First and Second Embodiments (FIGS. 1 to 18)

An LUT used in conversion, color correction, and the like of an image in a printer driver is a table independent of a conversion unit, and maintenance of that table is made by an independent maintenance module. Furthermore, the table is divided into LUT1 that includes tables IDs corresponding to print modes, and LUT2 including actual tables for correction and conversion. By updating LUT2, the contents of a database can be updated.

Since the database used for image processes is separated, the need for re-compiling library modules that look up the database can be obviated.

Third to Fifth Embodiments (FIGS. 19 to 30)

Upon controlling a printer to print by a printer driver, color conversion, color correction, and grayscale correction are done. For this purpose, the printer driver generates a corrected LUT from rank information of printer heads and stores it in correspondence with a head ID. In an actual print process, the printer driver reads the head ID, converts an image using an LUT corresponding to the read ID, and sends data to the printer.

Sixth Embodiment (FIGS. 31 to 47)

Associated print parameters are stored as link information in correspondence with each other. Also, extraction conditions indicating the influences of a given parameter manipulated by the user on other parameters are separately stored. When a parameter value has been changed, a printer driver acquires link information which matches an extraction condition including that value, and sets setup items indicated by the link information in a selected state described in the link information.

Since a rewritable extraction condition is interposed between the item manipulated by the user and link information, the printer driver can flexibly cope with a change in link information.

Seventh Embodiment (FIGS. 48 to 52)

A printer driver makes a margin information offering unit generate margins of a paper sheet in a print process. The margin information offering unit searches an index table using as parameters the ON/OFF states of continuous paper and perforated paper as a paper condition given from the driver to obtain a table ID that matches the condition. The margin information offering unit loads a data table which describes margins in units of paper sizes on the basis of that table ID, and searches this data table using the paper size as a parameter given from the driver to determine margins. Upon receiving the determined margins, the driver starts a print process.

The preferred embodiments of the present invention will be described in detail hereinafter with reference to the accompanying drawings.

First Embodiment

Figure 1:
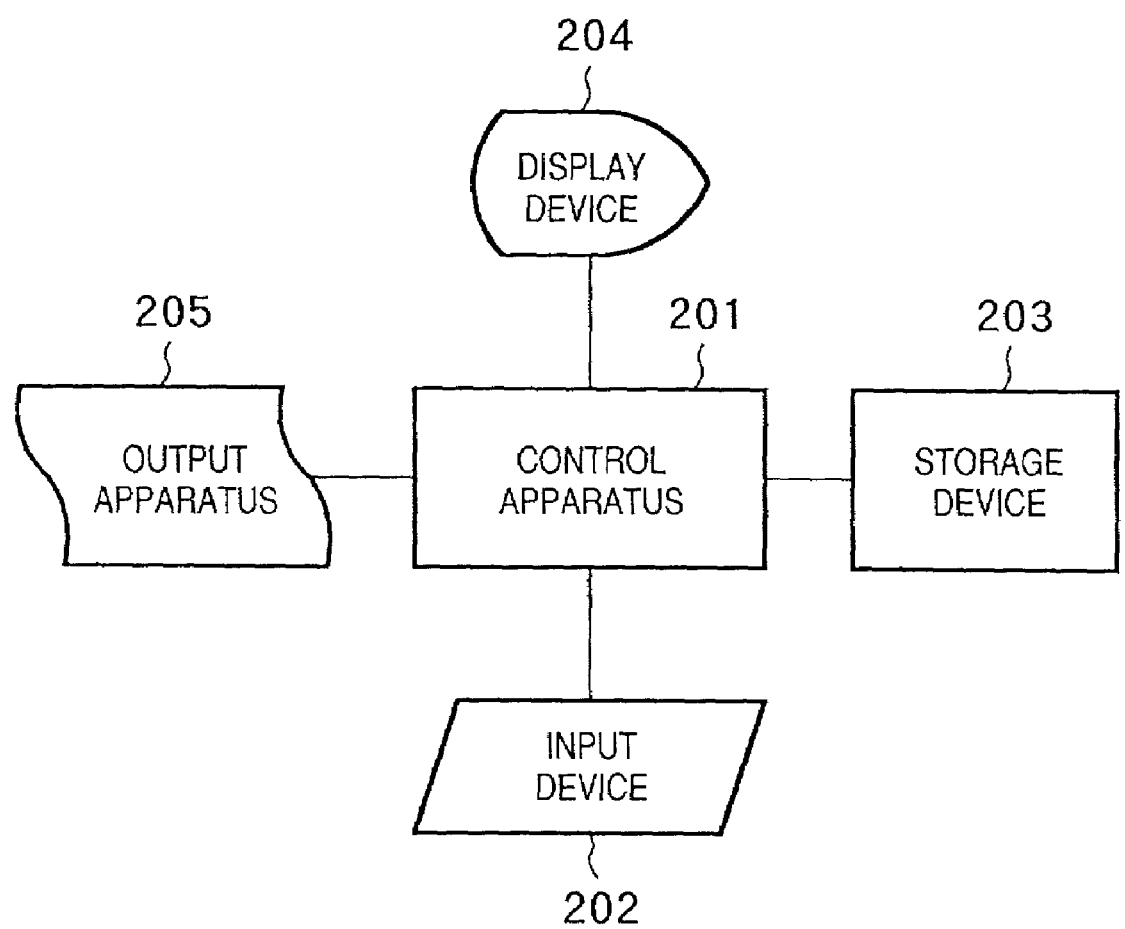
FIG. 1 is a block diagram showing the arrangement of an image processing system according to the first embodiment of the present invention.

FIG. 1 is a block diagram showing the arrangement of an image processing apparatus as an embodiment of a data conversion apparatus according to the present invention. In the following description of this embodiment, the data conversion apparatus is implemented by a printer driver program which generates print data to be sent to a printer in a print process.

Referring to FIG. 1, an output apparatus 205 can comprise, e.g., a color printer, which forms a color print on a print paper sheet using four color inks, i.e., yellow (Y), magenta (M), cyan (C), and black (K) inks. Note that the color printer may output six or seven colors, but an explanation of this embodiment will be given using four colors. Print data composed of Y, M, C, and K density data used in this output apparatus 205 are obtained by image processes executed by a control apparatus 201, and the image processes include color correction, color conversion, grayscale correction, quantization, and the like (to be described below).

<Arrangement of Computer System>

Figure 18:
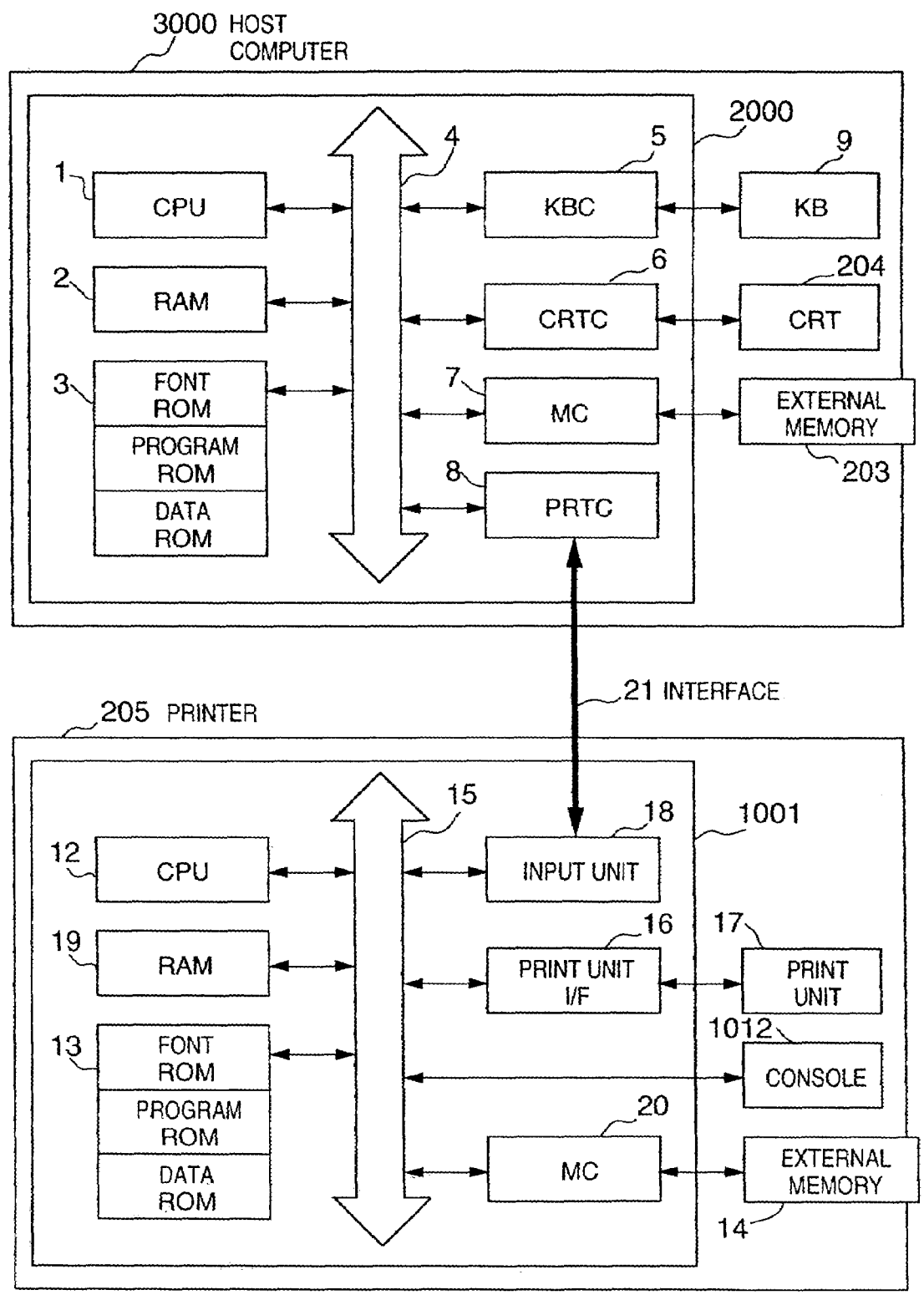
FIG. 18 is a block diagram of a computer system which is used to implement the present invention.

FIG. 18 is a block diagram of a computer system used when the image processing system shown in FIG. 1 is implemented by a computer. Note that all the first to seventh embodiments are applied to this computer system.

Referring to FIG. 18, a host computer 3000 serving as a control apparatus comprises a CPU 1 which processes a document including figures, images, characters, tables (including spreadsheets), and the like on the basis of a document processing program stored in a program ROM of a ROM 3, and systematically controls devices connected to a system bus 4. A RAM 2 serves as a main memory, work area, and the like of the CPU 1. A keyboard controller (KBC) 5 controls inputs from a keyboard 9 and a pointing device (not shown). A CRT controller (CRTC) 6 controls display on a CRT display 204. A disk controller (DKC) 7 controls access to an external memory 203 which includes a hard disk (HD), floppy disk (FD), and the like, and stores a boot program, various applications, font data, user files, edit files, and the like. A printer controller (PRTC) 8 is connected to a printer 205 via a predetermined two-way interface (two-way I/F) 21 and executes a communication control process with the printer 205. Note that the CPU 1 executes a rasterization process of outline fonts onto a display information RAM assured on, e.g., the RAM 2 to implement WYSIWYG (a function of matching the displayed contents with the print contents) on the CRT 204. Also, the CPU 1 opens various registered windows on the basis of commands instructed by a mouse cursor (not shown) or the like, and executes various data processes. Furthermore, a printer driver (to be described later) is implemented when the CPU 1 executes a predetermined program.

In the printer 205, a printer CPU 12 systematically controls access to various devices connected to a system bus 15 on the basis of a control program or the like stored in a program ROM of a ROM 13, and outputs an image signal as output information to a print unit (printer engine) 17 connected via a print I/F 16. The CPU 12 can communicate with the host computer via a two-way I/F 21, and can send information or the like in the printer with the host computer. A RAM 19 serves as a main memory, work area, and the like of the CPU 12. An input unit 18 controls exchange of status information such as print status information or the like with the host computer 3000 via the two-way I/F 21, and can send information or the like in the printer to the host computer 3000. A memory controller (MC) 20 controls access to an external memory 14 which includes a hard disk (HD), floppy disk (FD), and the like, and stores a boot program, various applications, font data, user files, edit files, and the like. A console 1012 includes a display panel and keyboard to offer information to the operator and allow the operator to input instructions.

<Arrangement of Software Module>

Figure 17:
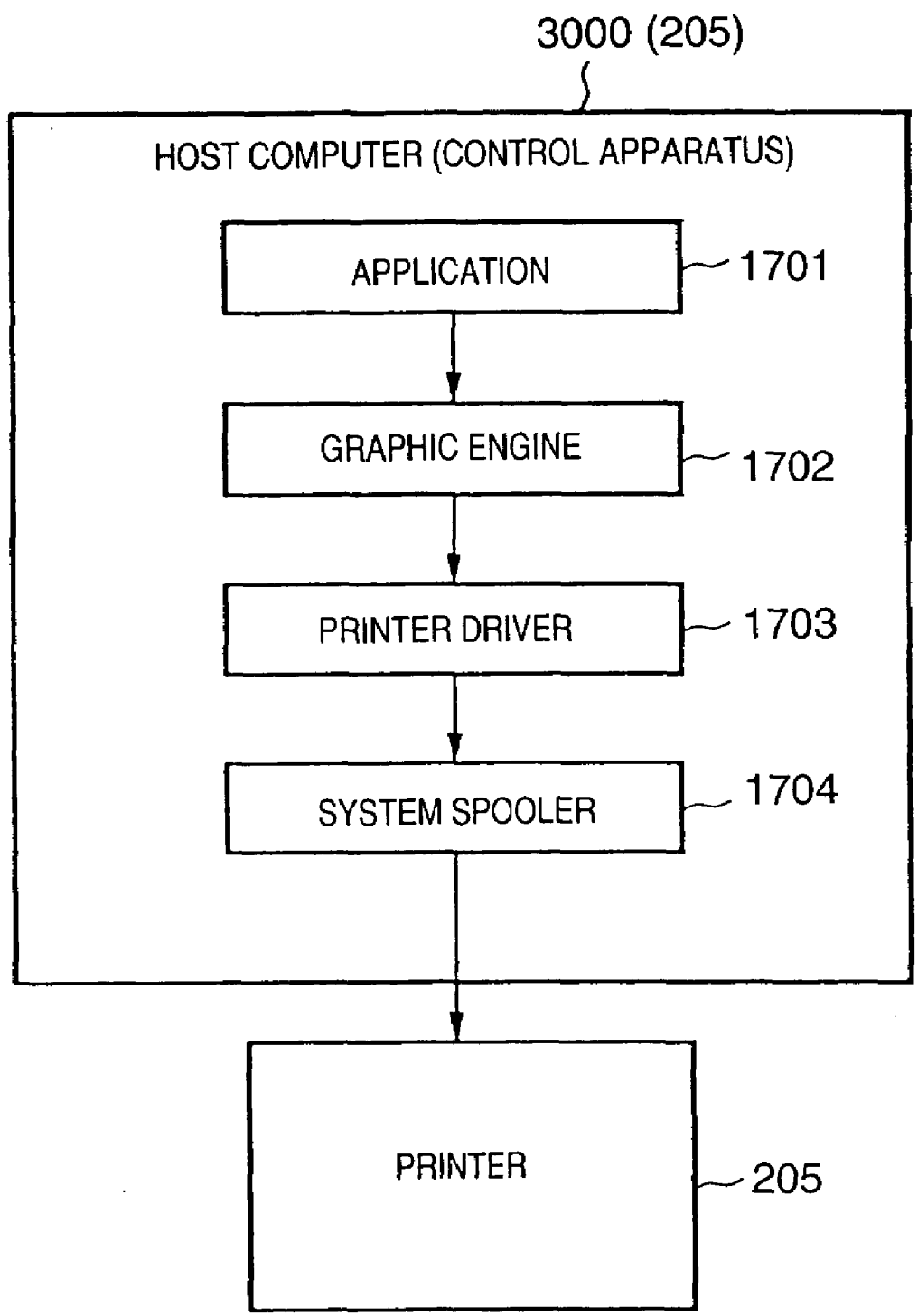
FIG. 17 is a block diagram of software modules for a print process.

FIG. 17 is a block diagram showing software modules that pertain to a print sequence executed by the control apparatus 201, i.e., the host computer 3000 shown in FIG. 18. FIG. 17 does not illustrate any modules that do not pertain to a print process. Also, FIG. 17 shows the software arrangement for all the first to seventh embodiments.

Referring to FIG. 17, an application 1701, graphic engine 1702, printer driver 1703, and system spooler 1704 are program modules which reside as files saved in the external memory 203 shown in FIG. 18, and are loaded onto the RAM 2 by an OS or a module that uses the corresponding module when they are executed.

The application 1701 and printer driver 1703 can be added to the HD of the external memory 203 via the FD of the external memory 203, a CD-ROM, or a network (not shown). The application 1701 saved in the external memory 203 is loaded onto the RAM 2 upon execution. When the application 1701 instructs the printer 205 to start a print process, it outputs (rasterizes) data using the graphic engine 1702, which has been similarly loaded onto the RAM 2 and is ready to use.

The graphic engine 1702 loads the printer driver 1703 which is prepared in units of print apparatuses from the external memory 203 onto the RAM 2, and sets the output from the application 1701 in the printer driver 1703. The graphic engine 1702 converts a GDI (Graphic Device Interface) function received from the application 1701 into a DDI (Device Driver Interface) function, and outputs the DDI function to the printer driver 1703.

The printer driver 1703 converts the DDI function received from the graphic engine 1702 into a control command, e.g., a PDL (Page Description Language) command that the printer can interpret. Also, the printer driver 1703 executes various processes for an image such as color correction, color conversion, resolution correction, and the like (to be described later). The converted printer control command is output as print data to the printer 204 via the system spooler 1704 which has been loaded onto the RAM 2 by the OS, and the I/F 21.

The print data output from the printer driver is temporarily input to the system spooler 1704, and is then output to the printer 205.

<Arrangement of Ink-Jet Printer>

Figure 16:
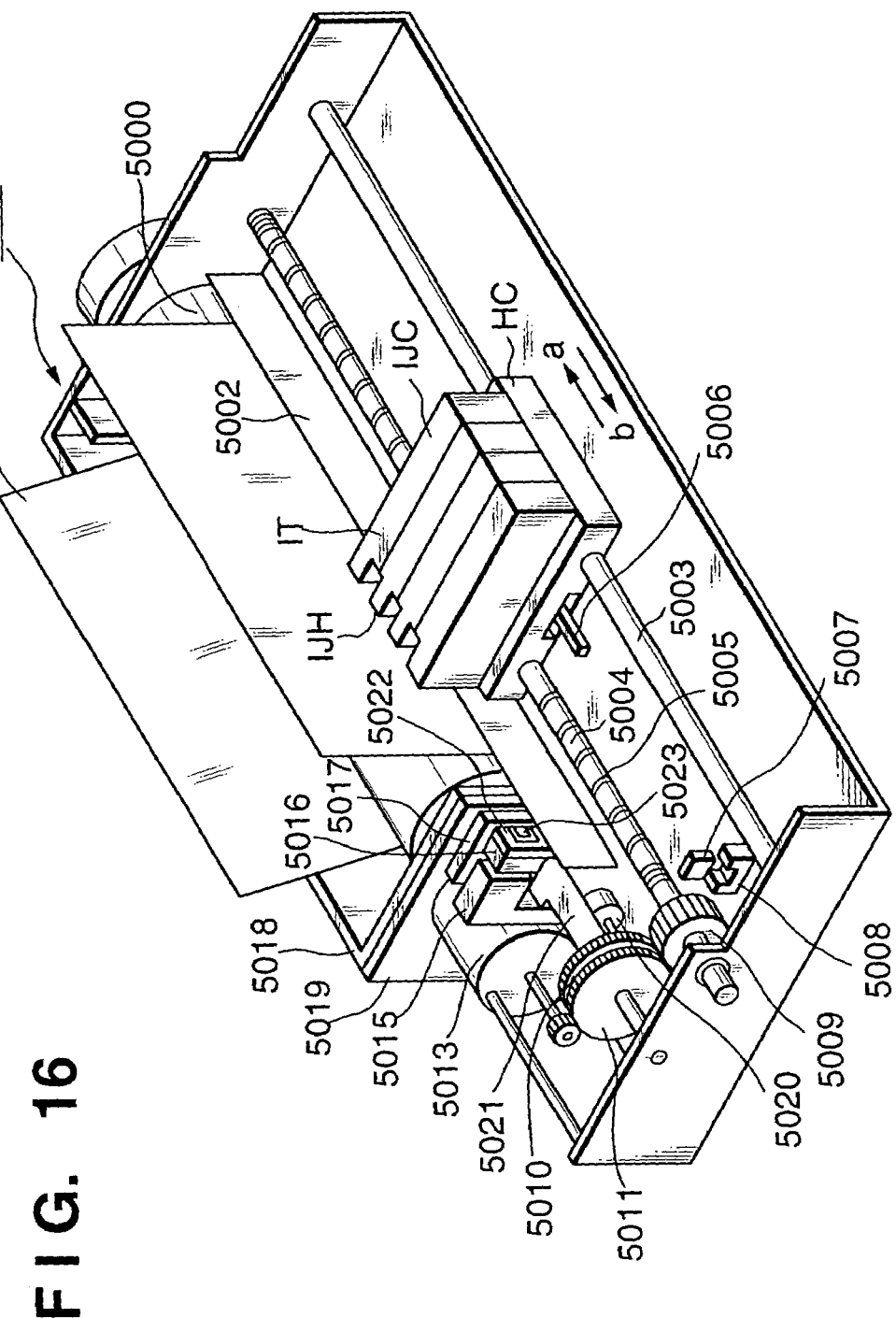
FIG. 16 is a perspective view showing the structure of an ink-jet printer.

FIG. 16 is a perspective view of an ink-jet printer IJRA as an example of the output apparatus 205. Note that the printer shown in FIG. 16 can be used as a printer in all the first to seventh embodiments.

Referring to FIG. 16, a lead screw 5004 rotates via driving force transmission gears 5011 and 5009 upon forward/reverse rotation of a driving motor 5013. A carriage HC, which engages with a spiral groove 5005 of the lead screw 5004, has a pin (not shown), and reciprocally moves in the directions of arrows a and b. Y (yellow), M (magenta), C (cyan), and Bk (black) ink-jet cartridges IJC are mounted on this carriage HC. A paper pressing plate 5002 presses a paper sheet against a platen 5000 along the moving direction of the carriage HC. Photocouplers 5007 and 5008 confirm the presence of a lever 5006 of the carriage in the corresponding region, and detect a home position where, e.g., the rotational direction of the motor 5013 is switched. A member 5016 supports a cap member 5022 that caps the front surface of each print head to attain suction recovery of print heads via an intra-cap opening 5023. A member 5019 holds a cleaning blade 5017 to be movable in the back-and-forth direction. These members are supported by a main body support plate 5018. The blade 5017 is not limited to such specific one, but a known cleaning blade can be applied to this embodiment. A lever 5021 initiates suction of the suction recovery. The lever 5012 moves upon movement of a cam 5020 which engages with the carriage, and its movement is controlled by a known transmission mechanism such as clutch switching by the driving force from a driving motor.

Referring to FIG. 1, the control apparatus 201 has a CPU which executes data processes that pertain to this system such as an image process (to be described later), an initialization process therefor, and the like, and operation control of respective mechanical components. The storage device 203 includes general external storage devices such as memories (ROM, RAM, or the like), a hard disk, a floppy disk, and the like, and stores a database including look-up tables which will be described later in an embodiment of the present invention, and a calculation segment.

For example, an image scanned by a scanner is stored in the storage device 203, and the operator of this system can desirably edit the image displayed on a display device 204 such as a CRT or the like by operation inputs from an input device 202 including a keyboard, mouse, and the like to obtain an image to be printed out by the output apparatus 205.

The image obtained by this system in this manner is expressed by grayscale data of luminance signals R, G, and B, and undergoes an image process so as to be converted into print data of the output apparatus 205.

Note that the scope of the present invention is not limited to the aforementioned specific system. For example, image processes (color correction, color conversion, grayscale correction, and quantization) are done in an apparatus such as a copying machine, as is well known, and the present invention can also be applied to such apparatus or system.

The color correction process in this case is that from 8-bit R, G, and B data into 8-bit R', G', and B' data. The color conversion process is that from 8-bit R', G', and B' data into 8-bit C, M, Y, and K data. The grayscale correction process is that from 8-bit C, M, Y, and K data into 8-bit C', M', Y', and K' data. The quantization process is that from 8-bit C', M', Y', and K' data into 1-bit c, m, y, and k data. The color correction, color conversion, grayscale correction, and quantization at that time are implemented using look-up tables (LUTs). These processes are executed by a printer control program, a so-called printer driver, which is prepared in units of printer models.

<Structure of Database File>

Figure 2:
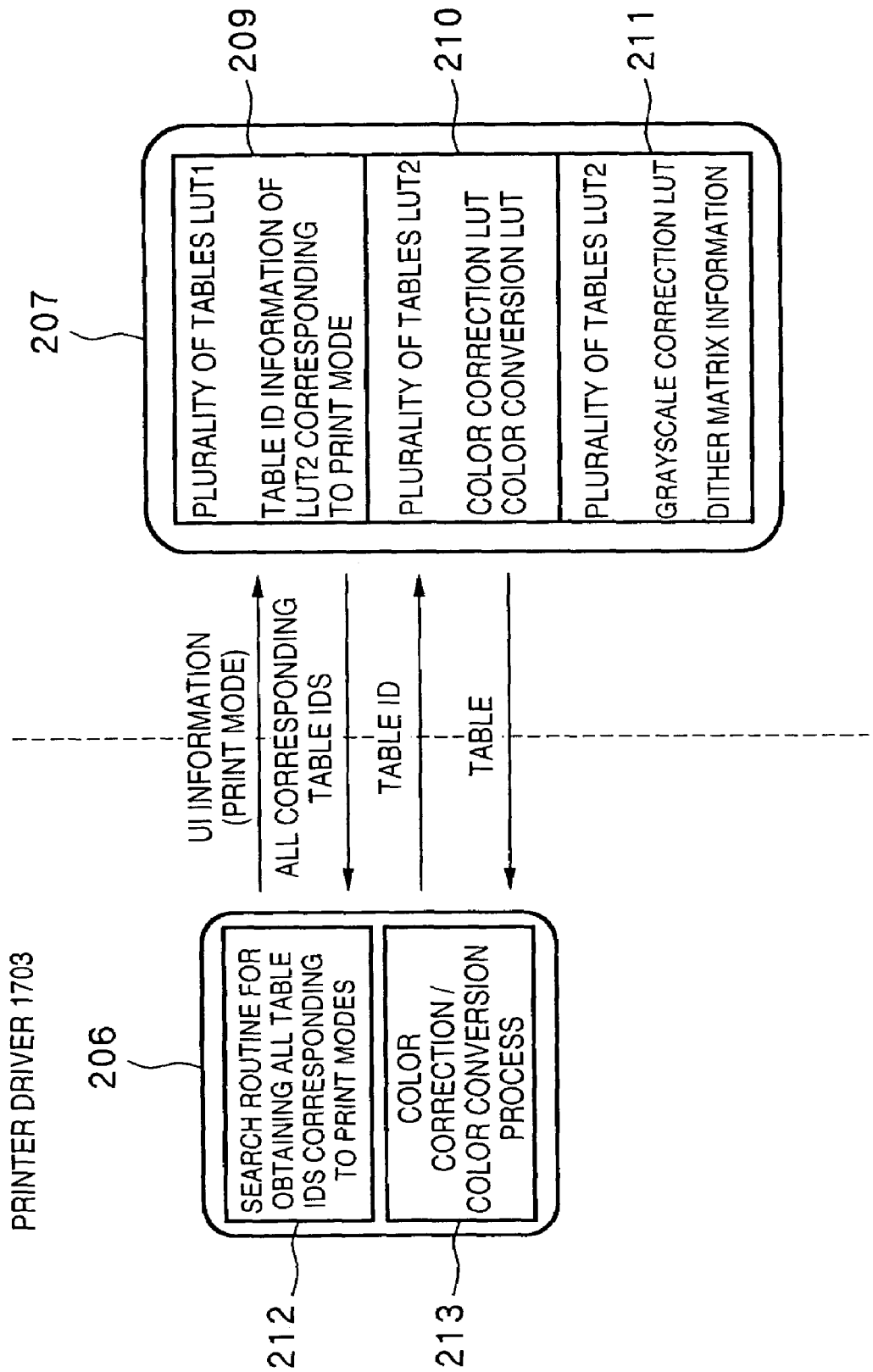
FIG. 2 shows the relationship between a database file and color correction/color conversion module.
Figure 3:
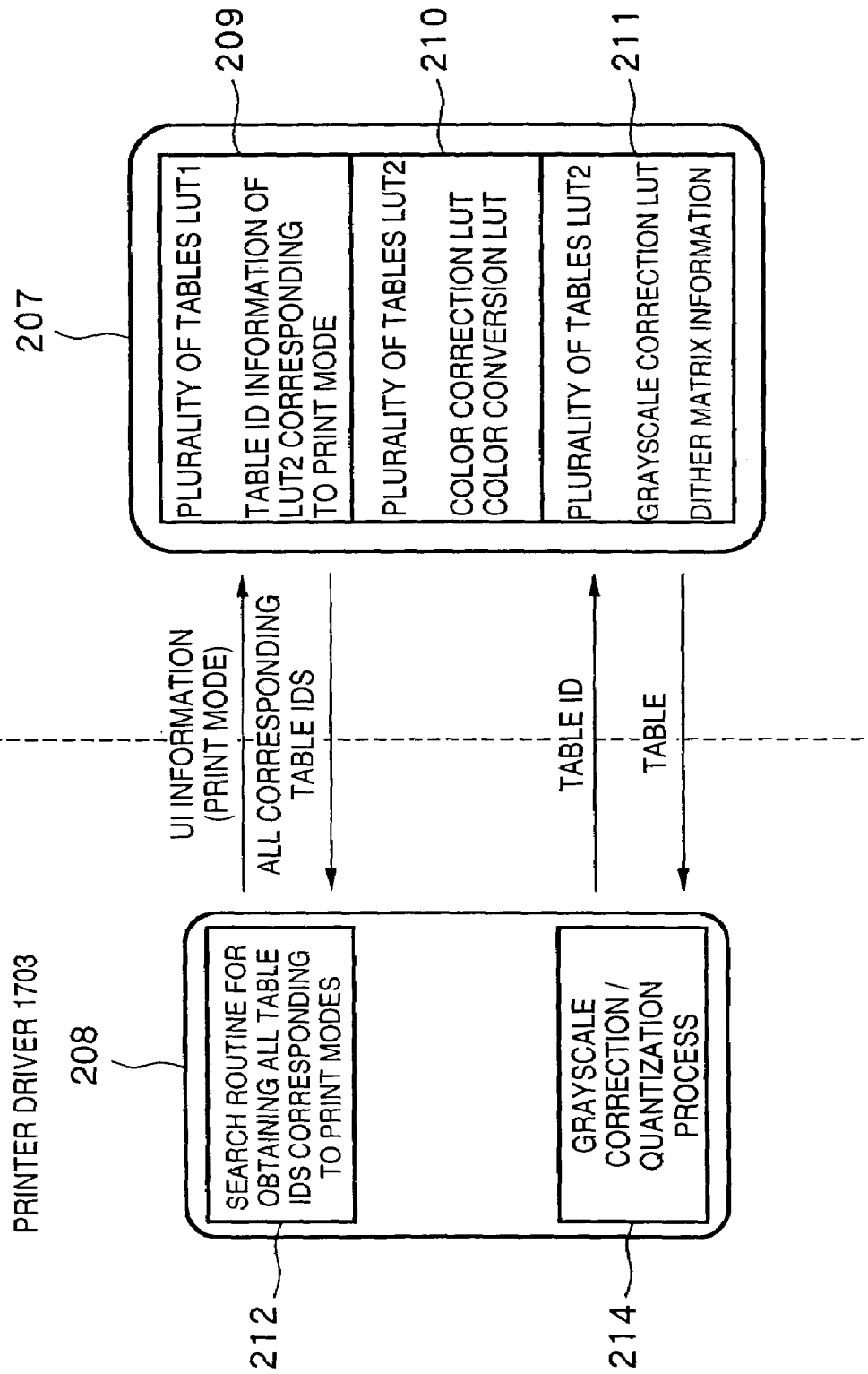
FIG. 3 shows the relationship between a database file and grayscale correction/quantization module.

FIGS. 2 and 3 show the concept of the present invention.

Referring to FIG. 2, a color correction/color conversion module 206 includes a search routine section (table ID search section) 212 for obtaining all table IDs for print modes, and a color correction/color conversion processing section 213. Also, referring to FIG. 3, a grayscale correction/quantization module 208 includes a search routine section (table ID search section) 212 for obtaining all table IDs for print modes, and a grayscale correction/quantization processing section 214. The "search routines for obtaining all table IDs for print modes" included in both the modules are identical functions. In FIGS. 2 and 3, a database 207 is a database file including model-dependent information of a printer, and FIGS. 2 and 3 illustrate the same one. The database file 207 includes a search table LUT1 (209) including table IDs which correspond to print modes designated by user interface (UI) information and are required for various modules, and actual tables LUT2 (210, 211) used by various modules. Note that the UI information includes print conditions and the like input by the user.

A table 215 shown in FIG. 4 is an example of the LUT1 (209) shown in FIG. 2, and consists of a plurality of tables LUT1 (tables including all table IDs corresponding to print modes). Referring to FIG. 4, the table 215 includes a print mode section 215a and table ID section 215b. The print mode section 215a lists combinations of the paper type (normal paper/OHP paper), quantization method (error diffusion/dithering), and print quality (best quality/middle quality) as keys. The table ID section 215b includes table IDs as identifiers of color correction tables, color conversion tables, grayscale correction tables, and dither matrix tables in correspondence with the print modes.

A table 216 shown in FIG. 5 is an example of the LUT2 (211) shown in FIG. 3, and includes a plurality of tables LUT2 (color correction table IDs, color conversion table IDs). A table 217 shown in FIG. 6 includes a plurality of tables LUT2 (grayscale correction table IDs, dither matrix table IDs). These tables 216 and 217 respectively include table ID sections 216a and 217a, and actual table sections 216b and 217b.

<Database Search>

In order to acquire an LUT used in image correction or conversion, the printer driver determines a print mode (e.g., paper type: normal paper, print quality: best quality, quantization: error diffusion) on the basis of setups included in the UI information, and passes that print mode to the color correction/color conversion module. The color correction/color conversion module searches for the passed print mode using the table ID search section 212 included therein, and loads a table LUT1 including the color correction table ID and color conversion table ID corresponding to the passed print mode from the database file 209. The color correction/color conversion module searches the table 210 for the color correction and color conversion table IDs included in the loaded table, and loads actual tables corresponding to these table IDs from the plurality of tables LUT2 (210) as those actually used thereby. The color correction/color conversion module then executes a normal color correction/color conversion process using the loaded tables LUT2.

Likewise, the grayscale correction/quantization module executes processes along the same flow. That is, the printer driver passes a print mode (e.g., paper type: normal paper, print quality: best quality, quantization: error diffusion) determined based on the setups included in the UI information to the grayscale correction/quantization module. The grayscale correction/quantization module loads tables LUT1, which include the grayscale correction table ID and dither matrix table ID corresponding to the determined print mode, from the database file 209 using the table ID search section 212 included therein. The grayscale correction/quantization module searches the table 211 using the gradation correction and dither matrix table IDs included in the loaded tables, and loads tables LUT2 actually used thereby from the plurality of tables LUT2 (211). The grayscale correction/quantization module then executes a normal gradation correction/quantization process.

<Print Process Sequence>

Figure 7:
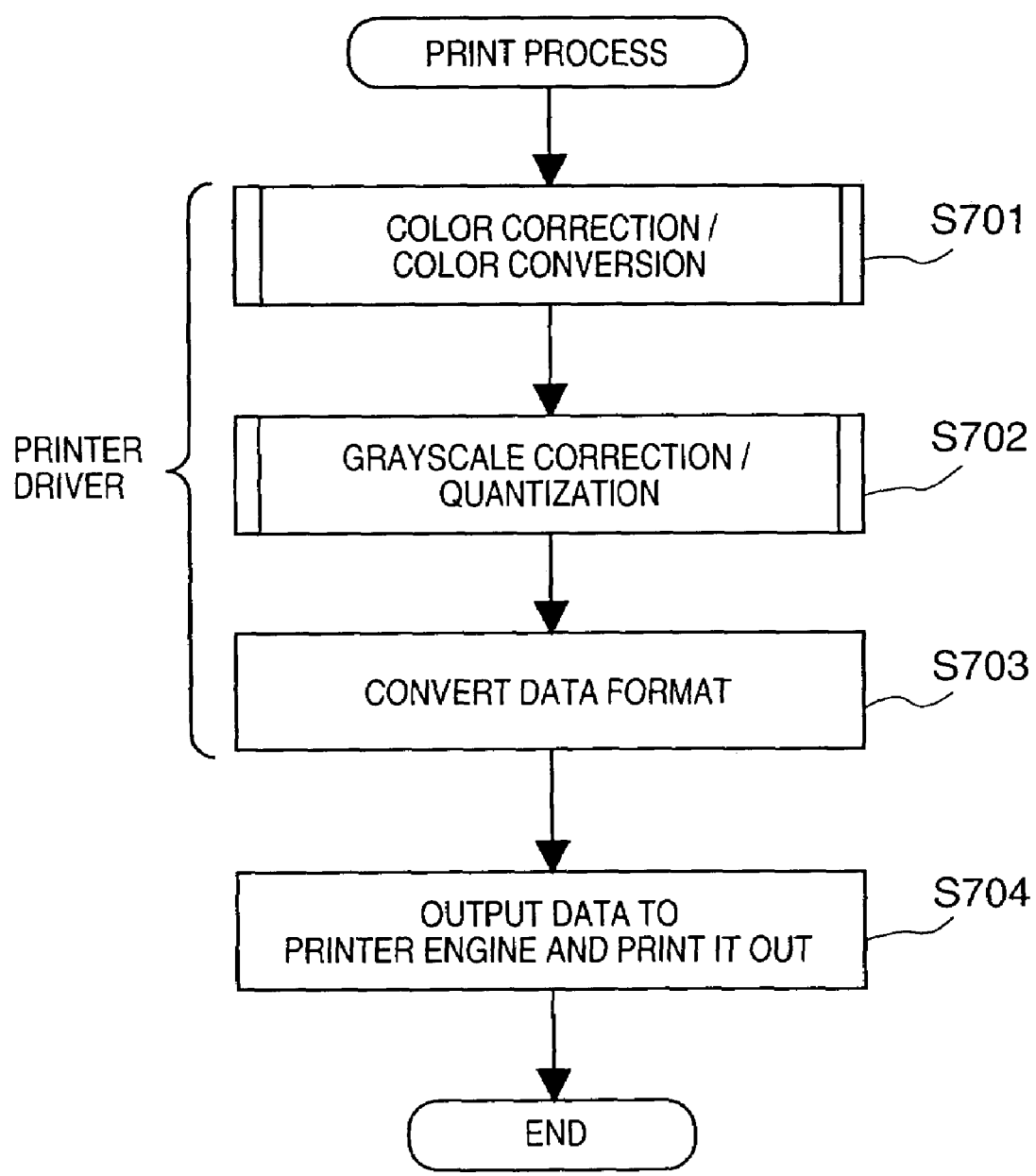
FIG. 7 is a flow chart of a print process sequence.

FIG. 7 is a flow chart showing the print process sequence by the print system shown in FIG. 1. In FIG. 7, steps S701 to S703 are processes executed by the printer driver. When the user instructs a print process and inputs required information (e.g., paper type, print quality, quantization method) and the like, the process shown in FIG. 7 starts. Image data to be printed undergoes a color correction/color conversion process (step S701). The image data then undergoes grayscale correction/quantization (step S702), and is compressed or its data format is converted into a format that the printer can interpret, as needed (step S703). Upon completion of these processes by the printer driver, the image data is sent to the printer shown in FIG. 16, and is printed (step S704).

Figure 8:
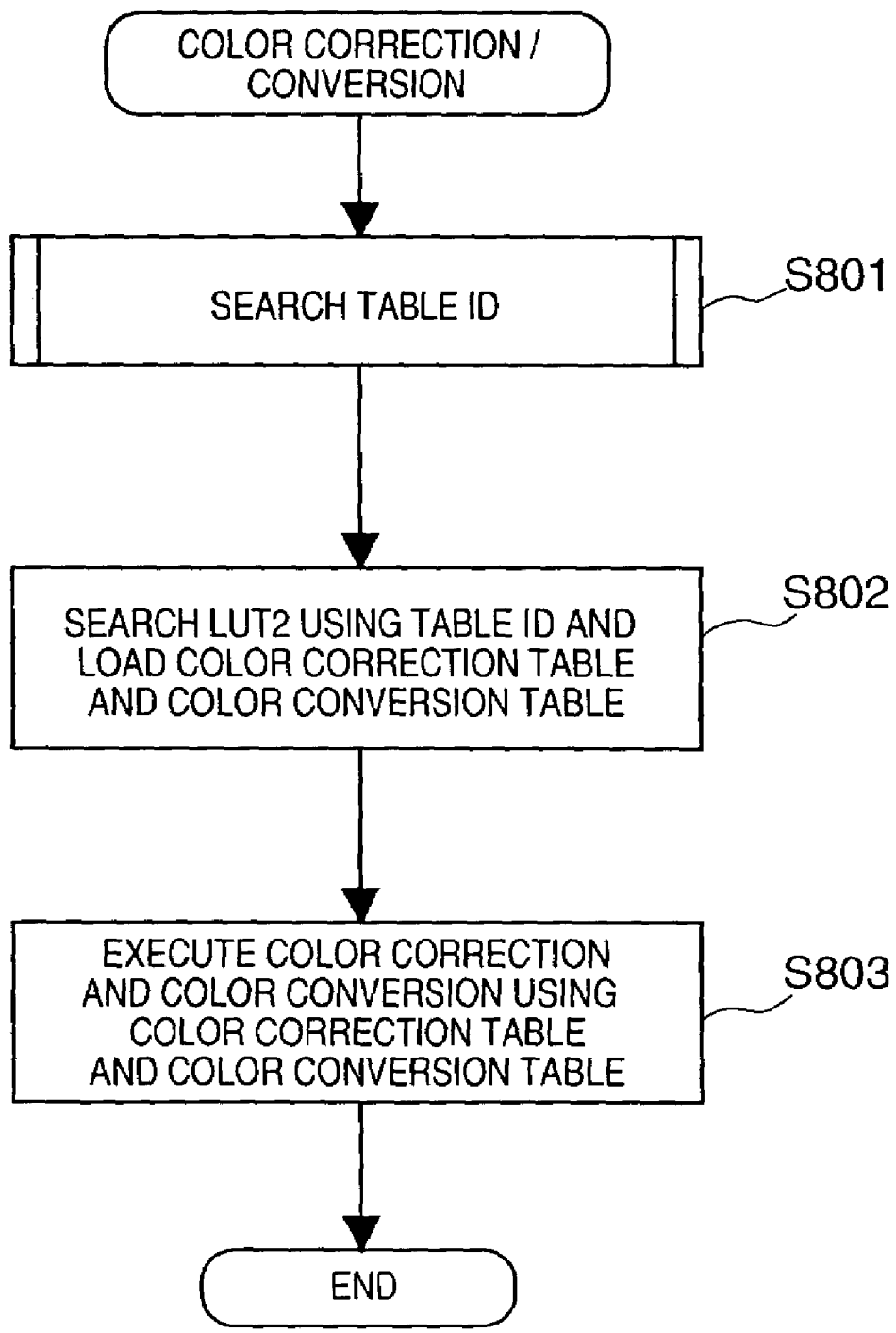
FIG. 8 is a flow chart of a color correction/color conversion process.

FIG. 8 is a flow chart showing the processing sequence executed by the color correction/color conversion module 206, and this process corresponds to step S701 in FIG. 7. The table ID search section 212 searches the table 209 for a table ID using the print mode as a key (step S801). If the table ID is obtained, the color correction/color conversion module searches the tables (the plurality of tables LUT2) 210 using that table ID and loads a color correction table and color conversion table corresponding to the table ID onto a memory (step S802). The color correction/color conversion module executes color correction and color conversion using the loaded color correction and color conversion tables (step S803).

Figure 9:
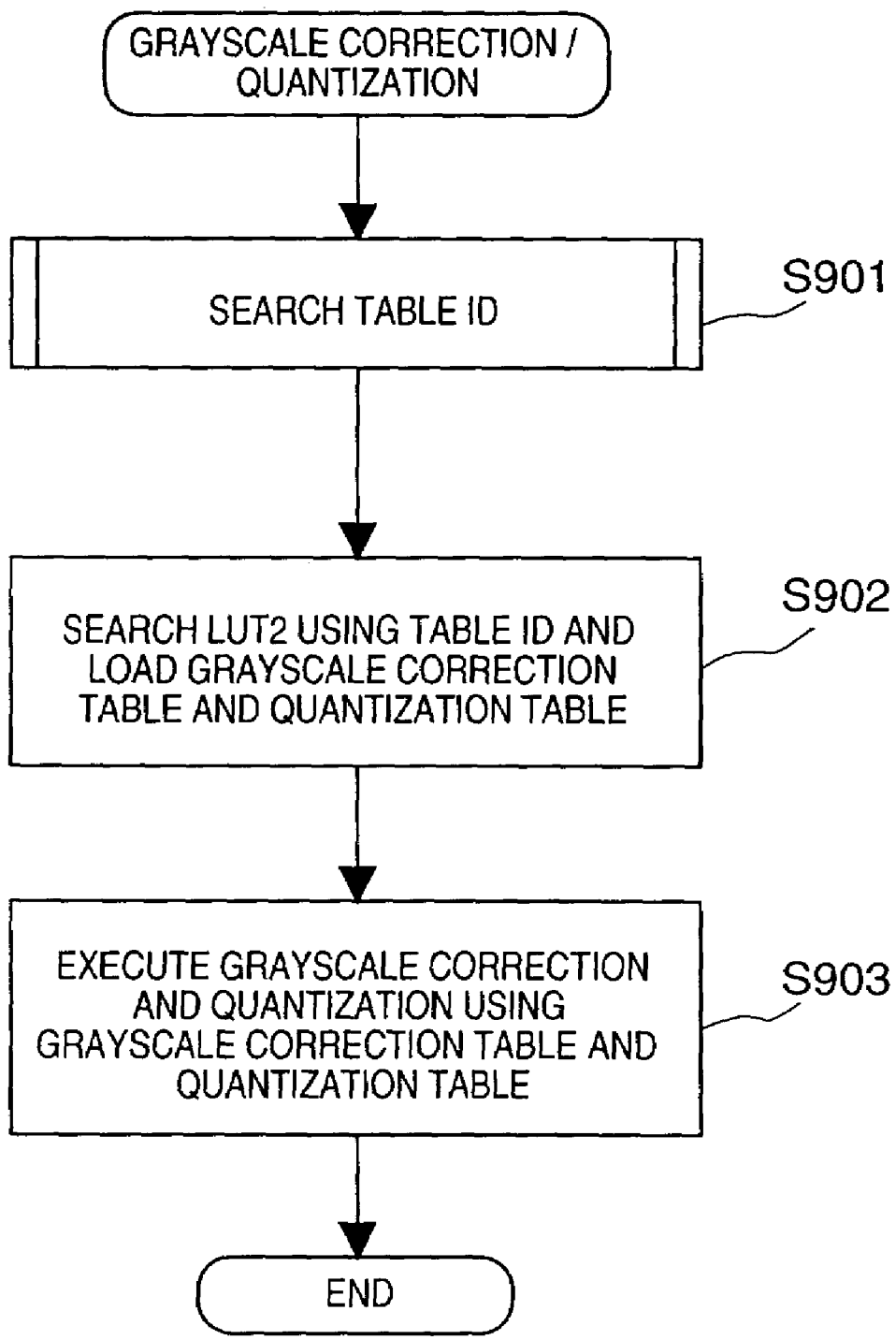
FIG. 9 is a flow chart of a grayscale correction/quantization process.

FIG. 9 is a flow chart showing the processing sequence executed by the grayscale correction/quantization module 208, and this process corresponds to step S702 in FIG. 7. The table ID search section 212 searches the table 209 for a table ID using the print mode as a key (step S901). If the table ID is obtained, the grayscale correction/quantization module searches the tables (the plurality of tables LUT2) 211 using that table ID and loads a grayscale correction table and quantization table (dither matrix table) corresponding to the table ID onto a memory (step S902). The color correction/color conversion module executes color correction and color conversion using the loaded grayscale correction and quantization tables (step S903).

Figure 10:
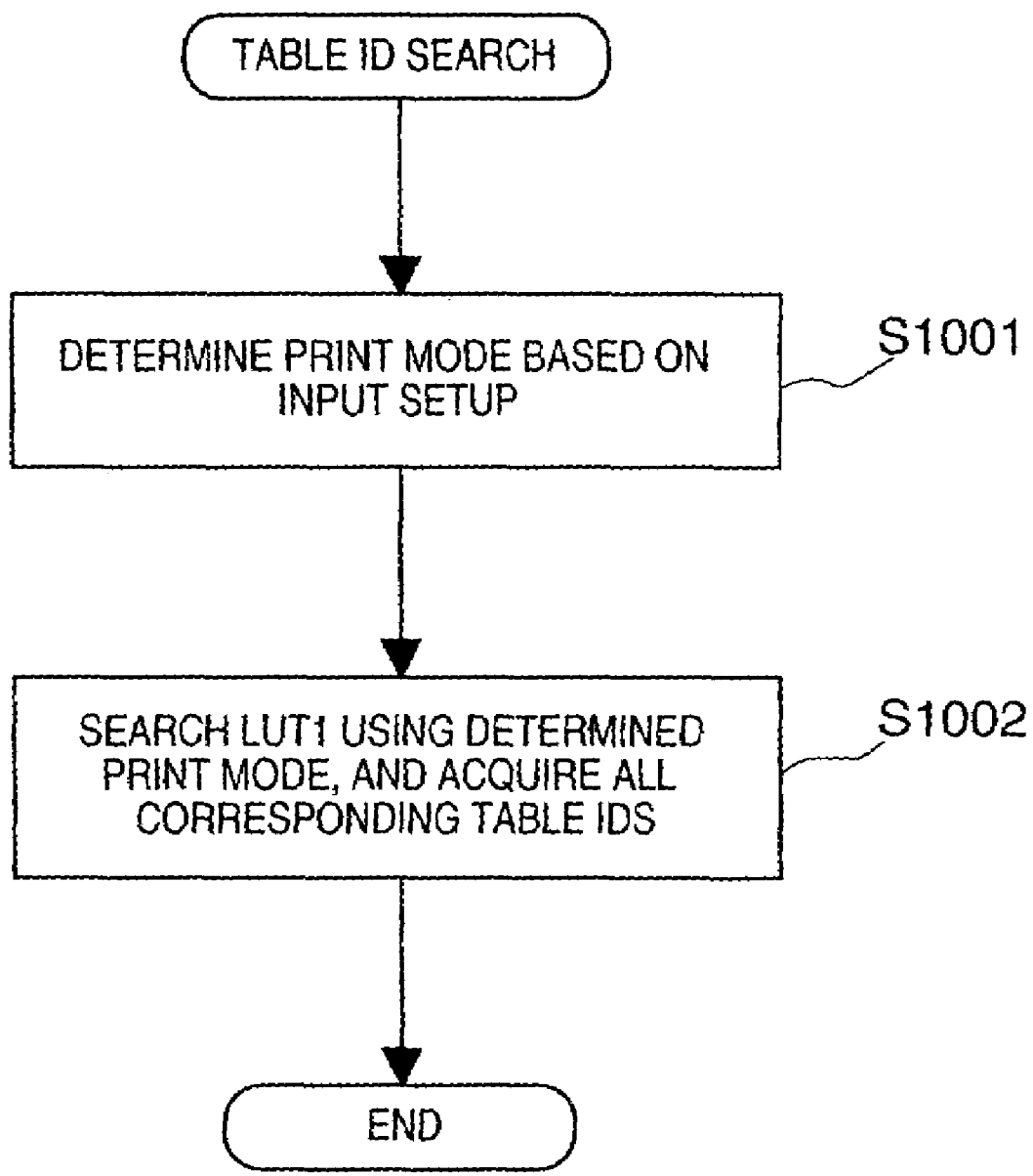
FIG. 10 is a flow chart of a table ID search process.

FIG. 10 is a flow chart showing the table ID search process in step S801 in FIG. 8 and step S901 in FIG. 9. A print mode is determined based on the input UI information (step S1001), and LUT1 is searched using the determined print mode to acquire all corresponding table IDs (step S1002). This sequence is done by the table ID search section 212.

In this manner, the look-up tables are held as a database independently from the respective correction and conversion modules, and are searched to obtain a look-up table corresponding to the print mode, thus executing correction and conversion.

<Maintenance of Look-Up Table>

FIG. 11 shows an example wherein the contents of the look-up table have been changed. Referring to FIG. 11, a look-up table 2181 corresponding to table ID "color correction table 01" in the table 218 has been updated. For example, assume that tincture for a given print mode is to be corrected upon revising the printer driver. In this case, in the conventional printer driver, since a color correction module and color conversion module respectively hold color correction tables and color conversion tables, i.e., since those tables are looked up by only the module that uses the tables, these modules must be changed upon correcting tincture. By contrast, according to the present invention, tincture can be corrected by changing the color correction table and color conversion table included in the database without changing the color correction module and color conversion module, as shown in FIG. 11.

Figure 12:
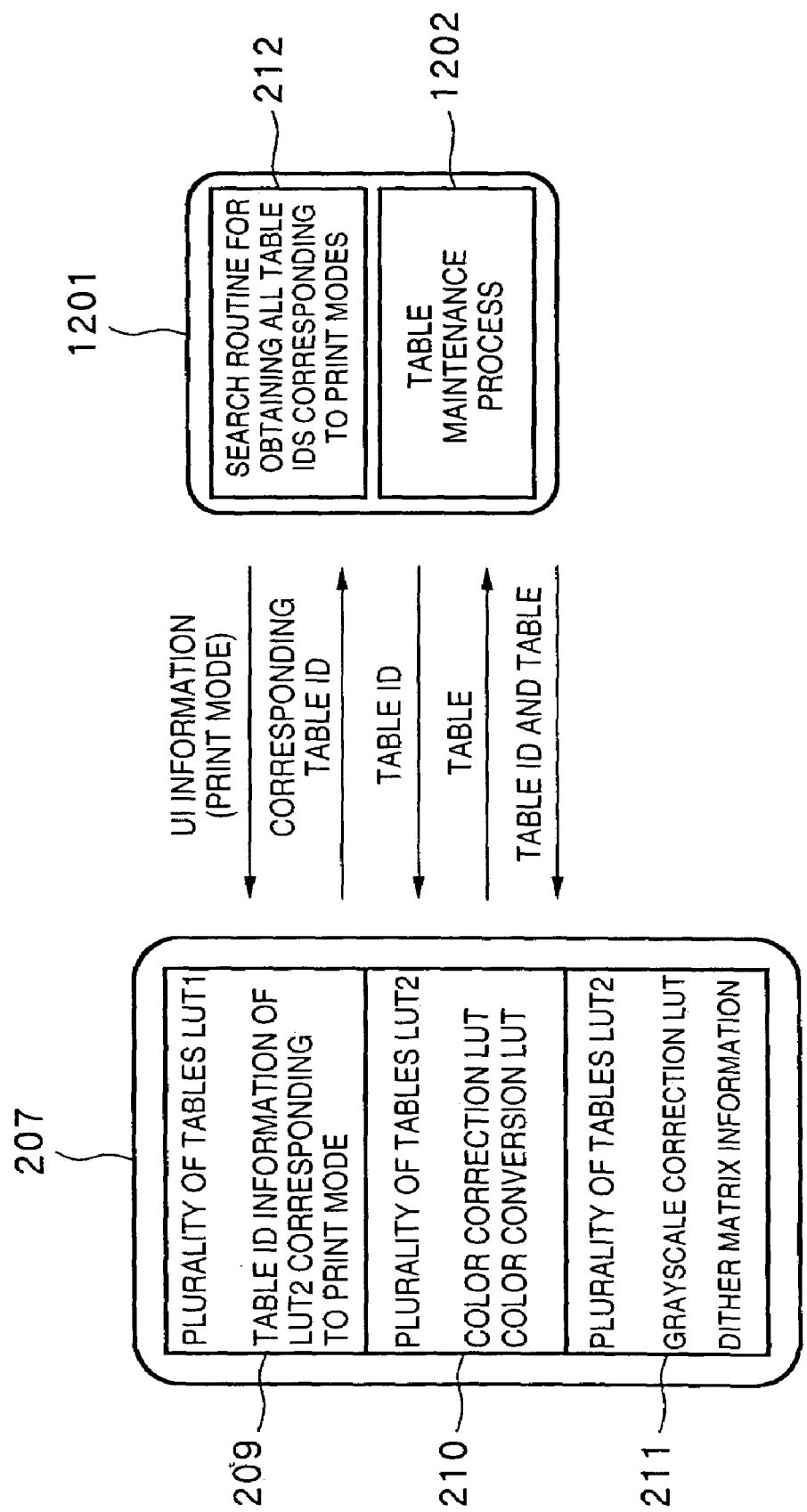
FIG. 12 shows the relationship between a database file and database maintenance module.

FIG. 12 shows a database maintenance module 1201 and the database 207. Upon maintenance as well, in order to acquire a table to be maintained, the table ID search section 212 searches a table ID, and a look-up table is acquired based on the table ID. A table maintenance module 1202 performs maintenance required for the acquired table, and writes back that table at an original position corresponding to the table ID.

Figure 13:
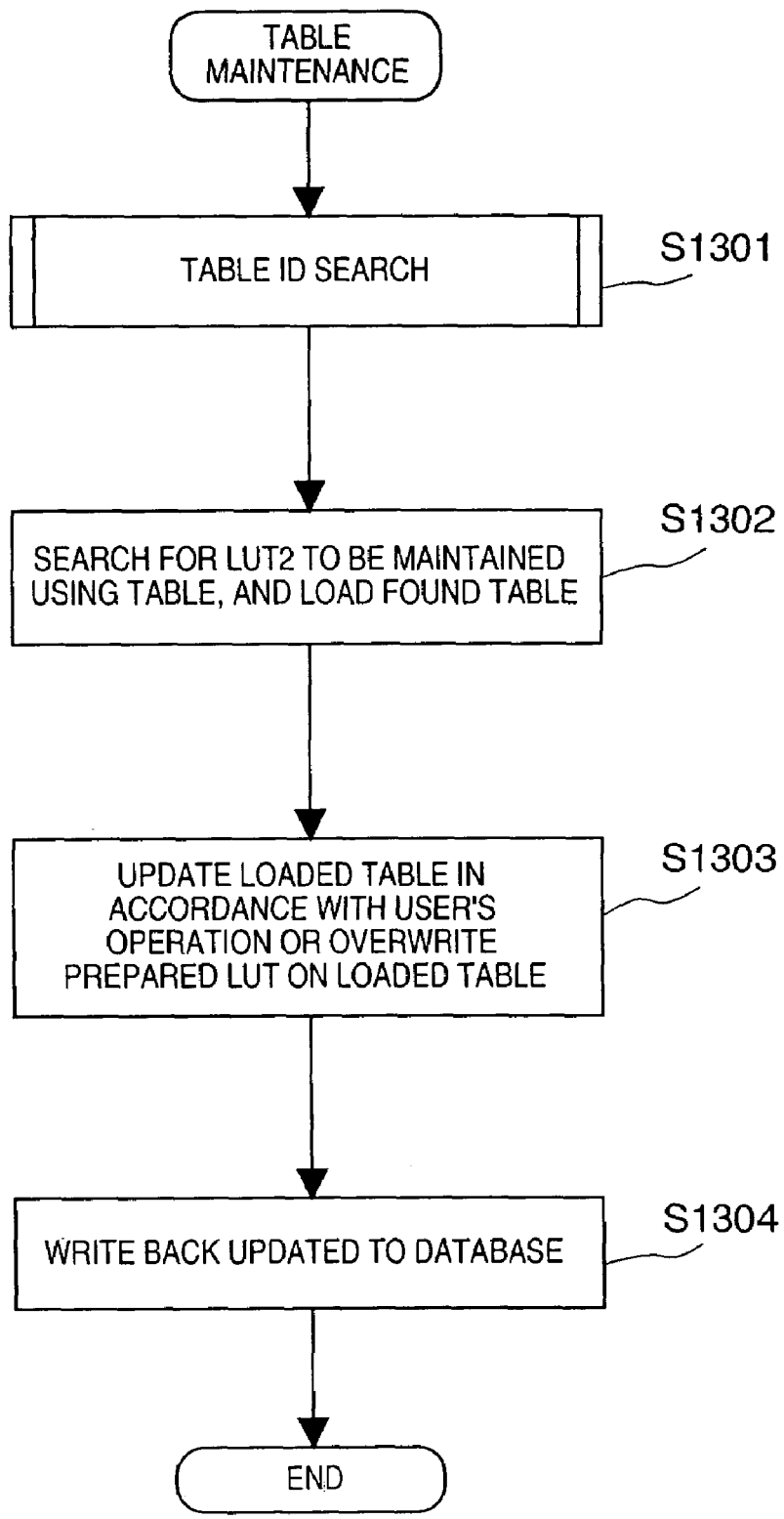
FIG. 13 is a flow chart of a database maintenance process.

FIG. 13 is a flow chart showing the table maintenance sequence. A table ID is searched in the sequence shown in FIG. 10 (step S1301), and a table LUT2 to be maintained, i.e., the entity of the table, is searched using the acquired table ID and is loaded (step S1302). The loaded table is updated by user's operations or by overwriting a separately prepared table thereon (step S1303). Finally, the updated look-up table is written back in the database as a table corresponding to that table ID (step S1304).

As described above, according to this embodiment, since the database file is divided into two groups LUT1 and LUT2, and the LUT1 includes table IDs for determining the LUT2, the LUT2 is indirectly accessed by each module which uses the table. In this manner, the color correction/color conversion module, and the grayscale correction/quantization module never directly access the LUT2 inside these modules.

For this reason, the address of an LUT looked up in the module can be prevented from being changed upon maintenance of the database, and maintenance of the database can be done independently of that of modules which use the database. Also, the need for changing the correction and conversion modules can be obviated upon maintenance of look-up tables, and labors required upon maintenance of the database such as change procedures, test procedures, and the like can be saved. Since the respective modules need not be changed, inconsistency (e.g., the LUT has been updated in a given module but not in another module) among modules can be prevented.

On the other hand, printer driver programs for controlling a plurality of models of printers may use a common image processing module, and other control modules and look-up tables that pertain to image processes such as color correction, color conversion, grayscale correction, quantization, and the like may be provided in units of printer models. In this case, the common image processing module is used, but look-up tables corresponding to a given printer model are loaded. In this manner, the time and cost required for developing model-dependent image processing module programs can be saved.

In this embodiment, table entries have been explained as look-up tables used in image processes. However, the present invention is not limited to the image processes. For example, when data and tables registered in a database are used from a given program, the present invention can be applied using these data and tables as entries of the database.

Second Embodiment

Figure 14:
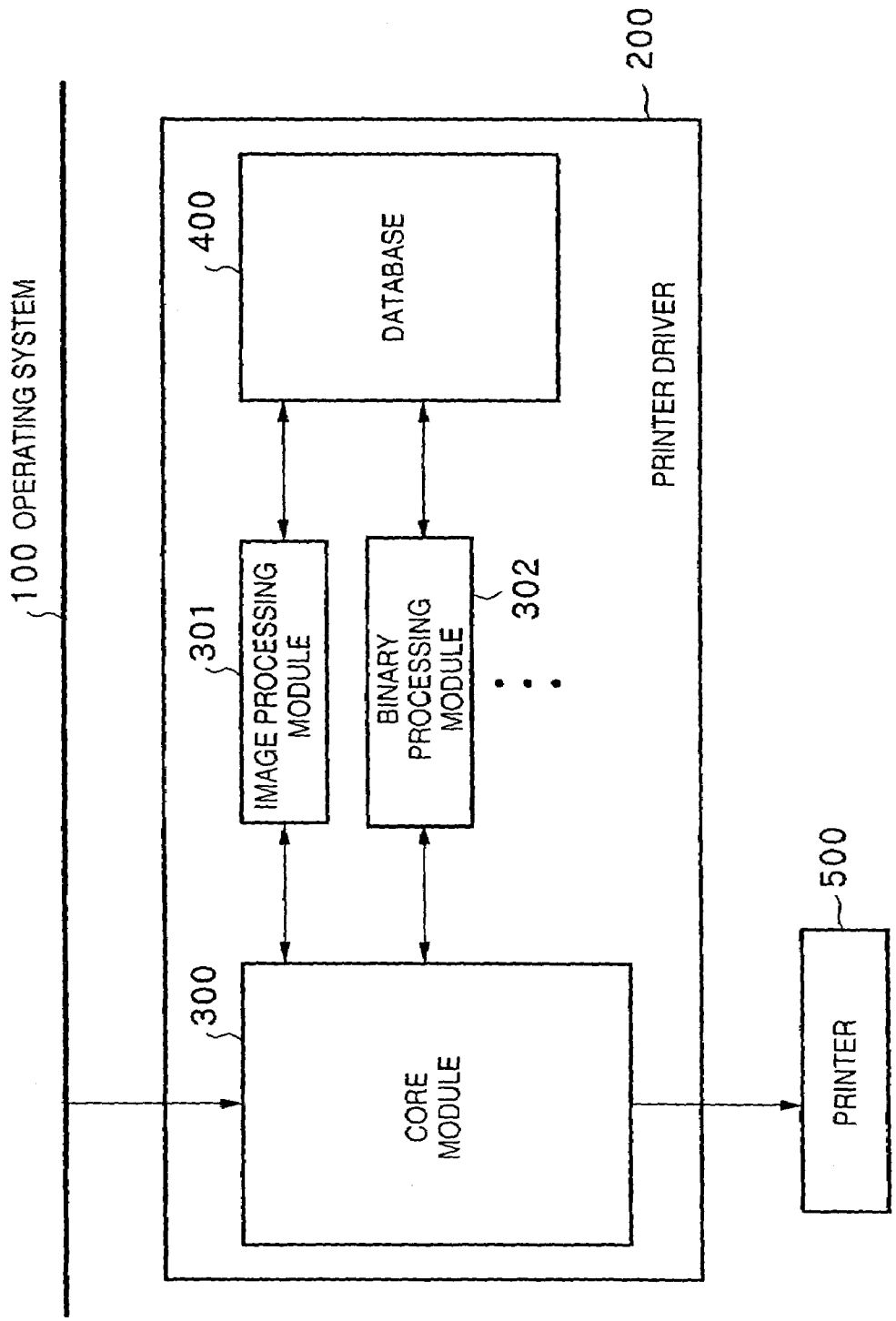
FIG. 14 is a schematic block diagram showing an example of the arrangement of a printer driver according to the second embodiment of the present invention.

FIG. 14 is a schematic diagram showing an example of the arrangement of a printer driver 200 according to the second embodiment of the present invention.

A printer driver 200 generates print data on the basis of image data acquired from an operating system 100, and sends it to a printer 500. The printer driver 200 is mainly comprised of a core module 300 which exchanges data with the operating system 100 and printer 500, controls a user interface, and so forth, and library modules prepared in units of functions such as an image processing module 301, binary processing module 302, and the like. In case of the printer driver, the library modules are called by the core module 300. In this case, each library module receives information such as the type of print paper, print mode, and the like from the core module 300. Each library module searches a database 400 for a look-up table, output gamma table, and the like on the basis of various kinds of information received from the core module 300, and executes a process to obtain an appropriate print result.

Note that the database 400 combines look-up tables required for the image processing module 301, binary processing module 302, and the like, and has the same structure as the database in the first embodiment, which has been exemplified in FIGS. 4 to 6.

The arrangement of a library module will be explained below taking the image processing module as an example.

Figure 15:
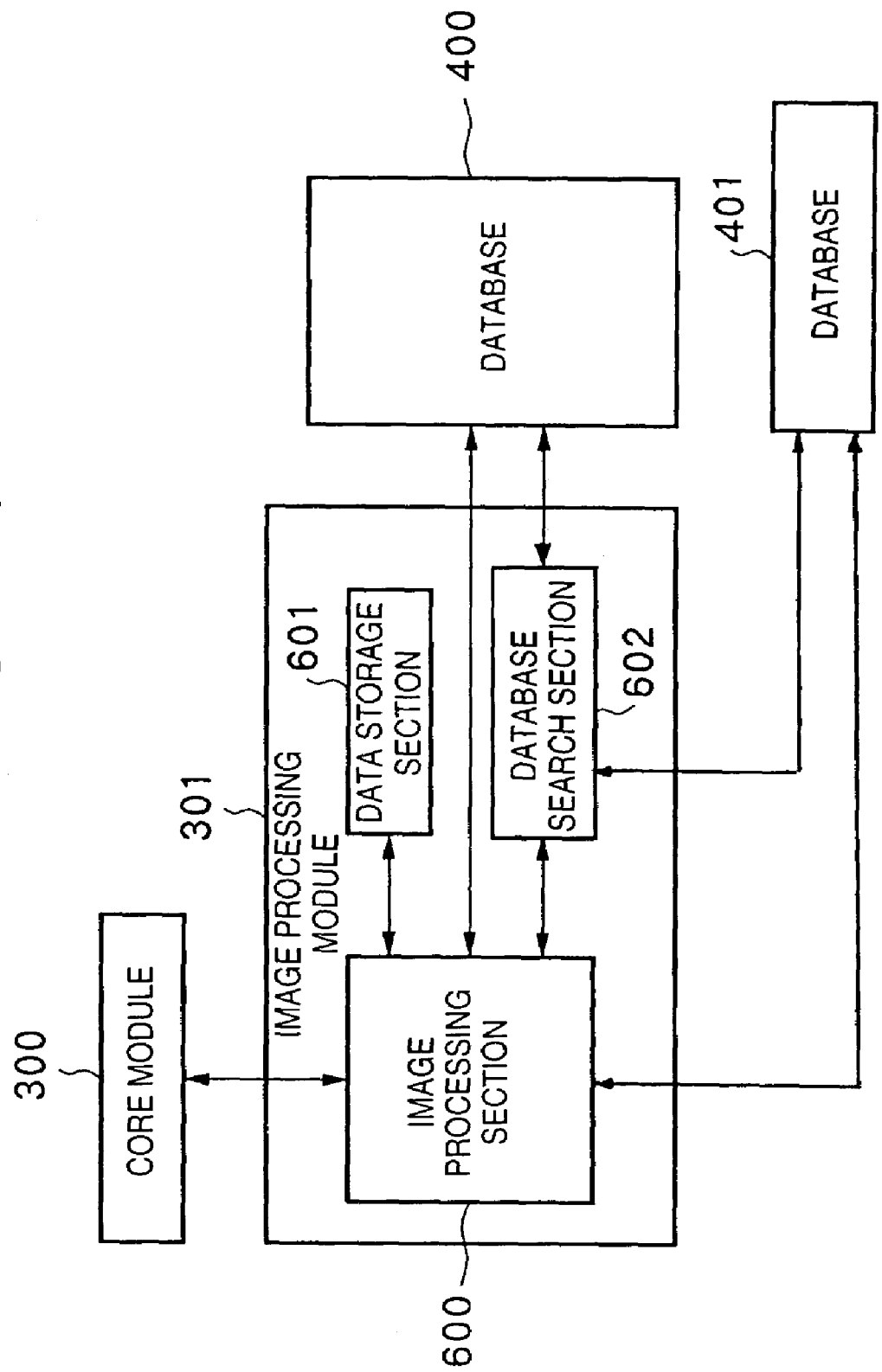
FIG. 15 is a schematic block diagram showing an example of the arrangement of an image processing module.

FIG. 15 is a schematic diagram showing an example of the arrangement of the image processing module. The image processing module 301 comprises an image processing section 600, data storage section 601, and database search section 602. The image processing section 600 inputs various kinds of information of the printer received from the core module 300 to the database search section 602. The database search section 602 performs the same process as that of the table ID search section in the first embodiment. That is, the database search section 602 searches the database 400 on the basis of the received information, and outputs a search result to the image processing section 600. As the search result, a table ID is obtained. The image processing section 600 reads look-up tables required for image processes from the database on the basis of the search result, and stores the read tables in the data storage section 601. After that, the image processing section 600 receives image data from the core module 300, executes image processes on the basis of the look-up table data stored in the data storage section 601, and outputs the image data that has undergone the image processes to the core module 300.

The database search section 602 is incorporated not only in the image processing module 301 but also in other library modules, and a single database can be searched from a plurality of library modules.

A case will be examined below wherein a plurality of printers 1 and 2 are connected to a personal computer or the like, and their driver programs are installed in the computer. When a printer driver for printer 1 is installed, modules such as the core module 300, image processing module 301, binary processing module 302, and the like, and the database 400 are installed.

When a printer driver for printer 2 is then installed, the modules such as the core module 300, image processing module 301, binary processing module 302, and the like are not installed since they are common to those for printer 1, and processing modules required for printer 2 and a database 401 are installed.

When the user has selected a given printer, e.g., printer 1, upon instructing a print process during execution of an application program, the file name of the database 400 corresponding to printer 1 is set in the database search sections 602 of the respective modules such as the image processing module, binary processing module, and the like, thus allowing access to the database corresponding to the selected printer.

Note that the search method of the database search section 602 is not particularly limited. Since the database 400 is independent from the library modules, when the contents of the database, i.e., look-up tables to be read by the image processing module 301 are to be changed, the image processing module 301 need not be re-compiled, and the library modules and database can be efficiently developed.

In this manner, even when a change in database such as addition of new print paper, and the like influences a plurality of library modules, the library modules influenced by that change need not be re-compiled, and the contents of the database can be efficiently and easily changed.

Upon version-up of a driver program, the contents of the database can be efficiently and easily changed.

As described above, according to the printer drivers of the first and second embodiments, the look-up tables can be easily maintained independently from processes that use those tables, and consistency among modules which use the look-up tables can be prevented from impairing.

Also, upon version-up of a driver program, the contents of the database can be efficiently and easily changed.

Third Embodiment

Figure 19:
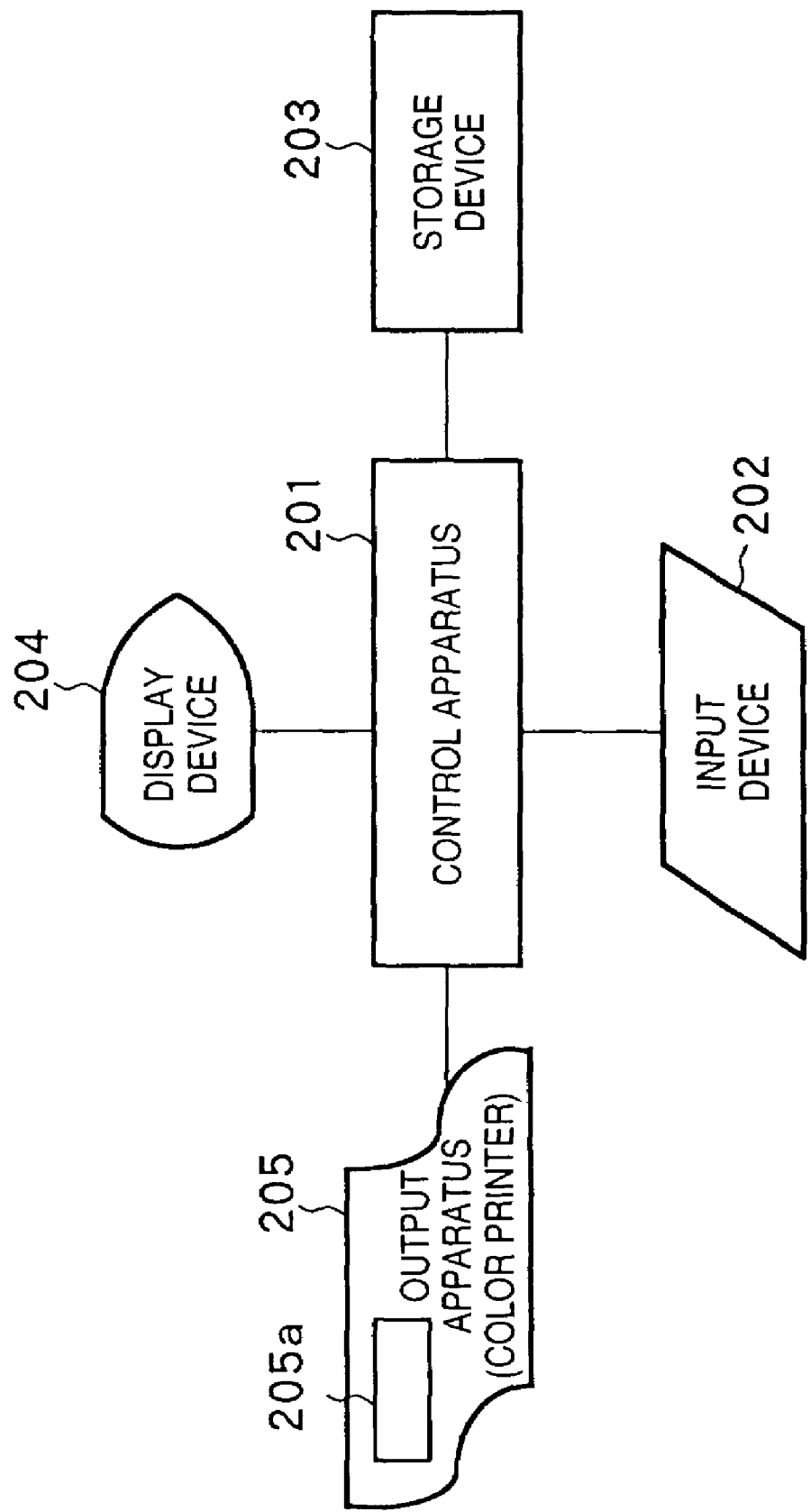
FIG. 19 is a block diagram showing the arrangement of an image processing system as an embodiment of a data conversion apparatus according to the present invention.

FIG. 19 is a block diagram showing the arrangement of an image processing apparatus to which the present invention can be applied.

An output apparatus 205 is a color printer, which forms a color print on a print paper sheet using four color inks, e.g., yellow (Y), magenta (M), cyan (C), and black (K) inks. Note that the color printer may output six or seven colors, but an explanation of this embodiment will be given using four colors. Print data composed of Y, M, C, and K density data used in this output apparatus 205 are obtained by image processes executed by a control apparatus 201, and the image processes include color correction, color conversion, grayscale correction, quantization, and the like (to be described later). The output apparatus 205 includes a storage unit 205a for storing head information (to be described later).

The control apparatus 201 has a CPU which executes data processes that pertain to this system such as an image process (to be described later), an initialization process therefor, and the like, and operation control of respective mechanical components. A storage device 203 includes general external storage devices such as memories (ROM, RAM, or the like), a hard disk, a floppy disk, and the like, and stores a database including look-up tables which will be described later in an embodiment of the present invention, and a calculation segment. Also, the storage device stores image data of a standard pattern for calibration, and program codes that implement the sequences of the flow charts to be described later. These data and programs may be supplied to this image processing system via a medium such as a removable optical disk, floppy disk, or the like.

With this arrangement, for example, an image scanned by a scanner is stored in the storage device 203, and the operator of this system can desirably edit the image displayed on a display device 204 such as a CRT or the like by operation inputs from an input device 202 including a keyboard, mouse, and the like to obtain an image to be printed out by the output apparatus 205. The input device 202 may include an image scanner. When the image scanner is equipped, a standard pattern output for calibration can be scanned by that scanner. In this case, the I/O characteristics of the image scanner must be corrected to obtain linear I/O characteristics, and LUTs and the like required for the correction are prepared.

The image obtained by this system in this manner is expressed by grayscale data of luminance signals R, G, and B, and undergoes color correction, color conversion, grayscale correction, and quantization so as to be converted into print data of the output apparatus 205.

Note that the scope of the present invention is not limited to the aforementioned specific system. For example, image processes (color correction, color conversion, grayscale correction, and quantization) are done in an apparatus such as a copying machine, as is well known, and the present invention can also be applied to such apparatus or system.

Various correction processes executed by the control apparatus 201 will be briefly explained below. The color correction process is that from 8-bit R, G, and B data into 8-bit R', G', and B' data. The color conversion process is that from 8-bit R', G', and B' data into 8-bit C, M, Y, and K data. The grayscale correction process is that from 8-bit C, M, Y, and K data into 8-bit C', M', Y', and K' data. The quantization process is that from 8-bit C', M', Y', and K' data into 1-bit c, m, y, and k data. The color correction, color conversion, grayscale correction, and quantization at that time are implemented using look-up tables (to be also referred to as LUTs hereinafter).

FIG. 16 is a perspective view of the mechanism of an ink-jet printer as an example of the output apparatus 205. Referring to FIG. 16, a lead screw 5004 rotates via driving force transmission gears 5011 and 5009 upon forward/reverse rotation of a driving motor 5013. A carriage HC, which engages with a spiral groove 5005 of the lead screw 5004, has a pin (not shown), and reciprocally moves in the directions of arrows a and b. Y (yellow), M (magenta), C (cyan), and Bk (black) ink-jet cartridges IJC are mounted on this carriage HC. A paper pressing plate 5002 presses a paper sheet against a platen 5000 along the moving direction of the carriage HC. Photocouplers 5007 and 5008 confirm the presence of a lever 5006 of the carriage in the corresponding region, and detect a home position where, e.g., the rotational direction of the motor 5013 is switched. A member 5016 supports a cap member 5022 that caps the front surface of each print head to attain suction recovery of print heads via an intra-cap opening 5023. A member 5019 holds a cleaning blade 5017 to be movable in the back-and-forth direction. These members are supported by a main body support plate 5018. The blade 5017 is not limited to such specific one, but a known cleaning blade can be applied to this embodiment. A lever 5021 initiates suction of the suction recovery. The lever 5021 moves upon movement of a cam 5020 which engages with the carriage, and its movement is controlled by a known transmission mechanism such as clutch switching by the driving force from a driving motor.

Note that each ink-jet cartridge IJC comprises a memory (not shown), which stores a head ID as a unique identifier of each cartridge, and head rank information indicating the state of the head in the manufacture, e.g., an ink ejection state or the like. Such information (head information) is read out and used in a print process or calibration.

Figure 20:
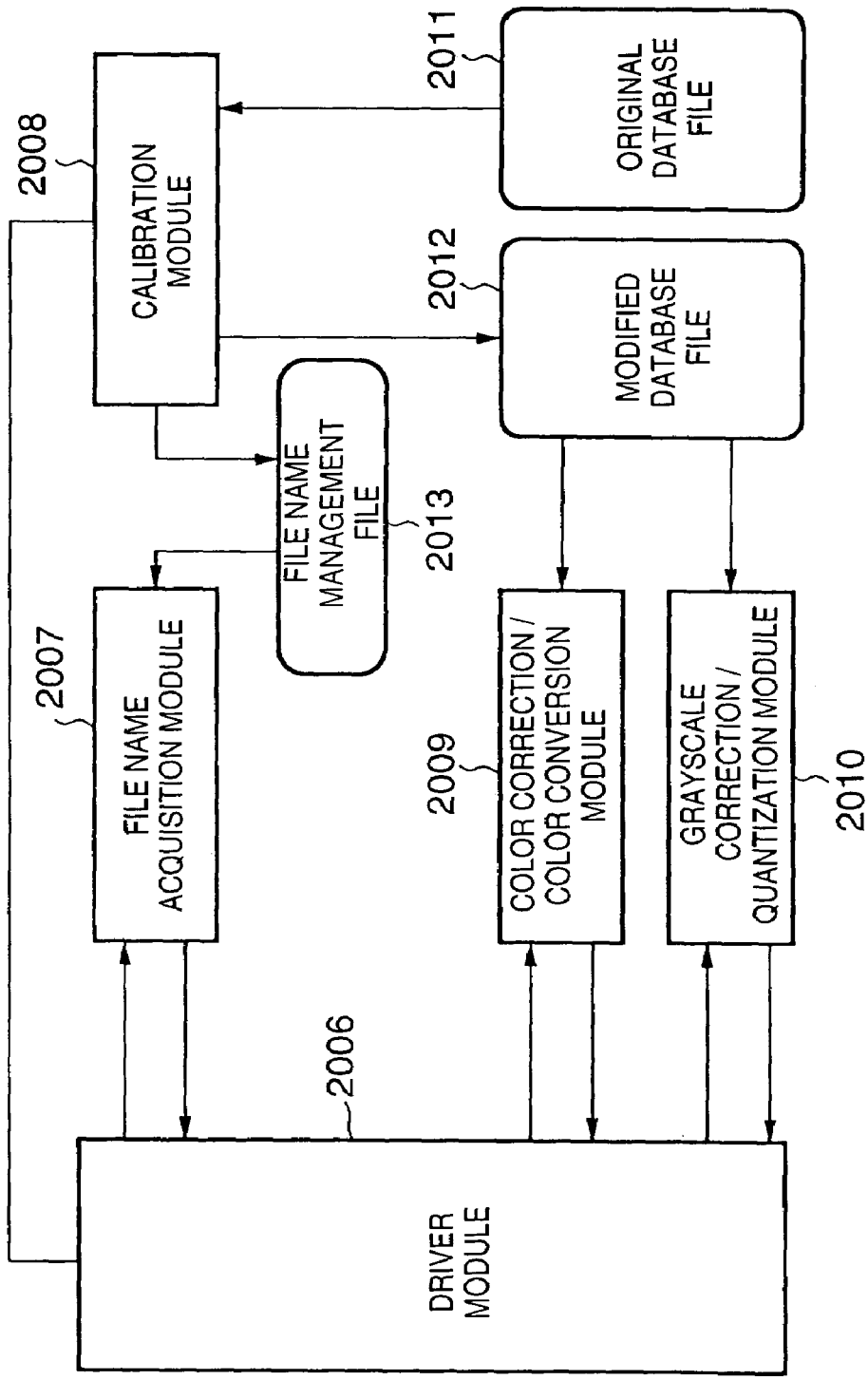
FIG. 20 is a diagram showing the concept upon generating a new database file.

FIG. 20 is a schematic diagram of software modules that pertain to a print process in the image processing system of this embodiment.

Referring to FIG. 20, a printer driver module 2006 converts image data which was generated by an application program or the like and has a format according to an operating system or the like into data of a format the output apparatus 205 can print. The data (print data) generated by the driver module 2006 is sent to the output apparatus 205, and is printed out.

The driver module 2006 calls a calibration module 2008 and generates a new, corrected database file 2012 including a LUT corrected in a sequence to be described later, on the basis of an original database file 2011, which is prepared in advance and includes standard LUTs. Calibration may be launched by the user from a driver utility program or upon issuing a print start command, installing a driver, or exchanging a head.

Figure 22:
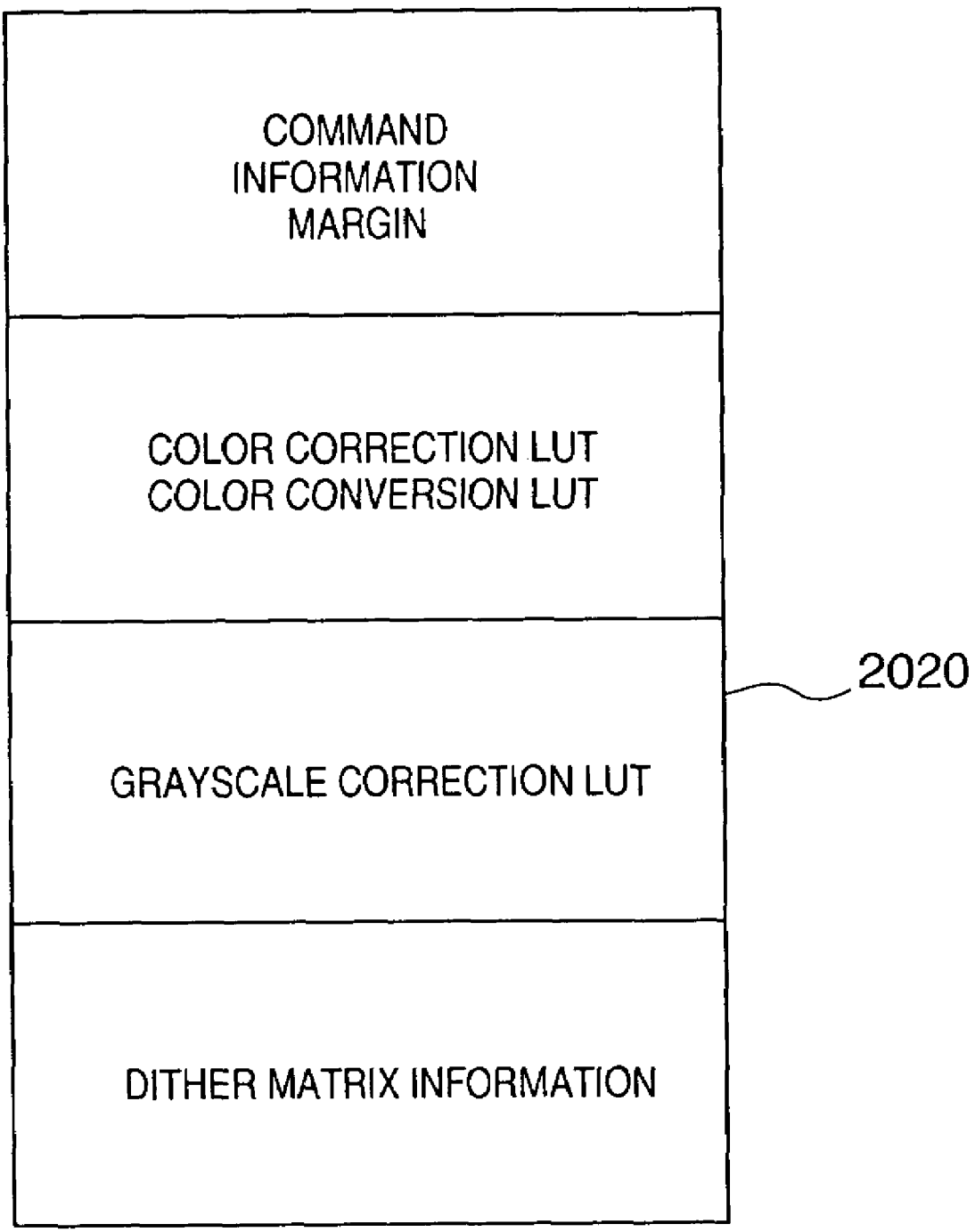
FIG. 22 shows the architecture of a database file.

Note that the original database file 2011 is a printer database 2020, as shown in FIG. 22, which includes commands as model information of the output apparatus 205, margin information, LUTs (interpolation tables) required for color correction/color conversion, LUTs (grayscale correction tables) required for grayscale correction, dither matrices required for quantization, and the like.

The generated database is looked up by a color correction/color conversion module 2009 or grayscale correction/quantization module 2010 upon executing a print process. In this case, the database used is selected in accordance with the ID of a head mounted on the output apparatus by looking up a file name management file 2013, which stores head IDs and database file names in correspondence with each other, by a file name acquisition module 2007.

<Calibration Sequence>

In calibration, a database file is generated in correspondence with the individual differences, aging, and the like of the printer and ink head. For example, the printer driver fetches the head ID and head rank information (e.g., C: +2, M: 0, Y: −1, K: +1) from the printer main body, and sends that information to the calibration module, thus generating a database file including an LUT (for example, a grayscale correction table 2023 in FIG. 23) that matches the head rank. Alternatively, the user may conduct a test print to determine a head rank based on the test print result, and calibration may be done based on that head rank. Alternatively, density information at each gray level may be measured from a test print result of a standard pattern, which is prepared in advance, using an external device, the measurement result may be input to this image processing system via a removable storage medium or communication, and each LUT may be corrected based on that measurement result.

Figure 25:
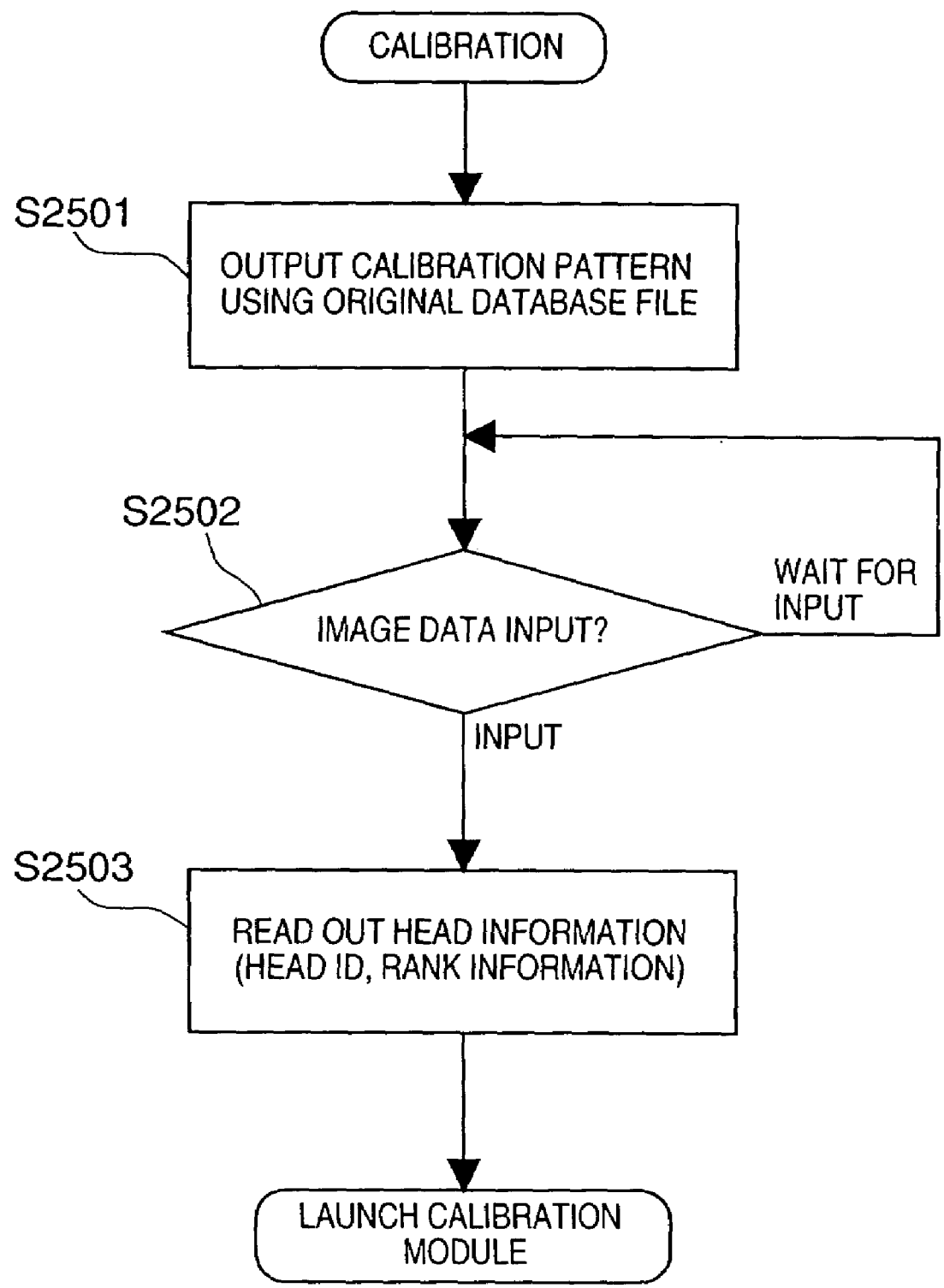
FIG. 25 is a flow chart showing a calibration sequence by a driver module.
Figure 26:
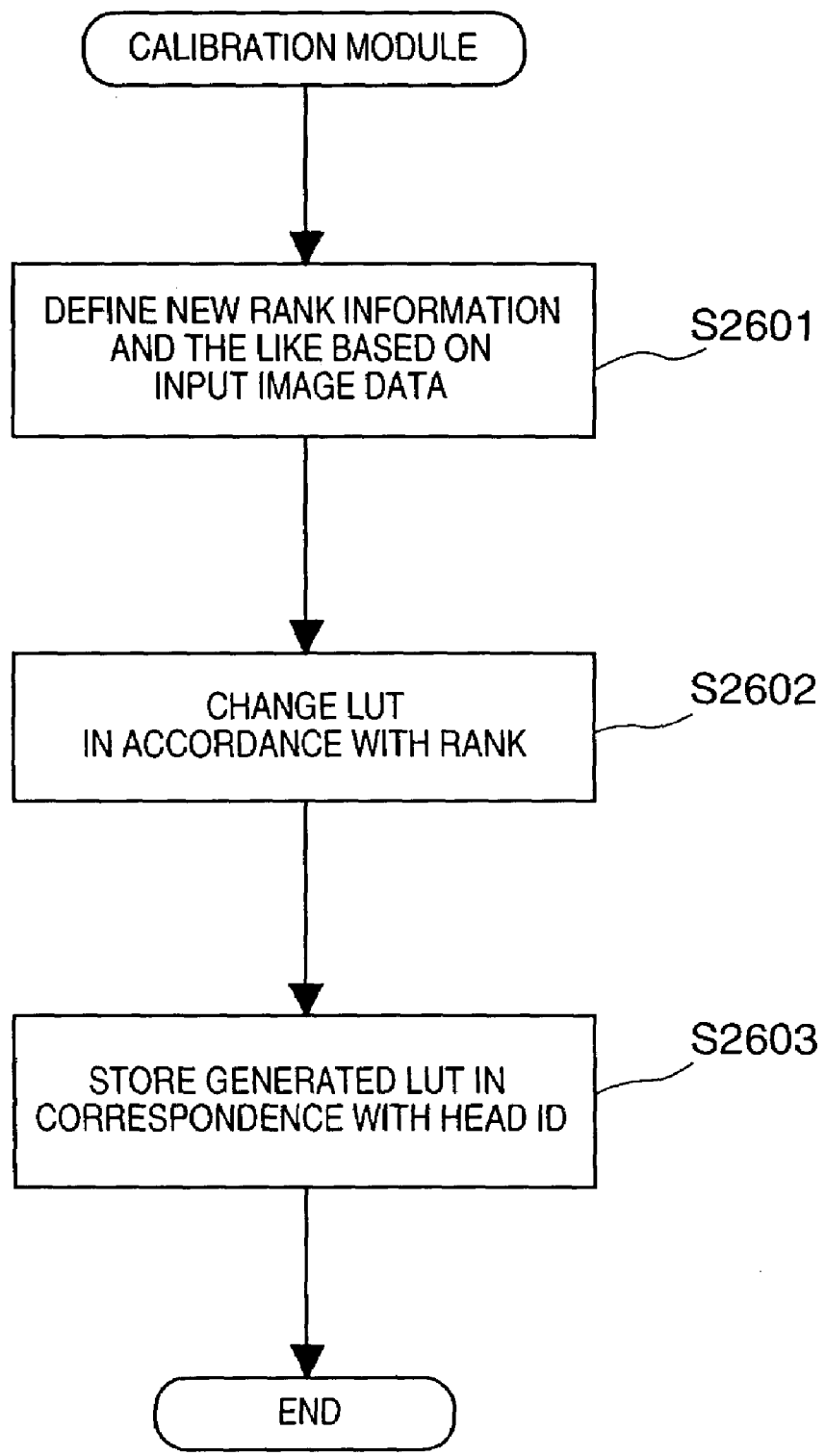
FIG. 26 is a flow chart showing a calibration sequence by a calibration module.

FIGS. 25 and 26 respectively show the calibration processing sequences in the driver module and calibration module. In this case, calibration is done by the last method mentioned above.

Referring to FIG. 25, when a calibration process of the driver module is launched, a standard pattern for calibration is output using the original database (step S2501). After that, the driver module waits until the measurement result of that output image is input (step S2502). In this case, the control waits for the input via a loop. Alternatively, the control may temporarily quit the process, and may restart it in response to the input.

Upon receiving image data as the measurement result of the standard pattern, the driver module reads out head information including the head ID and rank information from the output apparatus, and launches the calibration module (step S2503). The head information may be read out beforehand upon, e.g., starting up the system.

FIG. 26 shows the processing sequence of the calibration module launched in step S2503. The calibration module defines new rank information based on the image data received from the driver module (step S2601). After the rank information is defined, the calibration module changes an LUT in accordance with the value of that rank information (step S2602).

Figure 23:
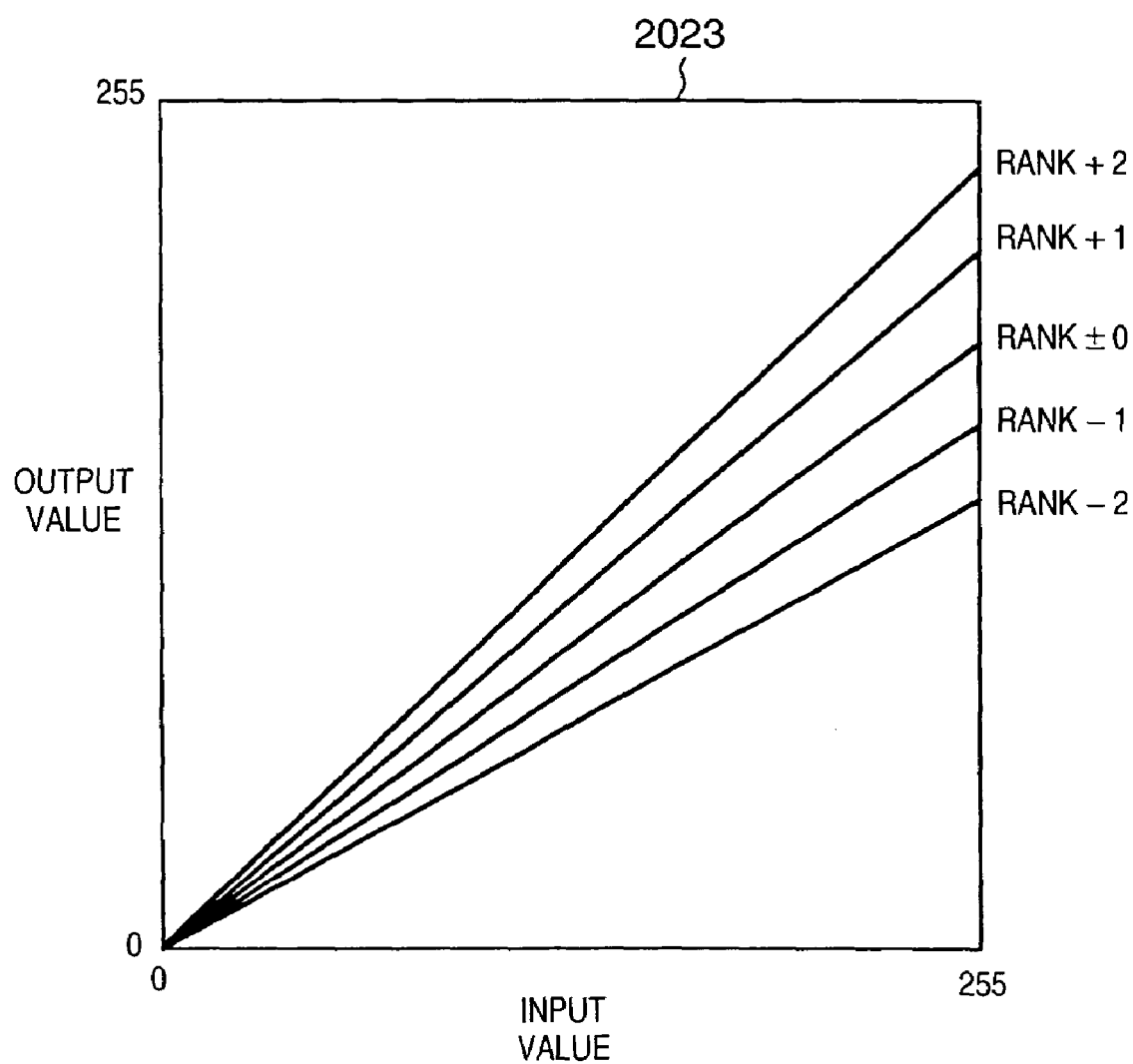
FIG. 23 is a graph showing the adjustment results of an LUT of a grayscale correction table in accordance with head ranks.

The rank information indicates, e.g., an ink ejection state of the head in units of colors. A value "0" is a standard value, and the ink ejection amount decreases when the value increases in the positive direction; the ink ejection amount increases when the value increases in the negative direction. For this reason, as rank information for a given color assumes a larger value, grayscale correction corrects to increase the grayscale value of that color. Therefore, a grayscale correction LUT is corrected in accordance with the rank information, as shown in FIG. 23.

Finally, a database file including the generated LUT is stored as the corrected database file 2012 in FIG. 20. In this case, a file name management file 2013 used to manage the name of the new database file is generated, as shown in FIG. 24. The file name management file 2013 includes head IDs 2021 and corresponding database file names 2022. Therefore, when a new head is mounted, its ID must be registered in the file name management file 2013.

When calibration is done based on the head rank determined by the user, since the input information is rank information, the control section need not determine rank information. For this reason, the driver module need only execute step S2503 in FIG. 25, and the calibration module need only execute steps S2602 and S2603 in FIG. 26.

Figure 27:
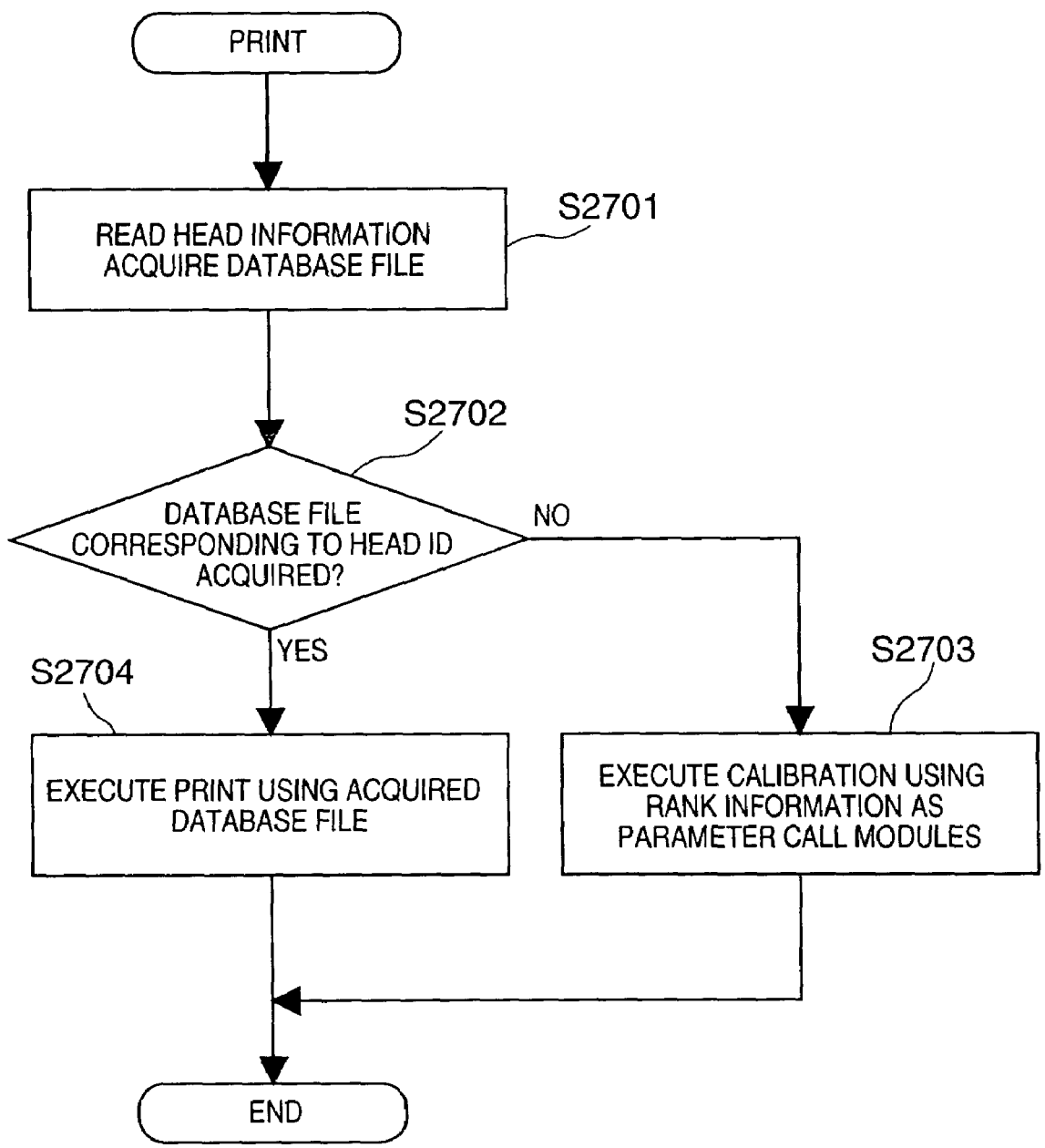
FIG. 27 is a flow chart showing a print sequence by the driver module.

FIG. 27 shows the processing sequence of the driver module 2006 upon executing a print process.

When a print process starts, the driver module reads head information, and acquires a database file name corresponding to the head ID via the file name acquisition module 2007 (step S2701). If a database file corresponding to the head ID is found, the driver module calls the color correction/color conversion module and grayscale correction/quantization module using the database file with the acquired file name to execute a process (step S2704), and the output apparatus 205 outputs the processed data. On the other hand, if no database file corresponding to the head ID is found, the driver module calls the calibration module 2008 using the rank information as a parameter, and controls it to execute a process from step S2602 in FIG. 26. In this manner, a database file including a corrected LUT is obtained, and is stored in the file name management file 2013 in correspondence with the head ID.

An optimal print result can be obtained using the LUT corresponding to the currently mounted head.

Assume that the original database file name is known to the module 2007 that returns the database file name. When the head ID cannot be obtained, the original database is used.

In the above description, when a head, the head ID of which is not registered in the database, is used, the processing sequence is done with the intervention of the driver module. Alternatively, the processing sequence at that time may be executed without the intervention of the driver. In this case, if the file name acquisition module determines that there is no file name corresponding to the head ID, it launches the calibration module to generate a database according to the head rank information, register it as a corrected database file, and register its database file name in the file name management file 2013 in correspondence with the head ID. Upon completion of registration, the module 2007 returns the file name of the new database file to the driver module 2006. In this manner, the driver module can acquire and use the database file name corresponding to the head ID independently of whether or not the head ID is registered. Therefore, in the processing contents shown in FIG. 27, the process in step S2704 need only be done after step S2701.

On the other hand, when an option that can use the original database file without calibration is prepared by providing a switch for selecting whether or not calibration is done to a driver utility or the like, a print process without calibration may be done.

With the aforementioned arrangement and sequence, the head rank is updated in accordance with the individual differences, aging, and the like of the printer main body and ink head, and a database file including a look-up table corresponding to the updated head rank can be created, edited, and registered. In this manner, an optimal print result can always be obtained in correspondence with the head used. For example, even when a certain head forms a magenta-rich image if the original database file is used, a database file that has been calibrated in correspondence with that head is registered and used, thus maintaining color balance.

Since the database files are registered in units of heads, even when a plurality of printers are used or when a single printer is used while exchanging its head by various heads such as a monochrome head, four-color head, seven-color head, and the like, a correction/conversion process optimal to each head is done, and a high-quality image can be output.

Note that this embodiment has been explained using the ink-jet printer. However, the present invention can be applied to other printers. In this case, if a printer uses an exchangeable print head, characteristic information corresponding to a head rank is held in correspondence with each head ID, and an LUT is corrected in correspondence with the held information. On the other hand, if a printer does not have any "head" like in an electrophotographic printer, an identifier and characteristics unique to an exchangeable component (e.g., a toner cartridge or a transfer drum on which a latent image and toner image are formed) may be held, and an LUT may be corrected by calibration in accordance with the characteristics or aging of such component.

Fourth Embodiment

Figure 21:
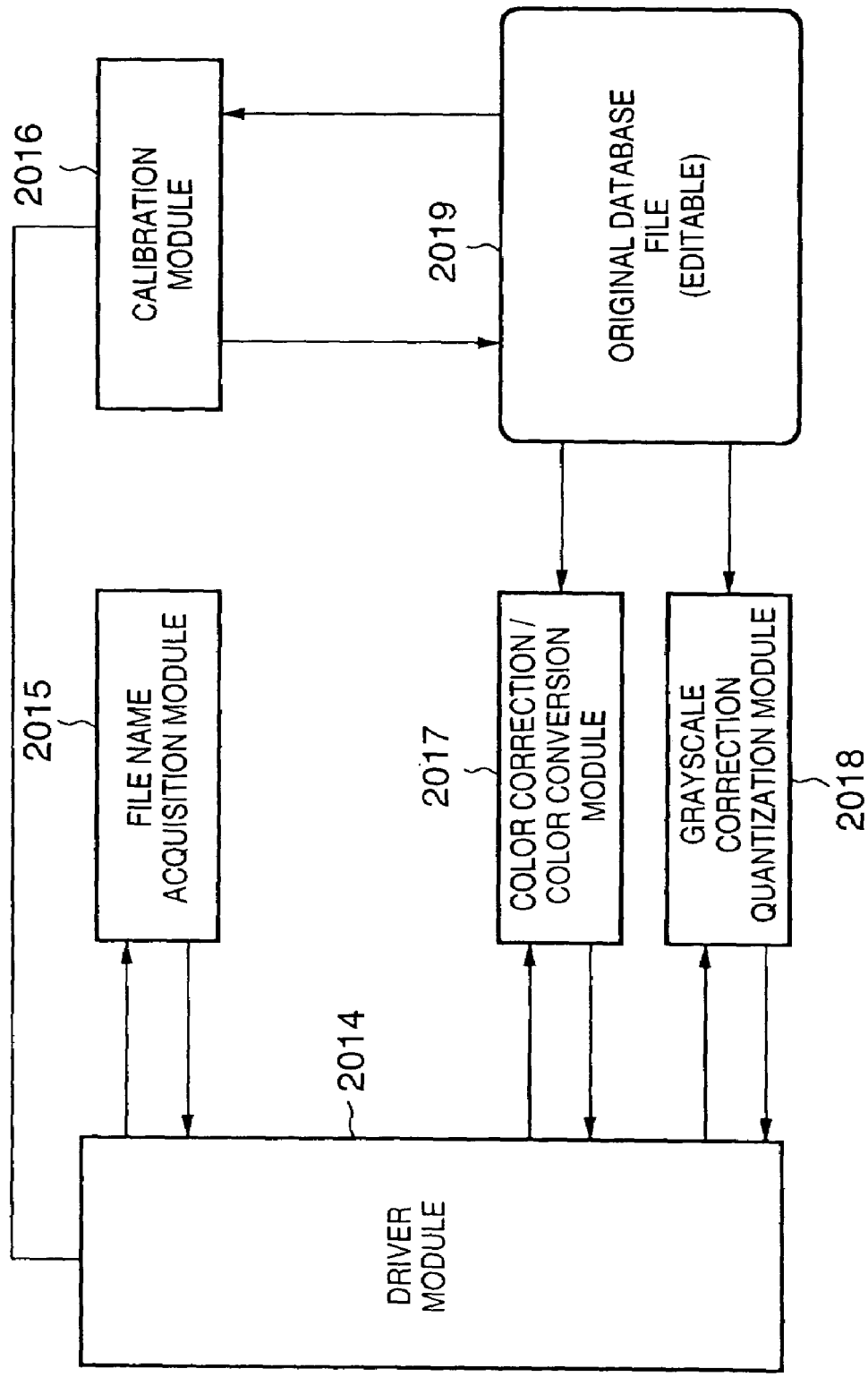
FIG. 21 is a diagram showing the concept upon editing a database file.

FIG. 21 is a schematic diagram of the fourth embodiment of the present invention.

A printer driver module main body 2014 shown in FIG. 21 calls a calibration module 2016 to edit an original database file 2019. The original database file is substantially the same as that in the third embodiment and has the format shown in FIG. 22, except that the file itself is editable.

Upon calibration, the calibration module generates a database file in correspondence with individual differences, aging, and the like of the printer and ink head. For example, the printer driver fetches the head ID and head rank information (e.g., C: +2, M: 0, Y: −1, K: +1) from the printer main body, and sends that information to the calibration module, thus generating a database file including an LUT (for example, a grayscale correction table 2023 in FIG. 23) that matches the head rank. Alternatively, the user may conduct a test print to determine a head rank based on the test print result, and calibration may be done based on that head rank.

Then, the printer driver module 2014 calls a file name acquisition module 2015 to acquire a database file name corresponding to a model ID. The driver module calls a color correction/color conversion module and grayscale correction/quantization module using that database file name and executes a process, thus obtaining an optimal print result using the LUT corresponding to the head which is currently mounted.

With the aforementioned arrangement, the head rank is updated in accordance with individual differences, aging, and the like of the printer main body and ink head, and a database file including a look-up table corresponding to the updated head rank can be created and edited. In this manner, an optimal print result can always be obtained in correspondence with the head used.

Since the stored database corresponds to only one head, the storage capacity for that database can be saved.

Fifth Embodiment

Figure 28:
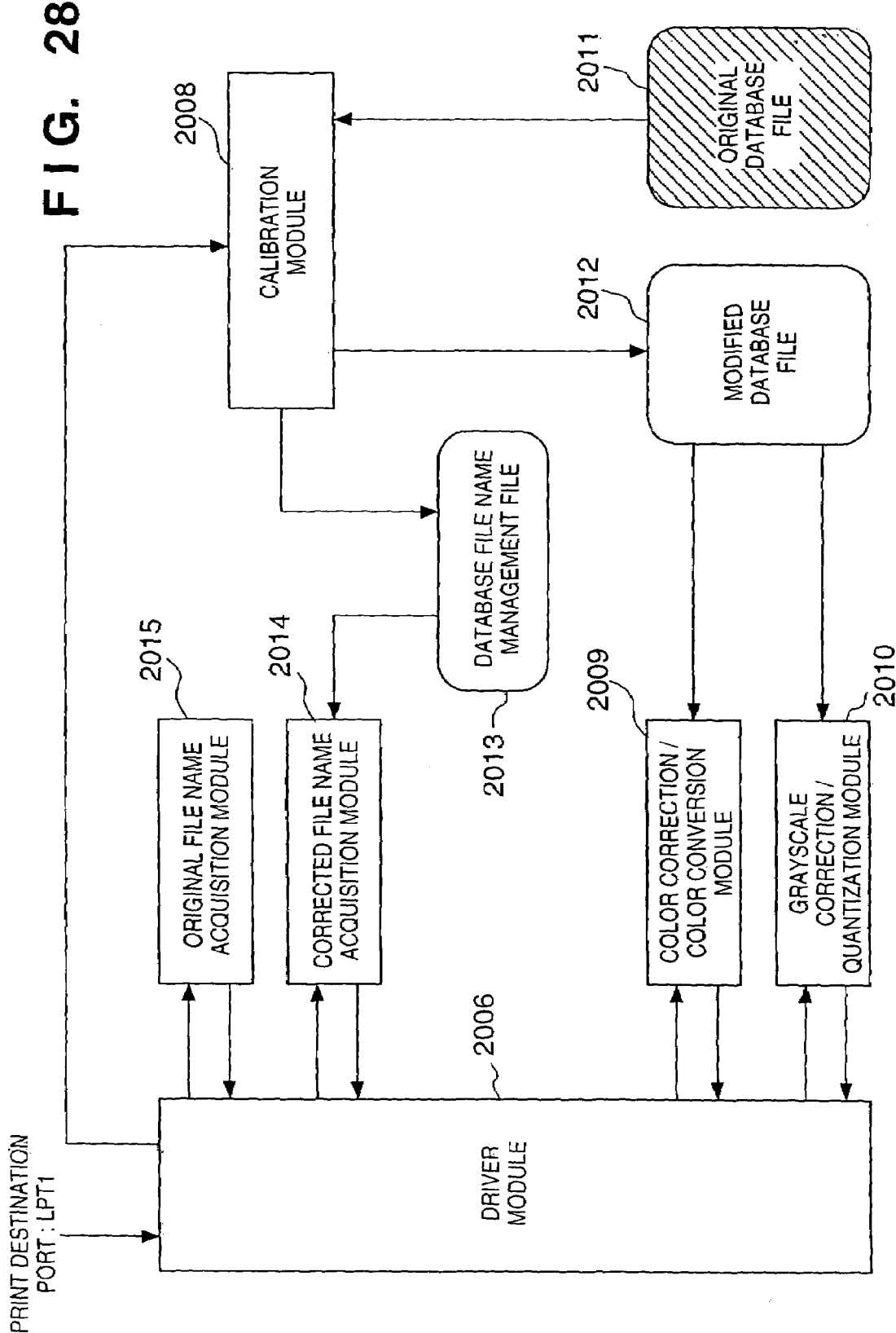
FIG. 28 is a block diagram showing the concept when a print destination port is a printer in the third embodiment.

FIG. 28 is a schematic diagram of software modules that pertain to a print process in the image processing system of this embodiment. FIG. 28 shows a case wherein a printer is designated as a print destination port. Since blocks in FIG. 28 having common reference numerals to those in FIG. 20 have the same functions as those in FIG. 20, a detailed description thereof will be omitted.

In the image processing system of this embodiment, the user can designate a print destination port via a user interface provided by, e.g., a printer driver module 2006. The user can designate, as a print destination port, a local printer, a network printer, or a file on a communication line or a hard disk, which can be used by the image processing system of this embodiment. If the user designates a printer, a print process is done by the designated printer; if the user designates a file, a print file generated by the driver module 2006 is stored in, e.g., a hard disk of the apparatus.

The printer driver module main body 2006 calls a calibration module 2008 and generates a new database file 2012 on the basis of an original database file 2011. Calibration may be launched by a driver utility program or upon issuing a print start command, installing a driver, or exchanging a head. On the other hand, the calibration sequence may be the same as that shown in FIGS. 25 and 26 of the first embodiment. That is, the printer driver fetches the head ID and head rank information from the printer main body, and sends that information to the calibration module, thus generating an LUT which matches the head rank. Alternatively, as described in the third embodiment, the user may conduct a test print to determine a head rank based on the test print result, and calibration may be done based on that head rank input by the user.

As a result, the corrected database file 2012 stores LUT files according to the characteristics of the individual heads such as ink ejection states of the heads indicated by the rank information in correspondence with the head IDs. Upon generation of the corrected database file, a database name management file 2013 for managing its file name is also generated, as shown in FIG. 24. Such process is the same as the third embodiment.

Upon executing a print process, when a printer is designated as the print destination port, the printer driver module 2006 calls an original file name acquisition module 2015 that returns the original database file name to acquire the original database file name. If a corrected database file corresponding to the head ID of the head used has been generated, the driver module calls a corrected file name acquisition module 2014 which acquires a corrected database file name corresponding to the head ID. Then, the driver module calls a color correction/color conversion module and grayscale correction/quantization module using that database file name to execute a process, thus obtaining an optimal print result using the LUT corresponding to the head which is currently mounted.

When the printer driver 2006 fails to acquire the head ID, when a corrected database file is not normally generated, or when the database file name management file 2013 is not normally generated, it uses the original database file using the initially acquired original database file name.

Figure 29:
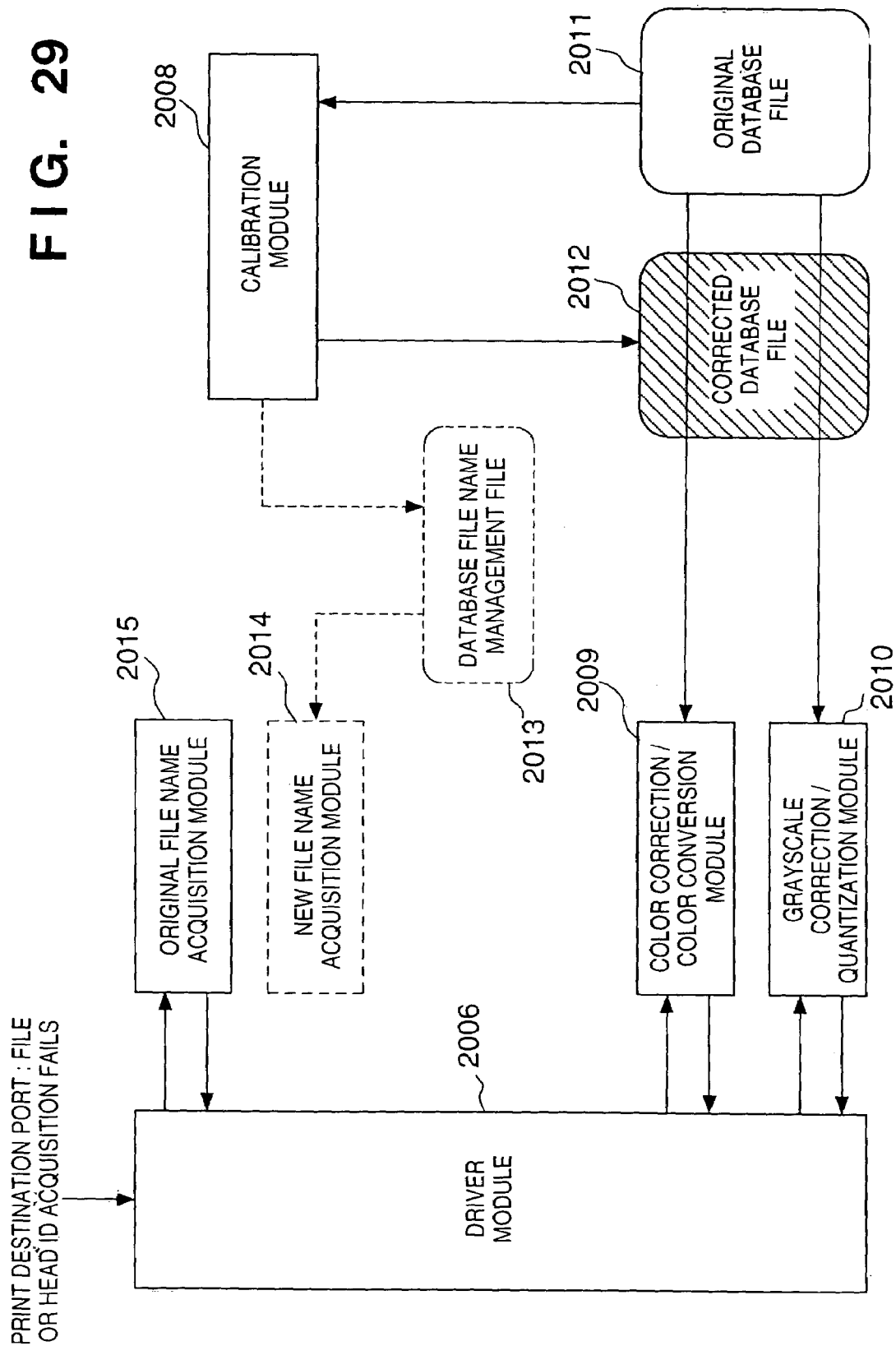
FIG. 29 is a block diagram showing the concept when a print destination port is a file in the third embodiment.

On the other hand, when a file is designated as the print destination port upon executing a print process, the printer driver uses the original database file, as shown in FIG. 29. In this case, the driver module 2006 need not obtain printer-dependent information to output print data to a file. For this reason, the driver module 2006 uses the original database file. This is because the characteristics of a head which may output print data (print file) output to a file cannot be specified. That is, even when the printer driver 2006 designates a specific printer and generates a print file in correspondence with the characteristics of that printer, since that print file is not always printed using the head having characteristics used upon generating the print file, the driver module generates print data using the versatile original database file.

In this case, the printer driver module 2006 calls the module 2015 that returns the original database file name. The driver module calls the color correction/color conversion module and grayscale correction/quantization module using the obtained original database file name to execute a process.

Figure 30:
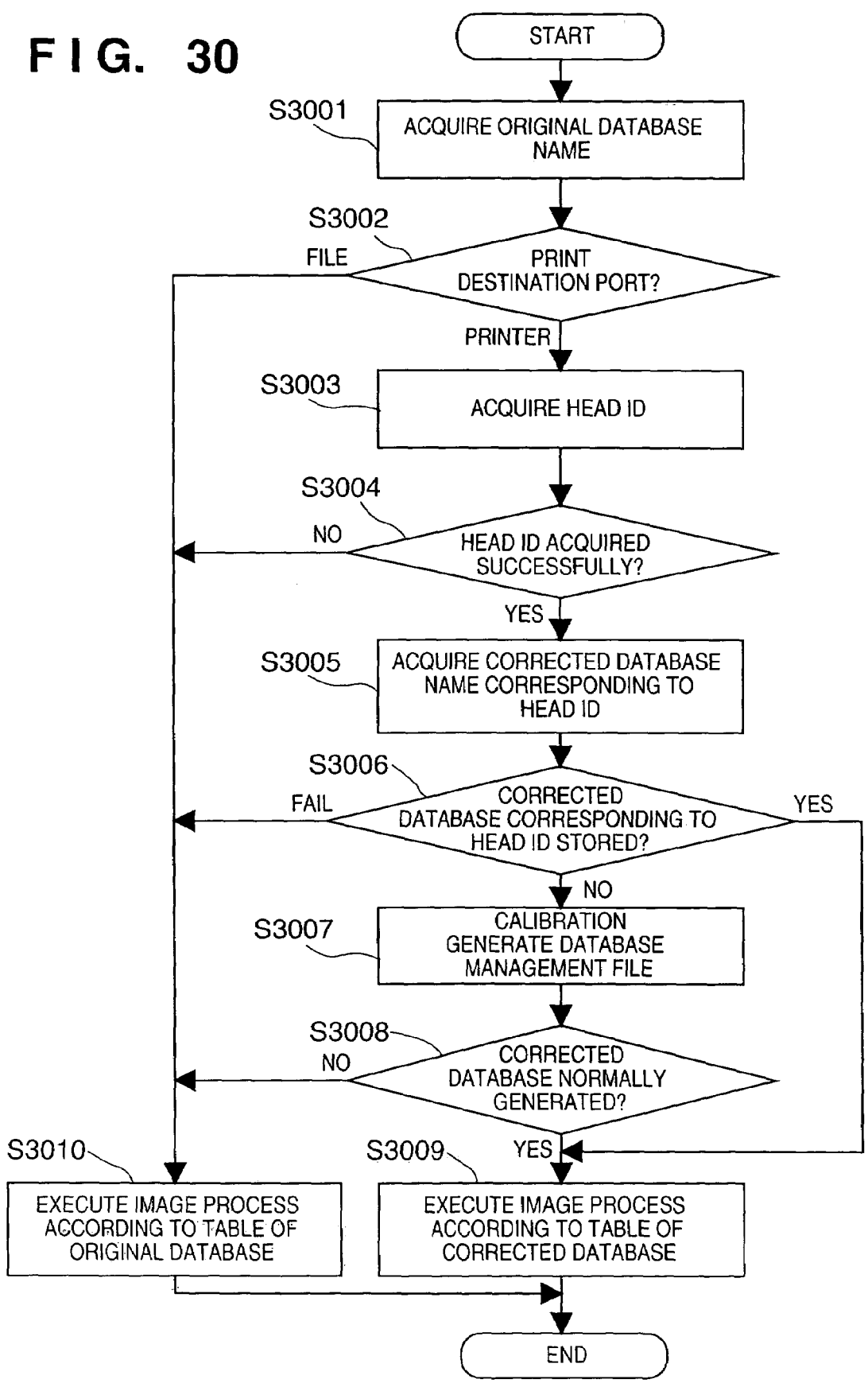
FIG. 30 is a flow chart showing a print sequence in the third embodiment.

FIG. 30 shows the sequence upon executing a print process in this embodiment mentioned above.

The printer driver module 2006 acquires the original database file name via the original file name acquisition module 2015 (S3001). The driver module determines a print destination port (S3002). If the port is a file, the driver module executes an image process in accordance with an LUT in the original database file acquired in step S3001 (S3010).

On the other hand, if the print destination port is a printer, the driver module acquires the head ID of the printer (S3003). It is checked if head ID acquisition has succeeded (step S3004). If acquisition has failed, the driver module executes an image process in accordance with an LUT in the original database file (S3010). If head ID acquisition has succeeded, the driver module acquires a corrected database file name corresponding to the acquired head ID via the corrected file name acquisition module 2014 (S3005).

It is then checked if the corrected database file name corresponding to the head ID is obtained (step S3006). If no such file name is obtained, i.e., if no database file corresponding to the head ID is registered, the driver module executes calibration, and registers a corrected database file name in the database management file (step S3007).

It is checked if the corrected database file is normally generated (step S3008). If the corrected database file is not normally generated, the driver module executes an image process using an LUT of the original database file (step S3010). If the corrected database file is normally generated, the driver module executes an image process using an LUT of the corrected database file (step S3009).

On the other hand, if it is determined in step S3006 that the corrected database file 2012 corresponding to the head ID has already been registered, the driver module executes an image process using an LUT of the corrected database file without calibration (step S3009).

If it is determined in step S3006 that the database file name management file 2013 is not normally generated, and a corrected database file which is to be used actually cannot be obtained, or if the corrected database file is not normally generated, the driver module executes an image process using an LUT of the original database file (step S3010).

In this way, in the image processing system of this embodiment, when the designated print destination port is an apparatus having individual characteristics such as a printer or the like, and a unique LUT is required to correct its characteristics, the LUT corresponding to the characteristics is generated, and image data undergoes color correction, grayscale correction, and the like using the LUT to generate print data. For this reason, since the database file including a look-up table is generated and edited in correspondence with individual differences, aging, and the like of the printer main body and ink head, an optimal print result can always be obtained. For example, even when a magenta-rich head is used, formation of an image which is entirely tinged with red or gray balance holding errors can be eliminated.

On the other hand, if the designated print destination port is a file or the like, and the final output destination is unknown, print data is generated using a standard LUT.

In this manner, when the characteristics of a printer that prints are known, optimal print data to such characteristics can be generated; if the characteristics are unknown, standard print data can be generated.

As described above, according to the printer drivers of the third to fifth embodiments, since a database file including a look-up table is generated in accordance with individual differences, aging, and the like of characteristics of the output apparatus, a satisfactory print result can always be obtained. When the characteristics of the output apparatus are unknown, the output image quality can be maintained using a versatile database file.

Sixth Embodiment

A link information search apparatus and a method executed in that search apparatus according to an embodiment of the present invention will be described below with reference to the accompanying drawings. This link information search apparatus is used to appropriately maintain a combination of setup values for a print process, which is input via a user interface. The user interface is implemented by, e.g., the printer driver 1703 shown in FIG. 17 via the OS.

Therefore, this link information search apparatus may be included in functions executed by the printer driver when the user makes print setups, in place of a standalone use.

<Arrangement of Link Information Search Apparatus>

Figure 31:
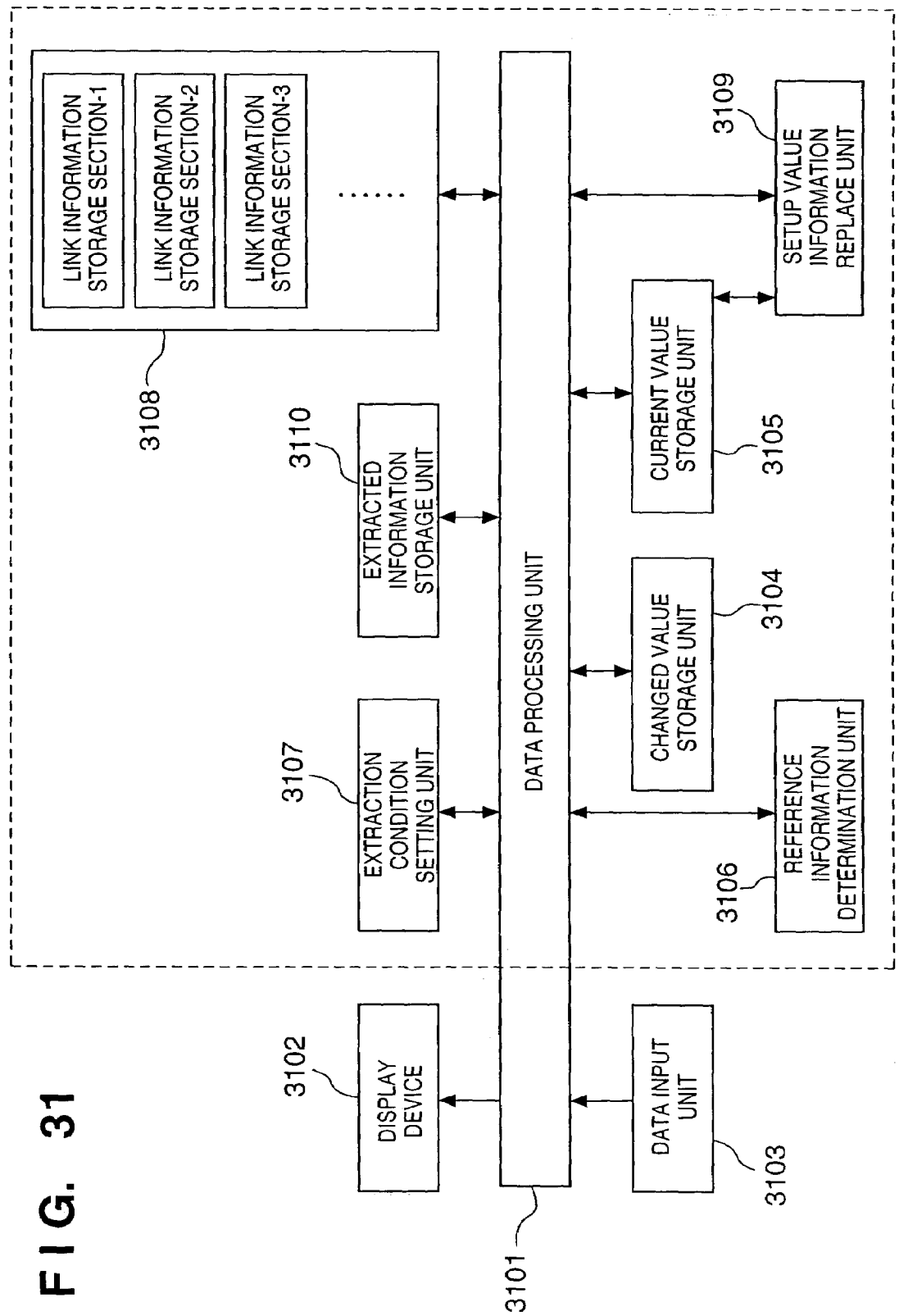
FIG. 31 is a schematic block diagram of a system which comprises a link information search apparatus as an embodiment of the present invention, a display apparatus, and an input unit.

FIG. 31 best illustrates characteristic feature of a link information search apparatus according to this embodiment, and the link information search apparatus will be explained below using FIG. 31.

Note that "link information" is parameter information which is given to an image processing apparatus (e.g., a printer, facsimile apparatus, or the like) in close relation to a set or changed print condition. A desired print condition can be achieved by a combination of one or a plurality of pieces of parameter information (link information).

A data processing unit 3101 executes various data processes to be described later. A display device 3102 displays the state of a printer driver to the user. A data input unit 3103 is used to input data when the user changes setups of the printer driver or instructs to execute a print process. A changed value storage unit 3104 receives and stores a changed setup item and its setup value sent from the data processing unit 3101, when the user has changed the setups of the printer driver via the data input unit 3103.

Upon extracting link information, the setup item and setup value which are stored in the changed value storage unit 3104 and have been changed by the user are sent to the data processing unit 3101. Reference numeral 3105 denotes a current value storage unit which stores the remaining setup items and all setup values after the changed setup item and setup value are stored in the changed value storage unit 3104.

As in the changed value storage unit 3104, upon extracting link information, the setup items and setup values stored in the current value storage unit 3105 are sent to the data processing unit 3101. A reference information determination unit 3106 receives a setup item that has been changed by the user from the data processing unit 3101, and determines a storage section to be referred to of a link information storage unit 3108 upon extracting link information on the basis of the received information.

An extraction condition setting unit 3107 pre-stores a condition required upon extracting link information. The link information storage unit 3108 includes a plurality of link information storage sections, and stores an information group to be changed to link with setup items of the printer driver, which have been changed by the user. A setup value information replace unit 3109 receives a link information group, which is obtained as a result of extraction of link information and is sent from the link information storage unit 3108 to the data processing unit 3101, and replaces the contents of the setup values of setup items, which are stored in the current value storage unit 3105 and are not changed, by the newly received link information. An extracted information storage unit 3110 stores link information as a result of extraction of link information.

<Link Information Change Process Sequence>

Figure 38:
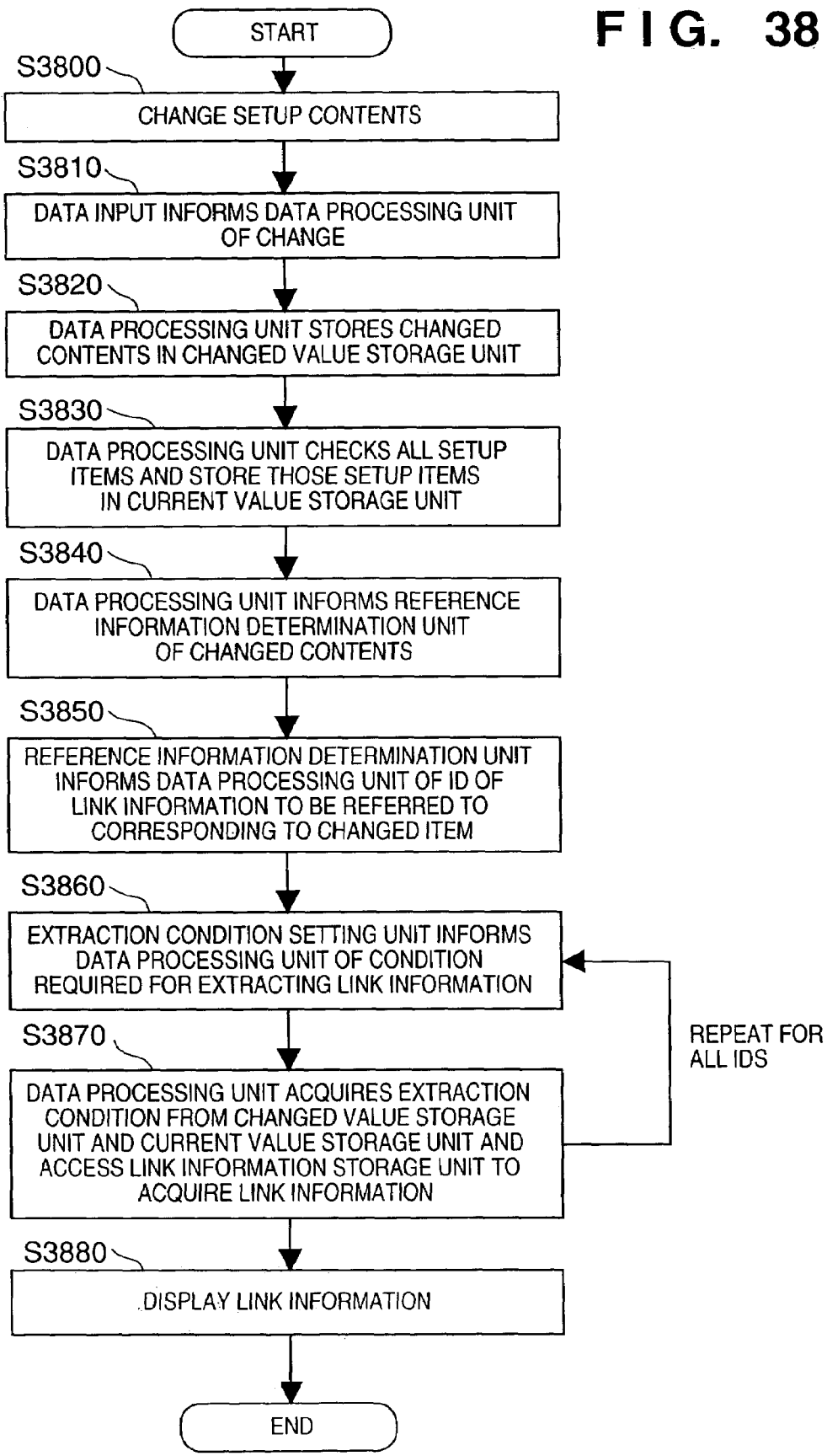
FIG. 38 is a flow chart for explaining a link information change process.
Figure 39:
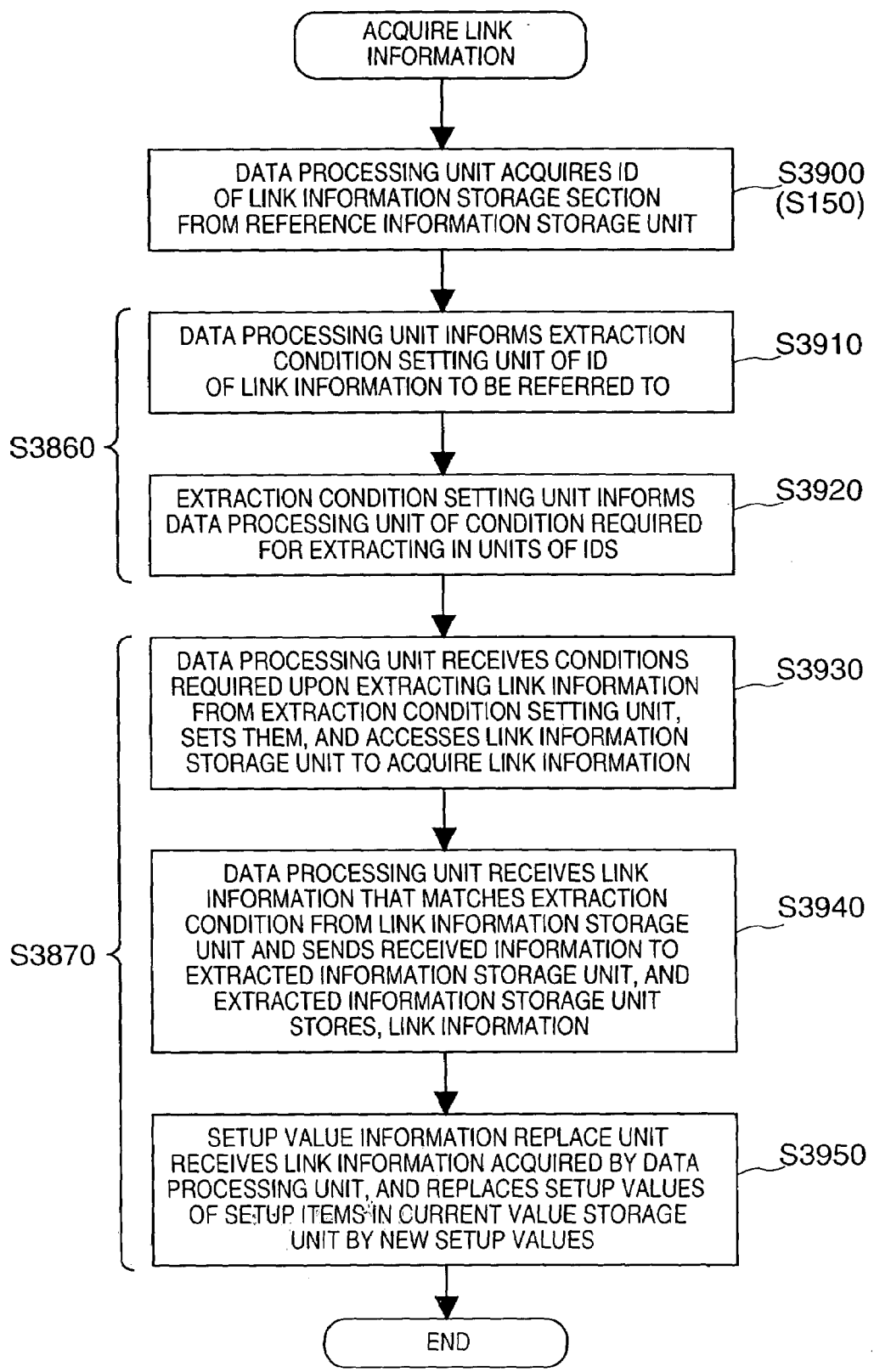
FIG. 39 is a flow chart for explaining link information acquisition.

The contents of this embodiment will be described in detail below. FIG. 38 is a flow chart for explaining the overall flow of the link information change process, and FIG. 39 is a flow chart for explaining details of link information acquisition.

Figure 32:
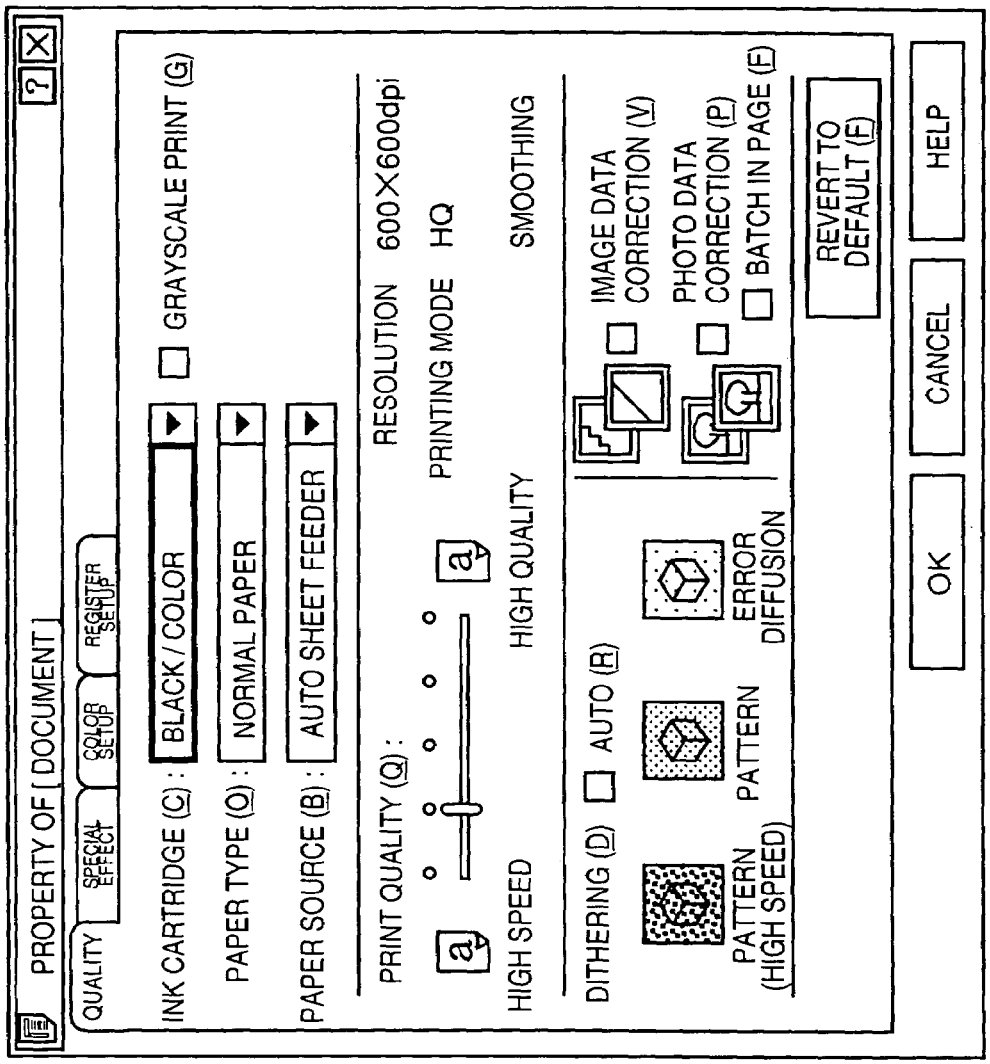
FIG. 32 shows a display window that pertains to setups of a printer driver as an embodiment of the present invention.

FIG. 32 shows the printer driver setup window displayed on the screen by the display device 3102. In FIG. 32, the user can select setup items "ink cartridge", "paper type", "paper source", "grayscale print", "print quality", "dithering", "image data correction", and "photo data correction" of the functions of the printer in correspondence with his or her print purpose.

When the user wants to change the setup value of setup image "ink cartridge" of those of the printer driver from "black/color" to "black/photo" in FIG. 32, he or she selects a setup value "black/photo" of "ink cartridge" using an input device such as a keyboard, mouse or the like (step S3800 in FIG. 38). In response to this change, the data input unit 3103 informs the data processing unit 3101 that the changed setup item is "ink cartridge", and the setup value after the change is "black/photo" (step S3810).

FIG. 33 shows an example of the changed item and setup value information as objects to be changed, which are received by the data processing unit 3101. Upon receiving such information, the data processing unit 3101 sends the changed setup item and setup value after the change to the changed value storage unit 3104, which stores them (step S3820 in FIG. 38). Subsequently, the data processing unit 3101 inspects the current setup values of all setup items, and sends the inspection result to the current value storage unit 3105, which stores the received result (step S3830 in FIG. 38).

FIG. 34 shows an example of data stored in the current value storage unit 3105. In this case, the current value storage unit stores data indicating that the setup value of "paper type" is "normal paper", that of "paper source" is "auto sheet feeder", that of "grayscale print" is "OFF", "print quality" is "second (from left)", "dithering" is "pattern (high speed)", "image data correction" is "OFF", and "photo data correction" is "OFF".

Subsequently, the data processing unit 3101 informs the reference information determination unit 3106 of the changed setup item (step S3840 in FIG. 38). Upon receiving this information, the reference information determination unit 3106 determines link information to be referred to in accordance with the changed setup item, and informs the data processing unit 3101 of the ID of the link information storage section in the link information storage unit 3108 to be referred to (step S3850 in FIG. 38).

As the ID of the link information storage section to be referred to in the link information storage unit 3108, a plurality of link information storage sections must sometimes be referred to depending on the setup item that has been changed by the user, or no link information storage section must be referred to if the changed setup item does not influence other items at all (step S3860 in FIG. 38).

FIG. 37 shows an example of data stored in the reference information determination unit 3106. When the changed setup item is "ink cartridge", the ID numbers of link information storage sections to be referred to in the link information storage unit 3108 are 1, 2, 3, 4, 5, and 6. The storage sections with these IDs are referred to upon changing data. Likewise, when the changed setup item is "print quality", the IDs of link information storage sections to be referred to in the link information storage unit 3108 are 5 and 6.

Furthermore, when the changed setup item is "image data correction", since no ID of link information storage section to be referred to is described, there is no link information to be referred to. In this manner, depending on the setup item that has been changed by the user, a plurality of link information storage sections of the link information storage unit 3108 must be referred to, or some setup item does not sometimes influence other items. When the item changed by the user is "ink cartridge", the ID numbers=1, 2, 3, 4, 5, and 6 are returned to the data processing unit 3101 in step S3850.

FIG. 35 shows the relationship between the link information storage sections with the ID numbers=1 to 6 in the link information storage unit 3108, which must be referred to when the user has changed the setup item "ink cartridge", and the corresponding contents.

The data processing unit 3101 sends the smallest one of the IDs received from the reference information determination unit 3106 to the extraction condition setting unit 3107. Upon receiving the ID, the extraction condition setting unit 3107 returns a condition of the setup item required for acquiring link information to the data processing unit 3101 (step S3860 in FIG. 38).

The data processing unit 3101 acquires a setup item and its setup value according to the extraction condition returned from the extraction condition setting unit 3107 from the changed value storage unit 3104 and current value storage unit 3105, and accesses the link information storage unit 3108 to acquire information that matches the extraction condition (step S3870 in FIG. 38).

FIG. 36 shows an example of extraction conditions set in units of IDs. As can be seen from FIG. 36, for example, the contents of the setup values of two setup items "ink cartridge" and "paper type" are required upon extracting data from link information storage section 1 (reference medium correction table), and setup item "ink cartridge" is required upon accessing link information storage section 3 (grayscale correspondence table). The reference information determination unit 3106 determines appropriate ID numbers to be referred to on the basis of the relationship between the link information storage sections and extraction conditions shown in FIG. 36. Link information is acquired in ascending order of IDs.

The data processing unit 3101 accesses the link information storage unit 3108 on the basis of the ID numbers to be referred to, which are determined by and sent from the reference information determination unit 3106, thus acquiring required link information. This process will be described in detail below with reference to FIG. 39. Note that steps S3900 to S3920 in FIG. 39 overlap steps S3850 and S3860 in FIG. 38.

<Acquisition of Link Information>

The data processing unit 3101 receives the IDs of link information storage sections to be referred to from the reference information determination unit 3106 (step S3900 in FIG. 39), and then informs the extraction condition setting unit 3107 of the received IDs (step S3910 in FIG. 39). The extraction condition setting unit 2107 informs the data processing unit 3101 of conditions required for extraction, which are different in units of IDs (step S3920 in FIG. 39).

The data processing unit 3101 receives the conditions required for extraction from the extraction condition setting unit, sets the required setup items and setup values from the changed value storage unit 3104 and current value storage unit 3105, accesses one that matches the ID of the plurality of link information storage sections of the link information storage unit 3108 that stores information which matches the data condition, and acquires link data which matches the extraction condition (step S3930 in FIG. 39). This acquisition process repeats itself in correspondence with the number of IDs sent from the reference information determination unit 3106.

For example, as shown in FIG. 37, when "ink cartridge" has been changed, link information is referred to from all link information storage sections with IDs=1, 2, 3, 4, 5, and 6 in the link information storage unit 3108 to progress the extraction process.

FIG. 40 shows the contents of link information storage section 1 (reference medium correction table) which corresponds to the ID=1. As can be seen from FIG. 40, a combination of "ink cartridge" and "paper type" is an extraction condition. FIG. 40 exemplifies link information storage section 1, but the same applies to other link information storage sections.

In order to refer to link information storage section 1 (reference medium correction table) from the extraction condition setting unit 3107, "ink cartridge" and "paper type" are required (FIG. 36), the current values or changed data are set as the contents of these setup items on the basis of the charged value storage unit 3104 and current value storage unit 3105, and link information storage section 1 (reference medium correction table) with the smallest ID number is accessed to search for link information under the extraction condition "ink cartridge"="black/photo" and "paper type"="normal paper". Information that matches the condition (in this case, link information which changes "paper type" to "coated paper") can be obtained. This result is immediately sent to the data processing unit 3101.

In this manner, the information that matches the extraction condition is sent form the link information storage unit 3108 to the data processing unit 3101, which sends the received link information to the extracted information storage unit 3110. Upon receiving this information, the extracted information storage unit 3110 stores the link information (step S3940 in FIG. 39).

Furthermore, upon receiving the link information, the data processing unit 3101 sends this information to the setup value information replace unit 3109, which replaces the setup value of the setup item included in the received data (in this case, setup value "coated paper" of setup item "paper type") by setup value "normal paper" of the setup item stored in the current value storage unit 3105 (step S3950 in FIG. 39).

The link information extraction process ends here. When the condition "ink cartridge" has been changed, link information storage sections with ID numbers=1 to 6 are accessed in turn in ascending order of IDs to obtain the extraction condition after the change again. The subsequent processes (acquisition of link information for the ID number=2 and the subsequent ID numbers) will be explained below.

<Link Information Acquisition Example 1>

Link information storage section 2 (medium correspondence table) shown in FIG. 41, which corresponds to the ID number=2, is accessed to acquire link information.

In order to obtain link information from link information storage section 2 (medium correspondence table), since it is determined based on information from the extraction condition setting unit 3107 that "ink cartridge" and "paper type" are required, the contents of the setup values of these setup items are set based on the changed value storage unit 3104 and current value storage unit 3105 to access link information storage section 2 (medium correspondence table). At this time, since the setup value information replace unit 3109 has already replaced the contents of "paper type" from "normal paper" to "coated paper", the contents of the two setup items to be set in this case are "black/photo" for "ink cartridge", and "coated paper" for "paper type".

Four pieces of information in link information storage section 2 (medium correspondence table) that match this condition instruct to "delete" "paper type"="normal paper", to "select" "paper type"="coated paper", to "delete" "paper type"="OHP", and to allow "paper type"="gloss paper"

"selectable". The four pieces of information that match the condition are sent to the data processing unit 3101, which sends the received link information to the extracted information storage unit 3110. Upon receiving such information, the extracted information storage unit 3110 stores the link information.

The data processing unit 3101 also sends the returned link information to the setup value information replace unit 3109, which replaces data which is instructed to "select", i.e., data of "coated paper", of the setup values of the setup items included in the received data. In this case, since "normal paper" has already been deleted, and "coated paper" has been selected, the setup values remain the same apparently.

<Link Information Acquisition Example 2>

Link information storage section 3 (grayscale correspondence table) shown in FIG. 42, which corresponds to the ID=3, is accessed to acquire link information.

In order to obtain link information from link information storage section 3 (grayscale correspondence table), since it is determined based on information of the extraction condition setting unit 3107 that "ink cartridge" is required, the contents of the setup value of this setup item are set based on the changed value storage unit 3104 to access link information storage section 3 (grayscale correspondence table). Since the contents of extraction condition "ink cartridge" are "black/photo", two pieces of link information that match this condition instruct to allow "grayscale"="ON" "selectable" and to "select" "grayscale"="OFF". The two pieces of information that match the condition are sent to the data processing unit 3101, which sends the received link information to the extracted information storage unit 3110. Upon receiving this information, the extracted information storage unit 3110 stores the link information.

The data processing unit 3101 also sends the returned link information to the setup value information replace unit 3109, which replaces the current setup value by the setup value of the setup item included in the received data. In this case, since "grayscale"="OFF" which is instructed to "select" has already been selected, no replacement is done apparently.

<Link Information Acquisition Example 3>

Link information storage section 4 (quality-level correspondence table) shown in FIG. 43, which corresponds to the ID number=4, is accessed to acquire link information. In order to obtain link information from link information storage section 4 (quality-level correspondence table), since it is determined based on information from the extraction condition setting unit 3107 that "ink cartridge" and "paper type" are required (FIG. 36), the contents of the setup values of these setup items are set based on the changed value storage unit 3104 and current value storage unit 3105 to access link information storage section 4 (quality-level correspondence table). Five pieces of information that match the condition "ink cartridge"="black/photo" and "paper type"="coated paper" describe to allow "print quality"="fifth level" "selectable", to "select" "print quality"="fourth level", and to "delete" "print quality"="first level" to "third level". This means that when "ink cartridge" is "black/photo", and "coated paper" is selected, the first to third levels of the print quality are deleted (unselectable), the fourth level is selected, and the fifth level is selectable.

The five pieces of "print quality" information that match the condition are sent to the data processing unit 3101, which sends the received link information to the extracted information storage unit 3110. Upon receiving such information, the extracted information storage unit 3110 stores the link information. Upon receiving the link information, the data processing unit 3101 sends the received information to the setup value information replace unit 3109, which replaces the current setup value by the setup value of the setup item included in the received data, i.e., setup value "second level" stored in the current value storage unit 3105 by setup value "fourth level" of setup item "print quality".

<Link Information Acquisition Example 4>

Link information storage section 5 (quality message-binarization method correspondence table) shown in FIG. 44, which corresponds to the ID number=5, is accessed to acquire link information. In order to obtain link information from link information storage section 5 (quality message-binarization method correspondence table), since it is determined based on information from the extraction condition setting unit 3107 that "ink cartridge", "paper type", and "print quality" are required, the contents of the setup values of these setup items are set based on the changed value storage unit 3104 and current value storage unit 3105 to access link information storage section 5 (quality message-binarization method correspondence table).

At this time, since the setup value information replace unit 3109 has already replaced "paper type" from "normal paper" to "coated paper", and "print quality" to "fourth level", the contents of the setup values of these setup items are "black/photo" for "ink cartridge", "coated paper" for "paper type", and "fourth level" for "print quality".

Upon searching link information storage section 5 (quality message-binarization method correspondence table) under such condition, four pieces of found information describe to "select" "quality message"="PHOTO", to "delete" "dithering"="pattern (high speed)" and "pattern", and to "select" "dithering"="error diffusion". This means to display print quality message (print mode in FIG. 32) "PHOTO", to select "error diffusion" of dithering processes, and to delete other processes. The four pieces of information are sent to the data processing unit 3101, which sends the received link information to the extracted information storage unit 3110. Upon receiving these information, the extracted information storage unit 3110 stores the link information.

Upon receiving the link information, the data processing unit 3101 sends the received information to the setup value information replace unit 3109, which replaces the current setup value by the setup value of the setup item included in the received data, i.e., setup value "pattern (high speed)" stored in the current value storage unit 3105 by setup value "error diffusion" of setup item "dithering".

<Link Information Acquisition Example 5>

Link information storage section 6 (resolution correspondence table) shown in FIG. 45, which corresponds to the ID=6, is accessed to acquire link information.

In order to obtain link information from link information storage section 6 (resolution correspondence table), it is determined based on information from the extraction condition setting unit 3107 that "ink cartridge", "paper type", "print quality", "dithering", and "grayscale" are required (FIG. 36). The contents of the setup values of these setup items are set based on the changed value storage unit 3104 and current value storage unit 3105 to access link information storage section 6 (resolution correspondence table).

At this time, since the setup value information replace unit 3109 has already replaced "paper type" from "normal paper"

to "coated paper", "print quality" to "fourth level", and "dithering" from "pattern (high speed)" to "error diffusion", the contents of the setup values of these setup items are "black/photo" for "ink cartridge", "coated paper" for "paper type", "fourth level" for "print quality", "error diffusion" for "dithering", and "OFF" for "grayscale".

Upon searching link information storage section 6 (resolution correspondence table) under such condition, three pieces of found information describe to "select" "vertical resolution"="720", to "select" "horizontal resolution"="720" and "pattern", and to "select" "smoothing information"="smoothing". The three pieces of information are sent to the data processing unit 3101, which sends the received link information to the extracted information storage unit 3110. Upon receiving these information, the extracted information storage unit 3110 stores the link information. In this manner, a series of link information acquisition processes come to an end.

FIG. 46 shows link information stored in the extracted information storage unit 3110. That is, these pieces of link information instruct to select "paper type"="coated paper", to delete "paper type"="normal paper" and "OHP", to allow "grayscale"="ON" selectable, to select "grayscale"="OFF", to allow "print quality"="fifth level" selectable, to select "print quality"="fourth level", to delete "print quality"="first level" to "third level", to select "quality message"="PHOTO", to select "dithering"="error diffusion", to delete "dithering"="pattern (high speed)" and "pattern", to select "vertical and horizontal resolutions"="720", and to select "smoothing information"="smoothing".

The extracted information storage unit 3110 sends these pieces of link information to the data processing unit 3101, which displays this result on the display device 3102 (step S3880 in FIG. 38).

Figure 47:
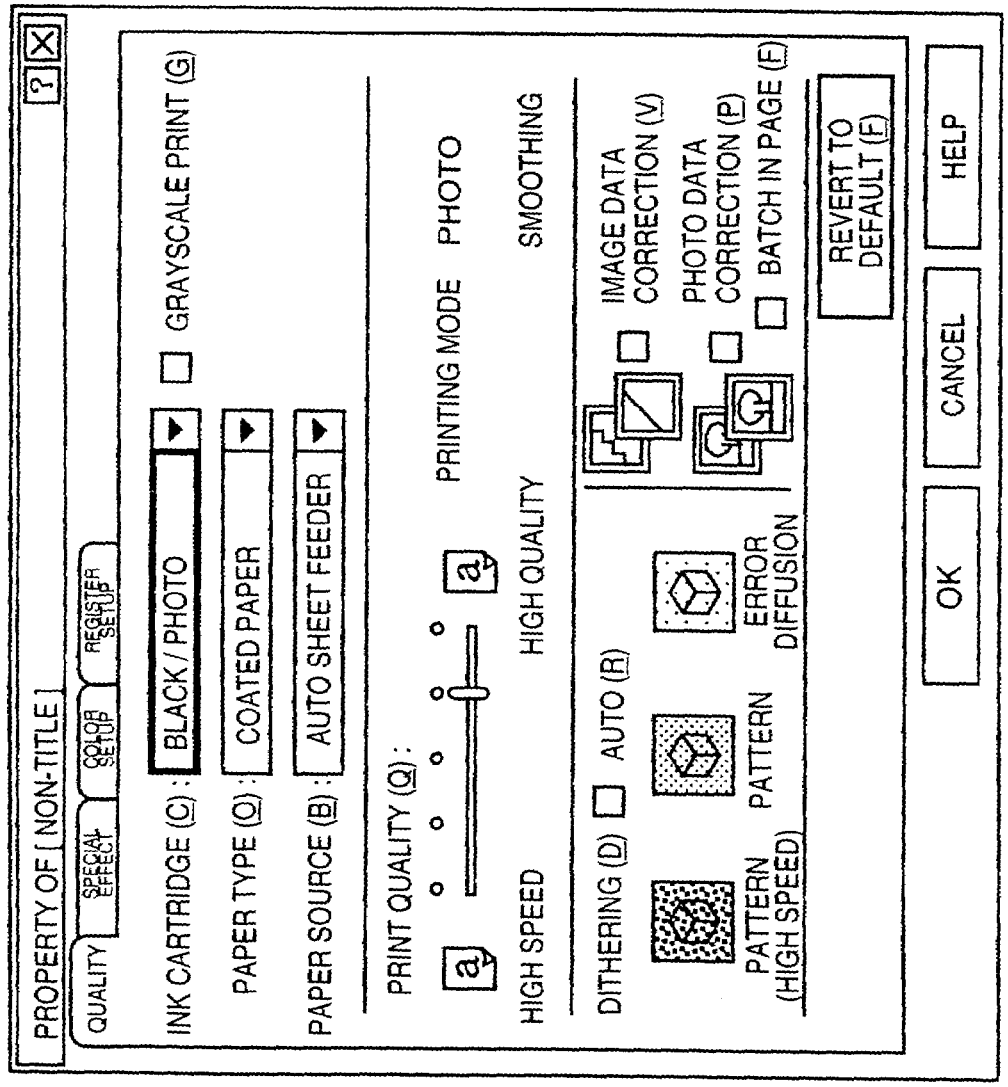
FIG. 47 shows the setup window of a printer driver that has reflected link information after a series of processes.

FIG. 47 shows the printer driver window displayed after "ink cartridge" has been changed from "black/color" to "black/photo" via a series of processes mentioned above.

In FIG. 47, "ink cartridge" is changed to "black/photo", "print quality" to "fourth level" (instruct the fourth setup value from the left end), and "dithering" to "error diffusion". The first, second, and third levels of "print quality" are unselectable in correspondence with "delete" choice, and the fifth level is selectable. Also, "pattern" and "pattern (high speed)" of "dithering" are unselectable.

As described in this embodiment, since the apparatus has a plurality of link information storage sections, and the reference information determination unit 3106 and extraction condition setting unit 3107, which specify information storage sections that are to undergo extraction, and can replace the current value by newly obtained link information, when an extraction condition has been changed, only a changed portion can be corrected. On the other hand, when new link information is added or deleted, a link information storage section can be added or deleted, and a corresponding portion can be added or deleted to or from the extraction condition. In this manner, link information which has a high degree of freedom and can reduce the number of data can be provided.

Since link information can be provided by only the change, even when a condition required for data search has been changed, link information can be provided without changing a program source.

As described above, according to the printer driver of this embodiment, when the extraction condition has been changed, only that portion can be corrected. Also, when new link information is added or deleted, a link information storage section can be added or deleted, and a corresponding portion can be added or deleted to or from the extraction condition. In this manner, link information which has a high degree of freedom and can reduce the number of data can be provided.

Seventh Embodiment

When a document or image is output to a printer on an operating system (OS) for personal use, a printer driver that matches the printer model must be used. The printer driver offers various kinds of unique information and data conversion functions for the corresponding printer to the OS and application as the calling side.

Figure 52:
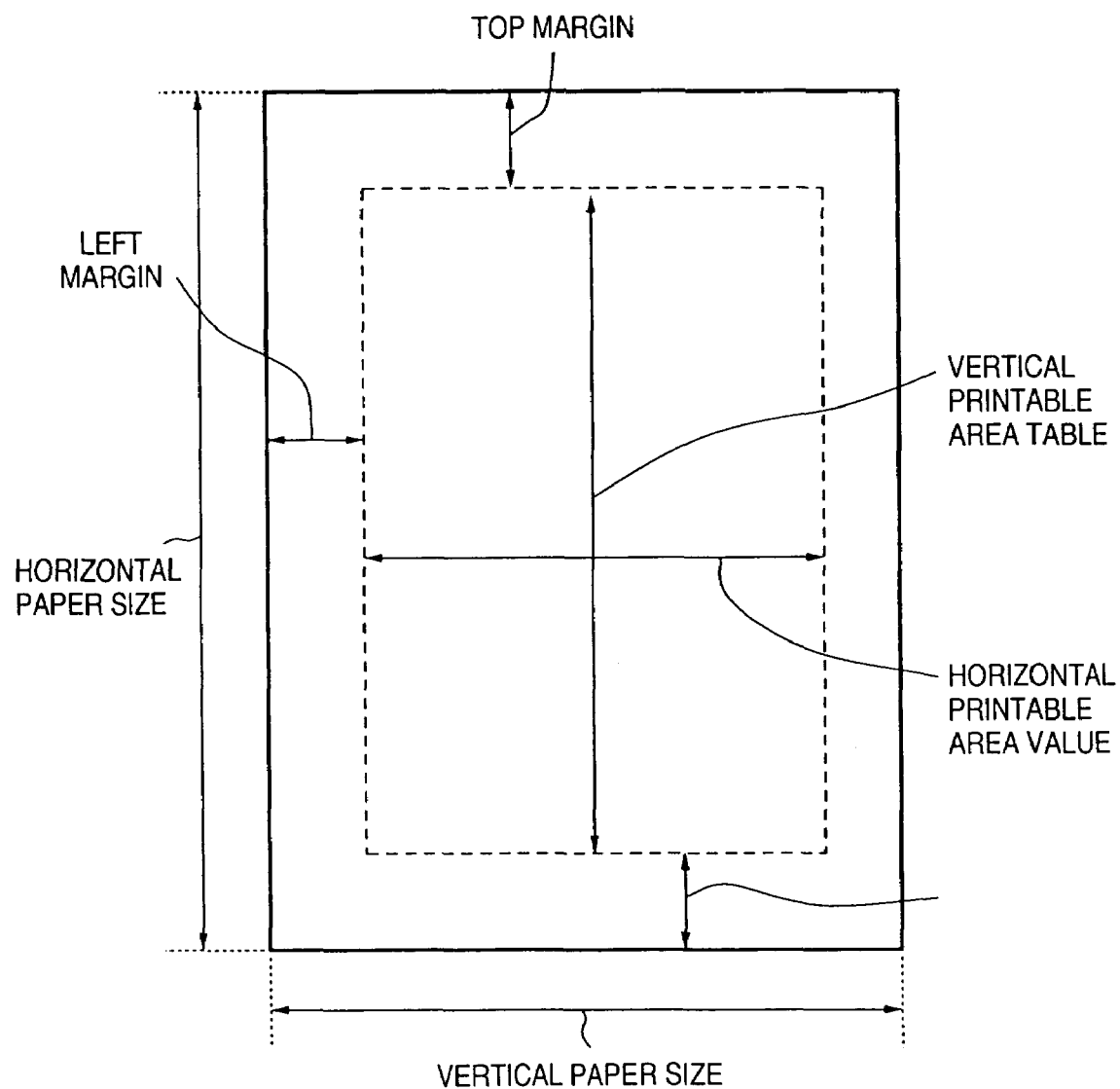
FIG. 52 is a view for explaining margin information.

Such information includes paper margin information. The paper margin information mainly includes four values, i.e., the left margin, top margin, horizontal printable area value, and vertical printable area value, as shown in FIG. 52. The left margin specifies the distance from the left end of a paper sheet to the left end of an area to be actually printed. The top margin specifies the distance from the top end of the paper sheet to the top end of the area to be actually printed. The horizontal and vertical printable area values are respectively actually printable horizontal and vertical lengths. Upon receiving these four pieces of information from the driver, an application can generate accurate print data so that data fall within the range defined by these margins.

A margin information offering system according to the present invention will be described below with reference to the accompanying drawings.

Figure 48:
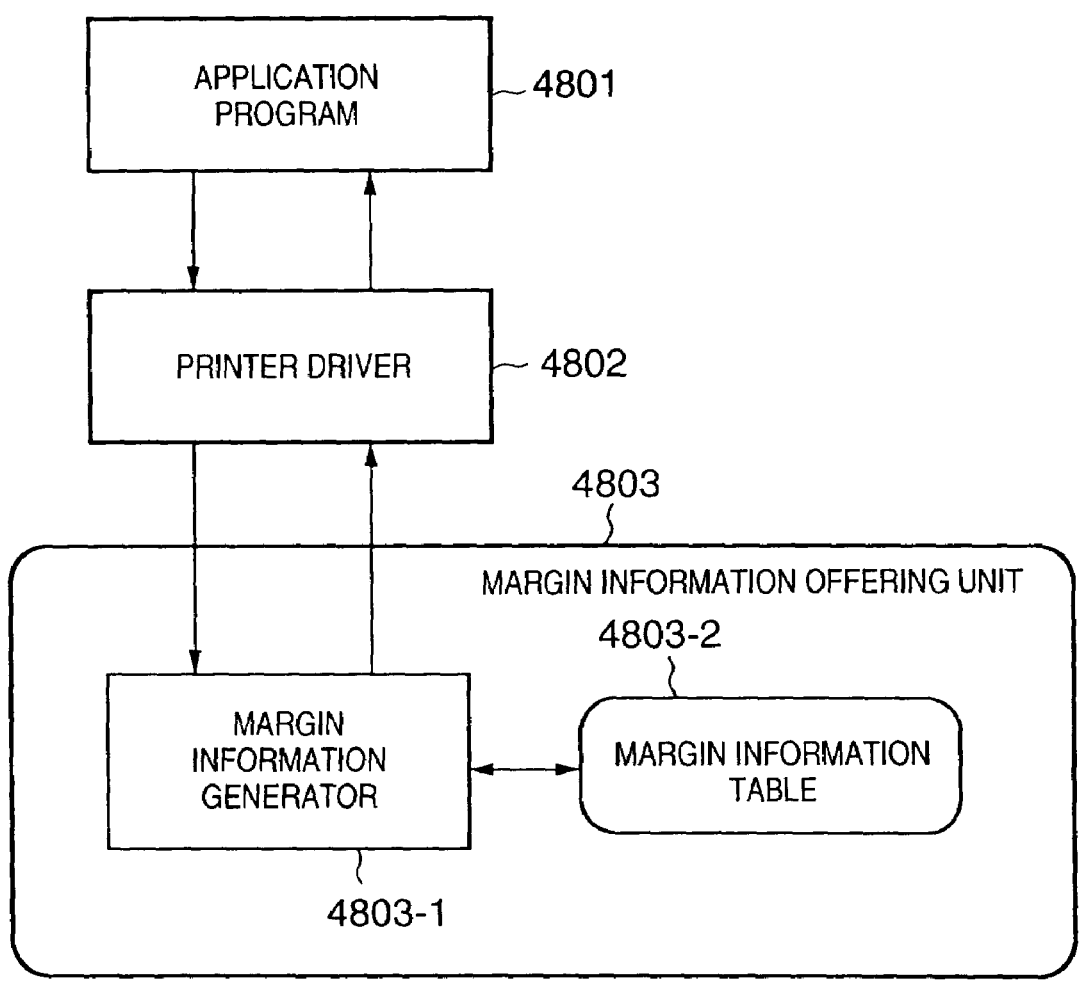
FIG. 48 is a block diagram for explaining the system arrangement.

FIG. 48 shows the arrangement according to the embodiment of the present invention. FIG. 48 extracts blocks that pertain to margin setups in a print process on the general OS. Reference numeral 4801 denotes an application program such as a wordprocessor, rendering software, or the like; and 4802, a printer driver. The printer driver 4802 offers margin information as one printer-dependent information to the application program. Reference numeral 4803 denotes a margin information offering unit according to the present invention.

When the printer driver 4802 offers margin information to the application program 4801, the printer driver 4802 itself calls this margin information offering unit 4803 to acquire its information.

This margin information offering unit 4803 comprises two blocks, i.e., a margin information generator (4803-1) and margin information table (4803-2). The margin information generator 4803-1 generates a left margin, top margin, and vertical and horizontal printable area values. The margin information table 4803-2 stores data required for the margin information generator 4803-1 to generate margin information in the form of table.

The table is stored in a normal file format, and includes two kinds of tables, i.e., index and data tables. The data table stores paper sizes and corresponding various margin values. The index table stores the setup conditions of the printer driver, and IDs of data tables that store margin information which match those conditions. The margin information generator acquires a required table data ID from the index table in accordance with the setups of the printer driver, and searches the data table designated by that ID, thus acquiring margin information.

A printer and the printer driver 4802 in this embodiment supports A4, A5, B5, envelope, and postcard sizes as paper sizes, and the user can select ON/OFF of continuous paper and ON/OFF of perforated paper as special functions from the user interface on the driver. "Continuous paper" is special one in which sheets having a given size are continuously connected, and has top and bottom margins of 0 mm. "Perforated paper" is special one, whose upper, lower, right, and left end portions are perforated, and which is used to print on full paper size by separating the perforated end portions after print is done on a range defined by perforations. When continuous paper=ON is selected, perforated paper is unselectable, and margin values dedicated to continuous paper are set in correspondence with respective paper sizes. Likewise, when perforated paper can be selected and ON is selected, margin values dedicated to perforated paper are set in correspondence with respective paper sizes. In this manner, margin setups change depending on a setup item selected by the user.

Figure 49:
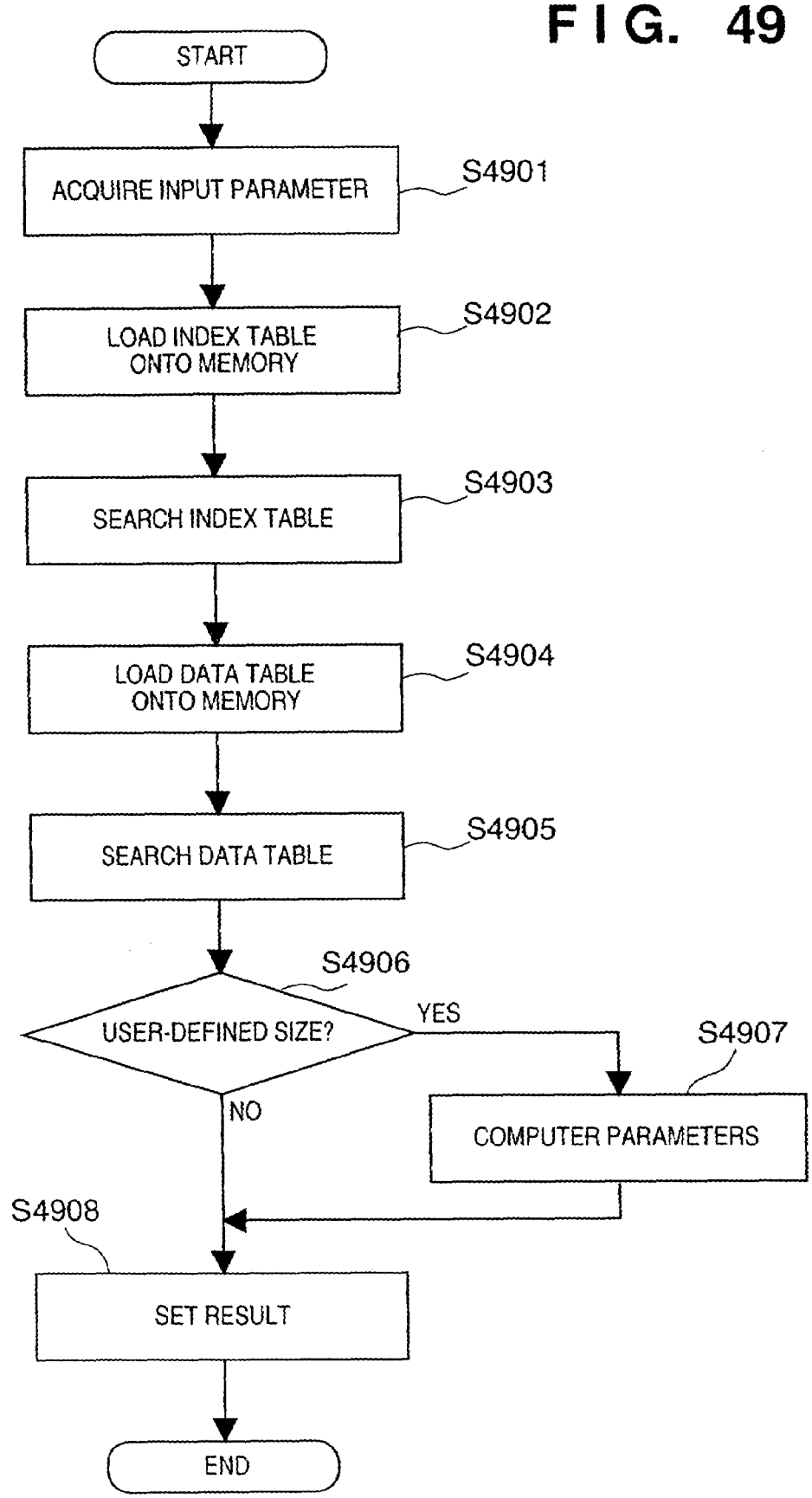
FIG. 49 is a flow chart showing a margin information offering process.

FIG. 49 shows the flow of a margin information offering process according to the present invention.

In step S4901, parameters from the calling side (printer driver in this embodiment) are received. The received parameters include vertical and horizontal paper sizes, a paper size code obtained by coding the paper sizes, and ON/OFF information of continuous paper or perforated paper as a print condition.

The flow advances to step S4902, and the index table is loaded from the margin information table onto a memory. Note that an index table 5001 has a structure, as shown in FIG. 50. This table 5001 stores setup values of the printer driver and the IDs of data tables that store corresponding margin information. In FIG. 50, when the setup of continuous paper is ON, a data table with ID=100 is referred to; when the setup of continuous paper is OFF and that of perforated paper is ON, a table with ID=110 is referred to; and when the setups of both continuous paper and perforated paper are OFF, a table with ID=120 is referred to. Note that "ALL" in FIG. 50 matches all states. The index table describes conditions associated with all margin setups, and includes at least one table ID that matches every setups.

In step S4903, the index table loaded onto the memory is searched on the basis of items of the print condition obtained in step S4901 to acquire the ID of a data table that matches the print condition.

In step S4904, the data table with the ID acquired in step S4903 is loaded onto the memory. Data tables with respective table IDs have structures shown in FIGS. 51A, 51B, and 51C. Note that the unit of each margin value is 1/100 mm. Data tables 5101 to 5103 store paper sizes, and left and top margins and vertical and horizontal printable area values corresponding to these sizes. For example, in the table 5101 with ID=100, A4-size paper has a left margin=340, top margin=0, horizontal printable area value=20320, and vertical printable area value=29700. In case of a user-defined size, a maximum horizontal printable area value is set in place of the horizontal printable area value, and a bottom margin value is set in place of the vertical printable area value.

The flow advances to step S4905, and the data table loaded onto the memory in step S4904 on the basis of the paper size code acquired in step S4901 to obtain a top margin, left margin, and vertical and horizontal printable area values. Only when the user-defined size is selected, the maximum horizontal printable area value and bottom margin value are obtained in place of the vertical and horizontal printable area values.

It is checked in step S4906 if the paper size code obtained in step S4901 means a user-defined size. If YES in step S4906, the flow advances to step S4907; otherwise (NO in step S4906), the flow advances to step S4908.

In step S4907, the respective margin values of the user-defined size are computed. Since the vertical and horizontal printable area values change depending on the actual size values obtained in step S4901 for only the user-defined size, the margin values must be computed. The vertical and horizontal printable area values are computed using the values obtained in step S4905 by:

Horizontal printable area value=horizontal size of paper−(left margin value)×2

If horizontal printable area value>maximum printable area value, the maximum printable area value is used as the horizontal printable area value.

Vertical printable area value=vertical size of paper−(top margin value)−(bottom margin value)

In step S4908, the left and top margins and vertical and horizontal printable area values determined in step S4905 or S4907 are returned to the calling side, thus ending the process.

With the aforementioned process, margin information is offered to the printer driver.

In this embodiment, tables are stored using a file system. However, the implementation method of the tables is not particularly limited as long as the tables and programs are separated. Also, even when a program is written in a ROM or the like as hardware, since the effects of the present invention remain the same, the present invention is not limited to a program format.

As described above, according to the printer driver of this embodiment, margin information is stored in a table file, and a program and data of margin information generation means are separated to use a common program, thus easily adding and changing the paper size.

For each printer, a table file is created for that model, thus improving the development efficiency.

Since two kinds of tables, i.e., index and data tables are used, even when complicated conditions are given, easy search and generation of margin information can be achieved without modifying the program of the margin information generation means.

Another Embodiment

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium (or recording medium), which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, the storage medium stores program codes corresponding to the aforementioned flow charts (shown in FIGS. 7 to 10, 13, 25 to 27, 30, 38, 39, and 49).

As many apparently widely different embodiments of the present invention can be made without departing from the spirit and scope thereof, it is to be understood that the invention is not limited to the specific embodiments thereof except as defined in the appended claims.

What is claimed is:

1. A computer program product having a computer readable medium storing a printer driver program for performing processing of image data to be transmitted to a printer, said program comprising:
   processing modules;
   a database including actual tables corresponding to table IDs used by said processing modules and a search table, including the tables IDs required by said processing modules corresponding to a print mode; and
   a search module for searching the search table to obtain the table IDs corresponding to the print mode,
   wherein one of said processing modules searches for the actual tables by means of the table IDs obtained by said search module, loads the actual tables and performs a process using the loaded actual tables.

2. The computer program product according to claim 1, wherein the actual tables include color correction tables and said one of said processing modules loads a color correction table corresponding to the print mode from said database and performs color correction processing using the loaded color correction table.

3. The computer product according to claim 1, wherein said actual tables include color conversion tables and said one of said processing modules loads a color conversion table corresponding to the printing mode from said database and performs color conversion processing using the loaded color conversion table.

4. The computer program product according to claim 1, wherein the actual tables include grayscale correction tables and said one of said processing modules loads a grayscale correction table corresponding to a printing mode from said database and performs grayscale correction processing using the loaded grayscale correction table.

5. The computer program product according to claim 1, wherein the actual tables include dither matrix tables and said one of said processing modules loads a dither matrix table corresponding to a printing mode from said database and performs dither processing using the loaded dither matrix table.

6. A computer program product comprising a computer readable medium storing a print driver program for performing procession of image data to be transmitted to a printer, said program comprising:
   processing modules;
   a database including actual tables corresponding to table IDs used by said processing modules and a search table including the table IDs required by said processing modules corresponding to a print mode; and
   a search module for searching the search table to obtain the table IDs corresponding to a print mode,
   wherein said actual tables include margin tables and said processing module searches for a margin table corresponding to a printing mode from said database, loads the margin table and performs margin processing using the loaded margin table.

7. A data processing method for a printer driver which performs processing of image data to be transmitted to a printer and comprises processing modules, a database including actual tables corresponding to table IDs used by the processing modules and a search table including the tables IDs required by the processing modules corresponding to a print mode and a search module, said method comprising:
   a searching step of the search module searching the search table to obtain the table IDs corresponding to a print mode;
   a loading step of searching the actual tables by means of the table IDs obtained in said searching step and loading the actual tables; and
   a performing step of performing a process using the loaded actual tables.

8. The data processing method according to claim 7, wherein the actual tables include color correction tables, said loading step includes loading a color correction table corresponding to the print mode from the database and performing step includes performing color correction processing using the loaded color correction table.

9. The data processing method according to claim 7, wherein the actual tables include color conversion tables, said loading step includes loading a color conversion table corresponding to the print mode from the database and said performing step includes performing color conversion processing using the loaded color conversion table.

10. The data processing method according to claim 7, wherein the actual tables include grayscale correction tables, said loading step includes loading a grayscale correction table corresponding to the print mode from the database and said performing step includes performing grayscale correction processing using the loaded grayscale correction table.

11. The data processing method according to claim 7, wherein the actual tables include dither matrix tables, said loading step includes loading a dither matrix table corresponding to the print mode from the database and said performing step includes performing dither processing using the loaded dither matrix table.

12. A data processing method for a printer dirver which performs processing of image data to be transmitted to a printer and comprises processing modules, a database including actual tables corresponding to table IDs used by the processing modules and a search table including the tables IDs required by the processing modules corresponding to a print mode and a search module, wherein the actual tables include margin tables, said method comprising:
   a searching step that includes the search module searching for a margin table that corresponds to the print mode from the database;
   a loading step that includes loading the margin table found in said searching step; and
   a performing step that includes performing margin processing using the loaded margin table.

13. A computer having a printer driver which performs processing of image data to be transmitted to a printer, said computer comprising:
   memory storing processing modules;
   a processor for executing said processing modules;
   a database including actual tables corresponding to table IDs used by said processing modules and a search table, including the tables IDs required by said processing modules corresponding to a print mode; and a search module executed by said processor, for searching the search table to obtain the table IDs corresponding to the print mode, wherein said processor, executing one of said processing modules, searches for the actual tables by means of the table IDs obtained by execution of said search module, loads the actual tables and performs a process using the loaded actual tables.

14. The computer according to claim 13, wherein said actual tables include color correction tables and said processor, executing said search module, loads a color correction table corresponding to the print mode from said database and performs color correction processing using the loaded color correction table.

15. The computer according to claim 13, wherein said actual tables include color conversion tables and said processor, executing said search module, loads a color conversion table corresponding to the print mode from said database and performs color conversion processing using the loaded color conversion table.

16. The computer according to claim 13, wherein said actual tables include grayscale correction tables and said processor, executing said search module, loads a grayscale correction table corresponding to the print mode from said database and performs grayscale correction processing using the loaded grayscale correction table.

17. The computer according to claim 13, wherein said actual tables include dither matrix tables and said processor, executing said search module, loads a dither matrix table corresponding to the print mode from said database and performs dither processing using the loaded dither matrix table.

18. A computer having a printer driver which performs processing of image data to be transmitted to a printer, said computer comprising:

memory storing processing modules;

a processor for executing said processing modules;

a database including actual tables corresponding to table IDs used by said processing modules and a search table, including the tables IDs required by said processing modules corresponding to a print mode; and a search module executed by said processor, for searching the search table to obtain the table IDs corresponding to the print mode, wherein said actual tables include margin tables and said processor in executing said search module loads a margin table corresponding to the designated printing mode from said database and performs margin processing using the loaded margin table.

19. A computer program product comprising a computer readable medium storing a printer drive program for performing processing of image data to be transmitted to a printer, said program comprising:

processing modules;

a database including the actual tables corresponding to table IDs used by said processing modules and a search table including the table IDs required by said processing modules corresponding to a print mode; and a search module for searching the search table to get the table IDs corresponding to a print mode, wherein one of said processing modules searches the actual tables by the table IDs gotten by said search module, loads the actual tables and performs a process using the loaded actual table, and wherein the printing mode is determined by plural conditions including paper type, quantization method and print quality, and the actual tables include a color correction table, a color conversion table, a grayscale correction table and a quantization table.

20. A data processing method for a printer driver which performs processing of image data to be transmitted to a printer and comprises processing modules, a database including actual tables corresponding to table IDs used by the processing modules and a search table including the tables IDs required by the processing modules corresponding to a print mode and a search module, said method comprising:

a searching step of the search module searching the search table to obtain the table IDs corresponding to a print mode;

a loading step of searching the actual tables by means of the table IDs obtained in said searching step and loading the actual tables; and a performing step of performing a process using the loaded actual tables, wherein the print mode is determined by plural conditions including paper type, quantization method and print quality, and the actual tables include a color correction table, a color conversion table, a grayscale correction table and a quantization table.

21. A computer having a printer driver which performs processing of image data to be transmitted to a printer, said computer comprising:

memory storing processing modules;

a processor for executing said processing modules;

a database including actual tables corresponding to table IDs used by said processing modules and a search table, including the tables IDs required by said processing modules corresponding to a print mode; and a search module executed by said processor, for searching the search table to obtain the table IDs corresponding to the print mode, wherein said processor, executing one of said processing modules, searches for the actual tables by means of the table IDs obtained by execution of said search module, loads the actual tables and performs a process using the loaded actual tables, wherein the print mode is determined by plural conditions including paper type, quantization method and print quality, and the actual tables include a color correction table, a color conversion table, a grayscale correction table and a quantization table.

22. An image processing method for use in an image processing apparatus having a database containing a search table that includes a plurality of first actual tables, a plurality of second actual tables and IDs for specifying a first table and a second table corresponding to a mode, the plurality of first and second actual tables being independent from a processing module that performs a process for image data to be printed, said method comprising the steps of:

searching an ID of a first table and an ID of a second table corresponding to a mode from the database;

loading the found IDs;

loading a first table and a second table corresponding to loaded IDs form the database; and performing a first process and a second process for an image data to be printed using the first table and the second table loaded.

23. An information processing method performed in an information processing apparatus having a printer driver generating a print image to be printed by a printer, the printer driver having a database containing (i) a plurality of look-up tables including a color correction look-up table and a color conversion look-up table independent from a processing module that performs a process for a print image to be printed by the printer and (ii) a search look-up table for searching a look-up table required corresponding to a print mode, said method comprising the steps of:

- searching table IDs of look-up tables required corresponding to the print mode using the search look-up table contained in the database;
- loading the found IDs;
- loading look-up tables from the database to a memory in accordance with the table IDs searched in said searching step to perform a color correction using the loaded look-up tables; and
- loading look-up tables from the database to a memory in accordance with the table IDs searched in said searching step to perform a color conversion using the loaded look-up tables.

24. An information processing method performed in an information processing apparatus having a printer driver generating a print image to be printed by a printer, the printer driver having a database containing (i) a plurality of look-up tables including a gray-scale correction look-up table and a quantization look-up table independent from a processing module that performs a process for a print image to be printed by the printer and (ii) a search look-up table for searching a look-up table required corresponding to a print mode, said method comprising the steps of:

- searching table IDs of look-up tables required corresponding to the print mode using the search look-up table contained in the database;
- loading the found IDs;
- loading look-up tables from the database to a memory in accordance with the table IDs searched in said searching step to perform a gray-scale correction using the loaded look-up tables; and
- loading look-up tables from the database to a memory in accordance with the table IDs searched in said searching step to perform a quantization using the loaded look-up tables.

* * * * *

UNITED STATES PATENT AND TRADEMARK OFFICE
CERTIFICATE OF CORRECTION

PATENT NO. : 7,268,897 B1
APPLICATION NO. : 09/597403
DATED : September 11, 2007
INVENTOR(S) : Takahiro Moro et al.

It is certified that error appears in the above-identified patent and that said Letters Patent is hereby corrected as shown below:

ON TITLE PAGE [56] FOREIGN PATENT DOCUMENTS

Foreign Patent Documents, "JP  09-272222   10/1997" should be deleted.

ON COVER PAGE [57] ABSTRACT

Line 7, "able," should read --table,--.

COLUMN 1

Line 10, "form" should read --from--.

COLUMN 28

Line 23, "form" should read --from--; and
　　Line 67, "type = "OHP"," should read --type" = "OHP",--.

COLUMN 30

Line 42, "these" should read --this--.

COLUMN 31

Line 15, "these" should read --this--.

COLUMN 33

Line 36, "setups." should read --setup.--.

COLUMN 35

Line 25, "tables" should read --table--;
　　Line 39, "computer product" should read --computer program product--; and
　　Line 59, "procession" should read --processing--.

COLUMN 36

Line 46, "dirver" should read --driver--.

UNITED STATES PATENT AND TRADEMARK OFFICE
CERTIFICATE OF CORRECTION

PATENT NO. : 7,268,897 B1
APPLICATION NO. : 09/597403
DATED : September 11, 2007
INVENTOR(S) : Takahiro Moro et al.

It is certified that error appears in the above-identified patent and that said Letters Patent is hereby corrected as shown below:

<u>COLUMN 37</u>

Line 1, "tables" should read --table--; and
    Line 42, "tables" should read --table--.

<u>COLUMN 38</u>

Line 11, "tables" should read --table--;
    Line 34, "tables" should read --table--; and
    Line 61, "form" should read --from--.

<u>COLUMN 40</u>

Line 2, "gray-scale" should read --grayscale--; and
    Line 14, "gray-scale" should read --grayscale--.

Signed and Sealed this

Eighth Day of July, 2008

JON W. DUDAS
*Director of the United States Patent and Trademark Office*